(12) United States Patent
Simard et al.

(10) Patent No.: US 9,582,490 B2
(45) Date of Patent: Feb. 28, 2017

(54) ACTIVE LABELING FOR COMPUTER-HUMAN INTERACTIVE LEARNING

(71) Applicant: Microsoft Corporation, Redmond, WA (US)

(72) Inventors: Patrice Y. Simard, Bellevue, WA (US); David Max Chickering, Bellevue, WA (US); Aparna Lakshmiratan, Kirkland, WA (US); Denis X. Charles, Bellevue, WA (US); Leon Bottou, Kirkland, WA (US)

(73) Assignee: Microsoft Technolog Licensing, LLC, Redmond, WA (US)

( * ) Notice: Subject to any disclaimer, the term of this patent is extended or adjusted under 35 U.S.C. 154(b) by 611 days.

(21) Appl. No.: 14/075,690

(22) Filed: Nov. 8, 2013

(65) Prior Publication Data
US 2015/0019460 A1    Jan. 15, 2015

Related U.S. Application Data

(60) Provisional application No. 61/845,844, filed on Jul. 12, 2013.

(51) Int. Cl.
*G06F 15/16* (2006.01)
*G06F 17/27* (2006.01)
(Continued)

(52) U.S. Cl.
CPC ....... *G06F 17/2735* (2013.01); *G06F 17/2785* (2013.01); *G06N 7/005* (2013.01);
(Continued)

(58) Field of Classification Search
CPC ............................ H04L 1/0072; H04L 1/0079
(Continued)

(56) References Cited

U.S. PATENT DOCUMENTS

| 6,098,034 A | 8/2000 | Razin et al. |
| 6,505,207 B1 | 1/2003 | Aggarwal et al. |

(Continued)

OTHER PUBLICATIONS

Second Written Opinion Issued in PCT Application No. PCT/US2014/046256, Mailed Date: Jun. 24, 2015, 6 Pages.
(Continued)

*Primary Examiner* — Adnan Mirza
(74) *Attorney, Agent, or Firm* — Corie Florin; Sandy Swain; Micky Minhas

(57) ABSTRACT

A collection of data that is extremely large can be difficult to search and/or analyze. Relevance may be dramatically improved by automatically classifying queries and web pages in useful categories, and using these classification scores as relevance features. A thorough approach may require building a large number of classifiers, corresponding to the various types of information, activities, and products. Creation of classifiers and schematizers is provided on large data sets. Exercising the classifiers and schematizers on hundreds of millions of items may expose value that is inherent to the data by adding usable meta-data. Some aspects include active labeling exploration, automatic regularization and cold start, scaling with the number of items and the number of classifiers, active featuring, and segmentation and schematization.

18 Claims, 23 Drawing Sheets

(51) Int. Cl.
 H04L 1/00 (2006.01)
 G06N 99/00 (2010.01)
 G06N 7/00 (2006.01)
(52) U.S. Cl.
 CPC ......... *G06N 99/005* (2013.01); *H04L 1/0079* (2013.01); *H04L 1/0072* (2013.01)
(58) Field of Classification Search
 USPC .......................................... 710/310; 709/223
 See application file for complete search history.

(56) References Cited

U.S. PATENT DOCUMENTS

| | | | |
|---|---|---|---|
| 7,542,894 | B2 | 6/2009 | Murata |
| 7,593,904 | B1 | 9/2009 | Kirshenbaum et al. |
| 7,783,581 | B2 | 8/2010 | Hosoi et al. |
| 7,827,125 | B1 | 11/2010 | Rennison |
| 7,930,353 | B2 | 4/2011 | Chickering et al. |
| 8,064,688 | B2 | 11/2011 | Schneiderman |
| 8,086,549 | B2 | 12/2011 | Qi et al. |
| 8,401,282 | B2 | 3/2013 | Porikli et al. |
| 2002/0099730 | A1 | 7/2002 | Brown et al. |
| 2004/0153311 | A1 | 8/2004 | Liu et al. |
| 2005/0080613 | A1 | 4/2005 | Colledge et al. |
| 2005/0165782 | A1 | 7/2005 | Yamamoto |
| 2005/0171760 | A1 | 8/2005 | Tinkler |
| 2005/0289168 | A1 | 12/2005 | Green |
| 2006/0069678 | A1 | 3/2006 | Chou et al. |
| 2006/0218156 | A1 | 9/2006 | Schechinger et al. |
| 2007/0136048 | A1 | 6/2007 | Richardson-Bunbury et al. |
| 2007/0136689 | A1 | 6/2007 | Richardson-Bunbury et al. |
| 2007/0250306 | A1 | 10/2007 | Marcu et al. |
| 2008/0140589 | A1 | 6/2008 | Basu et al. |
| 2008/0215513 | A1 | 9/2008 | Weston et al. |
| 2009/0070097 | A1 | 3/2009 | Wu et al. |
| 2009/0089047 | A1 | 4/2009 | Pell et al. |
| 2009/0231359 | A1 | 9/2009 | Bass, II et al. |
| 2010/0082510 | A1 | 4/2010 | Gao et al. |
| 2010/0268725 | A1 | 10/2010 | Wang et al. |
| 2011/0314367 | A1* | 12/2011 | Chang ............... G06F 17/30035 715/230 |
| 2012/0106857 | A1 | 5/2012 | Schneiderman |
| 2012/0158623 | A1 | 6/2012 | Bilenko et al. |
| 2012/0269436 | A1 | 10/2012 | Mensink et al. |
| 2013/0018824 | A1 | 1/2013 | Ghani et al. |
| 2013/0060825 | A1* | 3/2013 | Farcasiu ........... G06F 17/30557 707/812 |
| 2013/0204809 | A1 | 8/2013 | Bilenko et al. |

OTHER PUBLICATIONS

Second Written Opinion Issued in PCT Application No. PCT/US2014/046257, Mailed Date: Jul. 2, 2015, 7 Pages.
Second Written Opinion Issued in PCT Application No. PCT/US2014/045639, Mailed Date: Jul. 2, 2015, 8 Pages.
Second Written Opinion Issued in PCT Application No. PCT/US2014/045638, Mailed Date: Jun. 17, 2015, 7 Pages.
Yang, et al., "Effective Multi-Label Active Learning for Text Classification", In Proceedings of the 15th ACM SIGKDD International Conference on Knowledge Discovery and Data Mining, Jun. 28, 2009, 9 pages.
Agrawal, et al., "Multi-Label Learning with Millions of Labels—Recommending Advertiser Bid Phrases for Web Pages", In Proceedings of the 22nd International Conference on World Wide Web, May 13, 2013, 11 pages.
Esuli, et al., "Active Learning Strategies for Multi-Label Text Classification", In Proceedings of the 31th European Conference on IR Research on Advances in Information Retrieval, Apr. 6, 2009, 12 pages.
Zhang, et al., "Multi-View Multi-Label Active Learning for Image Classification", In IEEE International Conference on Multimedia and Expo, Jun. 28, 2009, 4 pages.
Blum, et al., "Combining Labeled and Unlabeled Data with Co-Training", In Proceedings of the Eleventh Annual Conference on Computational Learning Theory, Jul. 24, 1998, 10 pages.
Krishnapuram, et al., "Active Learning of Features and Labels", In Workshop on Learning with Multiple Views at the 22nd International Conference on Machine Learning, Aug. 2005, 8 pages.
Attenberg, Josh, et al., "Why label when you can search?: alternatives to active learning for applying human resources to build classification models under extreme class imbalance", In Proceedings of the 16th ACM SIGKDD international conference on Knowledge discovery and data mining (2010), pp. 423-432, doi:10.1145/1835804.1835859.
Osmanbeyoglu, et al., "Active Machine Learning for Transmembrane Helix Prediction", In the Eighth Asia Pacific Bioinformatics Conference, Jan. 18, 2010, 9 pages.
Leather, et al., "Automatic Feature Generation for Machine Learning Based Optimizing Compilation", In Proceedings of the 7th Annual IEEE/ACM International Symposium on Code Generation and Optimization, Mar. 22, 2009, 11 pages.
Anderson, et al. "Common Component Classification: What Can We Learn from Machine Learning?", In Journal of NeuoImage, vol. 56, Issue 2, May 15, 2010, 8 pages.
Rohrer, Brandon, "Biologically Inspired Feature Creation for Multi-Sensory Perception", In Proceedings of the Second Annual Meeting of the Biologically Inspired Cognitive Architectures Society, Nov. 4, 2011, 9 pages.
Guyon, et al., "An Introduction to Variable and Feature Selection", In Journal of Machine Learning Research, vol. 3, Mar. 2003, 26 pages.
Raghavan, et al., "An Interactive Algorithm for Asking and Incorporating Feature Feedback into Support Vector Machines", In Proceedings of the 30th Annual International ACM SIGIR Conference on Research and Development in Information Retrieval, Jul. 23, 2007, pp. 79-86.
Mendez, et al., "A Comparative Performance Study of Feature Selection Methods for the Anti-Spam Filtering Domain", In Proceedings of Advances in Data Mining Lecture Notes in Computer Science, Lecture Notes in Artificial Intelligenence, Jan. 31, 2006, pp. 106-120.
Raghavan, et al., "InterActive Feature Selection", In Proceedings of the 19th International Joint Conference on Artificial Intelligence, Dec. 31, 2005, pp. 841-846.
Dy, et al., "Visualization and Interactive Feature Selection for Unsupervised Data", In Proceedings of the Sixth ACM SIGKDD International Conference on Knowledge Discovery and Data Mining, Dec. 31, 2000, pp. 360-364.
"International Search Report and Written Opinion Issued in PCT Patent Application No. PCT/US2014/045638", Mailed Date: Dec. 23, 2014, 10 Pages.
Settles, et al., "An Analysis of Active Learning Strategies for Sequence Labeling Tasks", In Proceedings of the Conference on Empirical Methods in Natural Language Processing, Oct. 25, 2008, pp. 1070-1079.
Brewster, et al., "User-Centred Ontology Learning for Knowledge Management", In Proceedings of Natural Language Processing and Information Systems, vol. 2553, Feb. 28, 2003, pp. 203-207.
Correia, et al., "Extracting Ontology Hierarchies From Text", Published on: Jul. 9, 2011 Available At: http://www.ksi.edu/seke/Proceedings/seke11/25_Rosario_Girardi.pdf.
"International Search Report and Written Opinion Received for PCT Patent Application No. PCT/US2014/045639", Mailed Date:Feb. 11, 2015, 13 Pages.
Ju, et al., "Active Learning on Sentiment Classification by Selecting Both Words and Documents", In Proceedings of the 13th Chinese Conference on Chinese Lexical Semantics, Jul. 6, 2012, 11 Pages.
Bespalov, "Sentiment Classification Based on Supervised Latent n-gram Analysis", In Proceedings of the 20th ACM International Conference on Information and Knowledge Management, Oct. 24, 2011, pp. 375-382.

(56) References Cited

OTHER PUBLICATIONS

Haffari, et al., "Active Learning for Statistical Phrase-Based Machine Translation", In Proceedings of Human Language Technologies: The 2009 Annual Conference of the North American Chapter of the Association for Computational Linguistics, NAACL, May 31, 2009, pp. 415-423.
Dave, et al., "Mining the Peanut Gallery: Opinion Extraction and Semantic Classification of Product Reviews", In Proceedings of the 12th International Conference on World Wide Web, May 20, 2003, pp. 519-528.
"International Search Report and Written Opinion Received for PCT Application No. PCT/US2014/046258", Mailed Date: Feb. 5, 2015, 11 Pages.
"International Search Report & Written Opinion Received for PCT Patent Application No. PCT/US2014/046257", Mailed Date: Feb. 5, 2015, 13 Pages.
Fogarty, et al., "CueFlik: Interactive Concept Learning in Image Search", In Proceedings of the SIGCHI Conference on Human Factors in Computing Systems, Apr. 6, 2008, pp. 29-38.
"International Search Report and Written Opinions Issued in PCT Application No. PCT/US2014/046256", Mailed Date: Jan. 29, 2015, 12 Pages.
Notice of Allowance dated Feb. 4, 2016 in U.S. Appl. No. 14/075,701, 8 pages.
Non-Final Office Action dated Mar. 4, 2016 in U.S. Appl. No. 14/075,713, 21 pages.
Arora, Shilpa, "Minimizing the Costs in Generalized Interactive Annotation Learning", Aug. 12, 2012.
Torrubia et al., "GRAPHs: A Learning Environment for Graph Algorithm Simulation Primed for Automatic Fuzzy Assessment".
Notice of Allowance dated Apr. 11, 2016 in U.S. Appl. No. 14/075,708 5 pages.
Non-Final Office Action dated Mar. 20, 2015 in U.S. Appl. No. 14/075,701, 17 pages.
Non-Final Office Action dated Jun. 19, 2015 in U.S. Appl. No. 14/075,679, 27 pages.
"International Preliminary Report on Patentability Issued in PCT Application No. PCT/US2014/046256", Mailed Date: Sep. 28, 2015, 7 Pages.
"International Preliminary Report on Patentability Issued in PCT Application No. PCT/US2014/046257", Mailed Date: Sep. 29, 2015, 8 Pages.
"International Preliminary Report on Patentability Issued in PCT Application No. PCT/US2014/045639", Mailed Date: Sep. 29, 2015, 9 Pages.
International Preliminary Report on Patentability Issued in PCT Application No. PCT/US2014/045638, Mailed Date: Sep. 28, 2015, 8 Pages.
Final Office Action dated Oct. 19, 2015 in U.S. Appl. No. 14/075,701, 7 pages.
Non-Final Office Action dated Dec. 9, 2015 in U.S. Appl. No. 14/075,708, 12 pages.
Final Office Action dated Dec. 24, 2015 in U.S. Appl. No. 14/075,679, 32 pages.
Notice of Allowance dated Jun. 17, 2016 in U.S. Appl. No. 14/075,713, 7 pages.
Non-Final Office Action dated Jul. 1, 2016 in U.S. Appl. No. 14/075,679, 32 pages.

\* cited by examiner

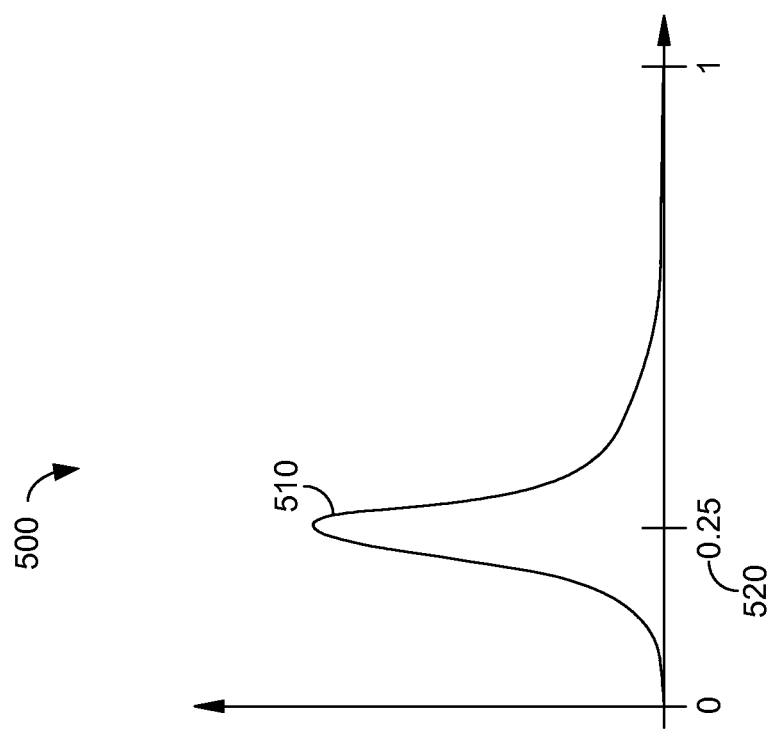
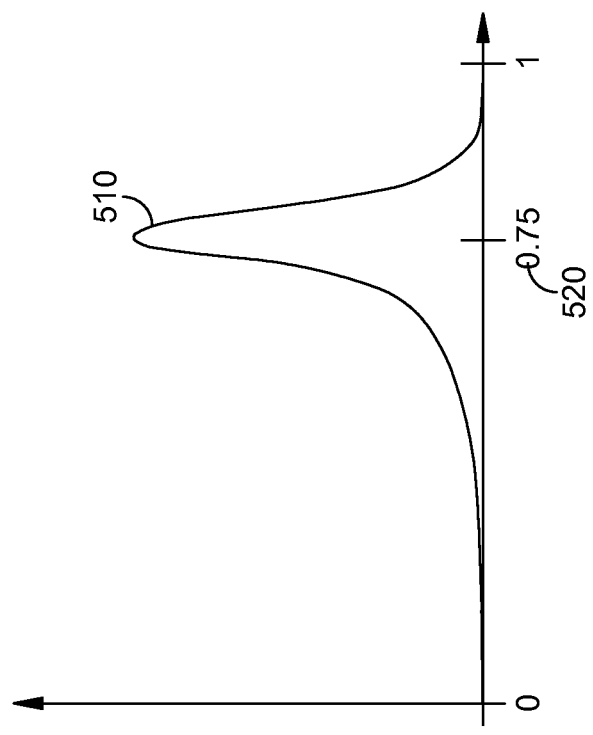
FIG. 5.

*FIG. 20.*

2100 — 02/21/07 "ICH" --- THIS WEEK'S DATA ON THE SAGGING REAL ESTATE MARKET LEAVES NO DOUBT THAT THE HOUSING BUBBLE IS QUICKLY CRASHING TO THE EARTH AND THAT HARD TIMES ARE ON THE WAY. "THE SLUMP IN HOME PRICES FROM THE END OF 2005 TO THE END OF 2006 WAS THE BIGGEST YEAR OVER YEAR DROP SINCE THE NATIONAL ASSOCIATION OF REALTORS STARTED KEEPING TRACK IN 1982." (NEW YORK TIMES) THE COMMERCE DEPT ANNOUNCED THAT THE CONSTRUCTION OF NEW HOMES FELL IN JANUARY BY A WHOPPING 14.3%. PRICES FELL IN HALF OF THE NATION'S MAJOR MARKETS AND "EXISTING HOME SALES DECLINED IN 40 STATES". ARIZONA, FLORIDA, CALIFORNIA, AND VIRGINIA HAVE SEEN PRECIPITOUS DROPS IN SALES. THE COMMERCE DEPARTMENT ALSO REPORTED THAT "THE NUMBER OF VACANT HOMES INCREASED BY 34% IN 2006 TO 2.1 MILLION AT THE END OF THE YEAR, NEARLY DOUBLE THE LONG-TERM VACANCY RATE." (MARKETWATCH)

FIG. 21.

MOST POPULAR

NEWS ARTICLES

- HUCKABEE LAUNCHES 'CHICK-FIL-A DAY'...
- SBC CHAPLAIN MINISTERS TO AURORA...
- FIRST-PERSON: OPT OUT OF THE GAY...
- BP LEDGER, JULY 23 EDITION — 2210
- LUTER'S VISIT TO RURAL CHURCH SPURS...
- AURORA CHURCH, 1 MILE FROM THEATER...
- WORSHIP LEADERSHIP TAUGHT TO HIGH...

TALK RADIO NEWS

- 🔊 SRN HOURLY NEWS
- 🔊 AM BUSINESS BRIEF 7-23-12 — 2212
- 🔊 SENATE-EXTENSIONS-2
- 🔊 ARTHUR BROOKS SPECIAL: WINNING THE...

ACTIVE LABELING FOR COMPUTER-HUMAN INTERACTIVE LEARNING

CROSS-REFERENCE TO RELATED APPLICATIONS

This application claims the benefit of U.S. Provisional Application No. 61/845,844, filed Jul. 12, 2013, entitled "Computer-Human Interactive Learning," and is related by subject matter to the following concurrently filed U.S. patent applications: U.S. application Ser. No. 14/075,708, entitled "Active Featuring in Computer-Human Interactive Learning," U.S. application Ser. No. 14/075,701, entitled "Feature Completion in Computer-Human Interactive Learning," U.S. application Ser. No. 14/075,679, entitled "Interactive Concept Editing in Computer-Human Interactive Learning," U.S. application Ser. No. 14/075,713, entitled "Interactive Entity Extraction in Computer-Human Interactive Learning". The entireties of the aforementioned applications are incorporated by reference herein.

BACKGROUND

A collection of data that is extremely large can be difficult to search and/or analyze. For example, in the case of the Web, a large fraction of the data is unstructured and value is locked in the data itself. It is not enough to store the web page of a service provider. For this information to be useful, it needs to be understood. A string of digits could be a model number, a bank account, or a phone number depending on context. For instance, in the context of a ski product, the string "Length: 170,175,180 cm" refers to 3 different ski lengths, not a ski length of 1700 kilometers. An correct interpretation of the data may result in useless information.

As an example, if a user enters the two words "mtor" and "stock" into an Internet search engine, and the results largely consist of web pages related to the drug mTor, the search engine has failed to recognize the search as a stock quote query. As another example, if a user enters the two words "seattle" and "sushi" into an Internet search engine, and the results largely consist of web pages related to hotels in Seattle, the search engine has failed to recognize the search as a restaurant query. While Internet search engines often do a reasonable job for head queries and documents, the accuracy quickly falls off in the tail because the information is not automatically understood by the search engines.

SUMMARY

Relevance of search results may be dramatically improved if queries and web pages could be automatically classified in useful categories, such as stock quotes or restaurants, and if these classification scores were used as relevance features. A thorough approach might require building a large number of classifiers, corresponding to the various types of information, activities, and products. The number of classifiers might be further multiplied by the number of language and the number of context (queries, web pages, ad snippets, product feeds, etc). It is desirable to bring computer accuracy in classification and schematization tasks to human levels, and to make it easy for ordinary people to create computer clones of themselves to perform such tasks at scale. As one example, a tool could be provided that is optimized to allow the creation of classifiers and schematizers on large data sets in a matter of hours. When the classifiers and schematizers are exercised on hundreds of millions of items, they may expose the value that is inherent to the data by adding usable metadata. Some applications of such a tool include search, advertising, and commerce.

The term schematization as used herein refers to the action of identifying and filling the fields of a Schema. For example, the schema of a recipe could be made of four fields: Title, Description, Ingredients, and Directions. The schematization of a web page for the recipe schema is the action of segmenting the page into one or more instances of the recipe schema and filling the fields accordingly.

Internet search engines have built hundreds of classifiers and entity extractors in an attempt to understand queries, web pages, and ads. Unfortunately, the efficacy of the current approaches is limited by the number of machine-learning experts, the number of programmers, and the complexity of the tasks.

Humans are excellent at extracting semantic meaning from data. This is especially true when the data was authored for them or by them. For instance, they can label (or segment) web pages, queries, or product feeds with ease. Unfortunately, humans are embarrassingly bad at doing these things at scale. At ten seconds per page, a lifetime will not be long enough for someone to sift through 100 million web pages to identify all the pages related to a given topic. Computers have the exact opposite capabilities. They are embarrassingly poor at semantic understanding and they are outstanding at doing things at scale. The philosophy behind the approach described herein is to build a highly interactive and intuitive system that leverages the strengths of both humans and computers. "Highly interactive" means that a label or a feature entered by a human should have an immediate effect on computation. Within seconds, it should impact which errors are made or avoided, which item should be labeled next, which feature the user should focus on, and which field of a schema should be added or removed. "Intuitive" means that users should understand the effect of their actions and how to achieve their goals without requiring machine learning or programming expertise. This approach requires cycles from both computers and humans. The cycles may be tightly intertwined through quick machine learning "revisions." Humans are guiding the computers and vice versa.

Another aspect of efficiency is the ability to build on other people's work. An important contributor to the explosion of the Web was the "view source" and copy-paste capability. In machine learning, the copy-paste capability comes from the fact that trained classifiers can be used as features to other classifiers. By creating a searchable and documented classifier repository, people are enabled to build on each other's work. This applies to both classifiers and schematizers.

BRIEF DESCRIPTION OF THE SEVERAL VIEWS OF THE DRAWINGS

FIG. 5 depicts exemplary sampling distributions in accordance with an embodiment of the present invention;

FIG. 20 depicts an exemplary screen shot of a system for binary labeling of addresses in accordance with an embodiment of the present invention;

FIG. 21 depicts an exemplary screen shot of a labeling review panel in accordance with an embodiment of the present invention;

FIG. 22 depicts an exemplary screen shot of a model prediction in a user-labeled document in accordance with an embodiment of the present invention; and FIG. 23 depicts an exemplary screen shot of a labeling tool in accordance with an embodiment of the present invention.

DETAILED DESCRIPTION

Figure 1:
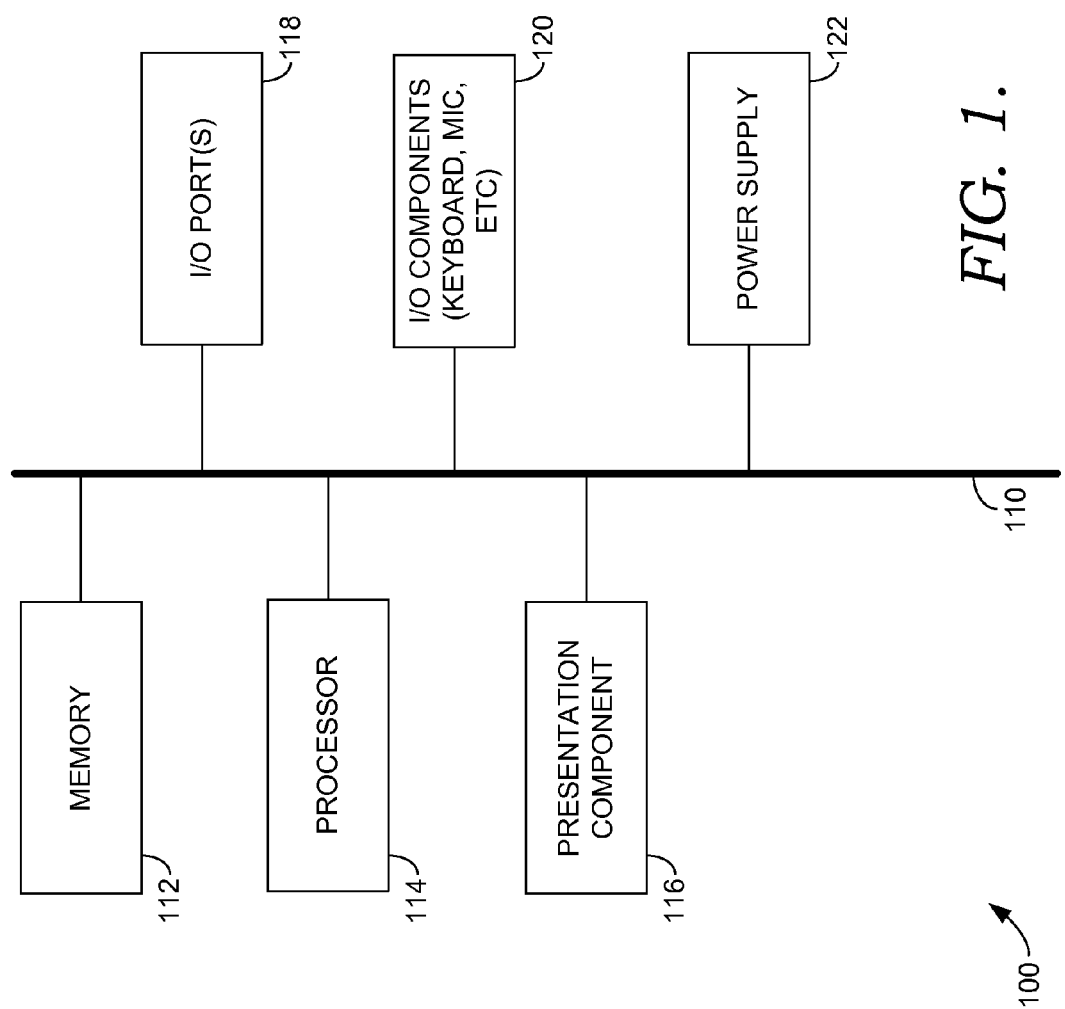
FIG. 1 depicts an exemplary operating environment in accordance with an embodiment of the present invention.

The approach described herein creates a number of engineering and scientific challenges, which will be discussed. The challenges include:
- Active labeling exploration
- Automatic regularization and cold start
- Scaling with the number of items and the number of classifiers
- Active featuring
- Segmentation and Schematization In a first aspect, computer-readable media embodying computer-usable instructions are provided for facilitating a method of interactively labeling training data for machine learning. A first set of data items is generated. The first set of data items is scored with a classifier, where the classifier scores each data item with a probability of being a positive or a negative example of a particular class of data items. From the first set of data items, a second set is selected of one or more data items that are classified as positive or negative examples based on the scoring. The second set of one or more data items is presented on a user interface, with an indication of whether the data items in the second set are classified as positive or negative examples of the particular class of data items. Via the user interface, one or more user-provided labels are received that identify one or more data items in the second set as positive or negative examples of the particular class of data items. The classifier is trained based on the user-provided labels.

The first set of data items may include data items randomly sampled from a larger set of data items. The data items randomly sampled from the larger set of data items may be initially automatically classified as negative examples of the particular class of data items. Prior to scoring the first set of data items with the classifier, the classifier may be pre-trained based on data items that are results of a user query.

Training the classifier may occur automatically and may be transparent to a user. Subsequent to training the classifier, each data item in the first set of data items may be rescored with a probability of being a positive example of the particular class of data items. Scores selected to optimize precision of the classifier may be greater than 0.5 on a scale of zero to one, while scores selected to optimize recall of the classifier may be less than 0.5 on a scale of zero to one. Additionally, the scores selected to optimize precision of the classifier may lie within a distribution around a probability of 0.75 on a scale of zero to one, while the scores selected to optimize recall of the classifier may lie within a distribution around a probability of 0.25 on a scale of zero to one.

The first set of data items may include data items randomly sampled from a larger set of data items. The data items randomly sampled from the larger set of data items may be initially unlabeled. Prior to scoring the first set of data items with the classifier, the classifier may be pre-trained based on data items that are results of a user query.

In a second aspect, computer-readable media embodying computer-usable instructions are provided for facilitating a method of interactively labeling training data for machine learning. A working set of data items is provided. A classifier is trained using a predefined set of positive or negative examples of a particular class of data items, where the classifier is trained to score a data item with a probability of being an example of the particular class of data item. The working set of data items is scored via the classifier. A sampled set of data items is generated by sampling the working set of data items within a selected range of data item scores, where the selected range of data item scores is selected to optimize either precision of the classifier or recall of the classifier. The sampled set of data items is presented within a user interface. Via the user interface, one or more user-provided labels are received for one or more of the presented data items, where the one or more user-provided labels identify the one or more of the presented data items as positive or negative examples of the class of data items. The classifier is retrained based on the one or more user-provided labels. Steps of presenting data items, receiving user-provided labels, and retraining the classifier are repeated, where the presenting of data items alternates between presenting sampled sets of data items and presenting data items based on results of a user-provided search query.

The predefined set of positive or negative examples may be based on search results of a search engine. Subsequent to retraining the classifier, the working set of data items may be scored with the retrained classifier.

The selected range of data item scores may be alternated between the range of data item scores selected to optimize the precision of the classifier and the range of data item scores selected to optimize the recall of the classifier. The range of data item scores selected to optimize the precision of the classifier may be within a range of scores having a probability of greater than 0.5 of being positive examples on a scale of zero to one. The range of data item scores selected to optimize the recall of the classifier may be within a range of scores having a probability of less than 0.5 of being positive examples on a scale of zero to one.

In a third aspect, computer-readable media embodying computer-usable instructions are provided for facilitating a method of interactively labeling training data for machine learning. A first set of data items is generated. Data items are identified, from within the first set of data items, as belonging to a particular class of data items, based on a user search query. A classifier is trained based at least on the data items that were identified as belonging to the particular class of data items. The first set of data items is scored with the classifier, where the classifier scores each data item with a probability of being a positive example of the particular class of data items. From the first set of data items, a second set of one or more data items is selected based on the scoring, where the one or more data items in the second set are selected (A) to improve precision of the classifier, where the selected one or more data items have scores that lie within a distribution around a probability of 0.75 on a scale of zero to one of being a positive example of the particular class of data items, or (B) to improve recall of the classifier, where the selected one or more data items have scores that lie within a distribution around a probability of 0.25 on a scale of zero to one of being a positive example of the particular class of data items. The second set of one or more data items is presented on a user interface. Via the user interface, one or more user-provided labels are received that identify one or more of the data items in the second set as positive or negative examples of the particular class of data items, where the one or more user-provided labels are received by means of one or more of a text entry field, a checkbox, or a cursor-activated selection. The classifier is retrained based on the one or more user-provided labels. Steps of (A) presenting data items, (B) receiving user-provided labels, and (C) retraining the classifier are repeated, where the presenting of data items alternates between presenting data items based on the scoring and presenting data items based on results of a user-provided search query, and where upon retraining the classifier, the first set of data items is scored with the retrained classifier.

One or more of retraining the classifier and scoring the first set of data items may occur automatically while still receiving user-provided labels via the user interface. One or more of retraining the classifier and scoring the first set of data items may be transparent to a user. Selecting the second set of one or more data items may alternate between phases of selecting to improve the precision of the classifier and selecting to improve the recall of the classifier.

Having briefly described an overview of some aspects of the invention, an exemplary operating environment suitable for use in implementing some aspects of the invention is described below.

Referring initially to FIG. 1 in particular, an exemplary operating environment for implementing some embodiments of the present invention is shown and designated generally as computing device 100. Computing device 100 is but one example of a suitable computing environment and is not intended to suggest any limitation as to the scope of use or functionality of invention embodiments. Neither should the computing-environment 100 be interpreted as having any dependency or requirement relating to any one or combination of components illustrated.

Some embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Some embodiments of the invention may be practiced in a variety of system configurations, including hand-held devices, consumer electronics, general-purpose computers, more specialty computing devices, etc. Some embodiments of the invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with some embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

I. The ALE (Active Labeling Exploration) Challenge

Figure 2:
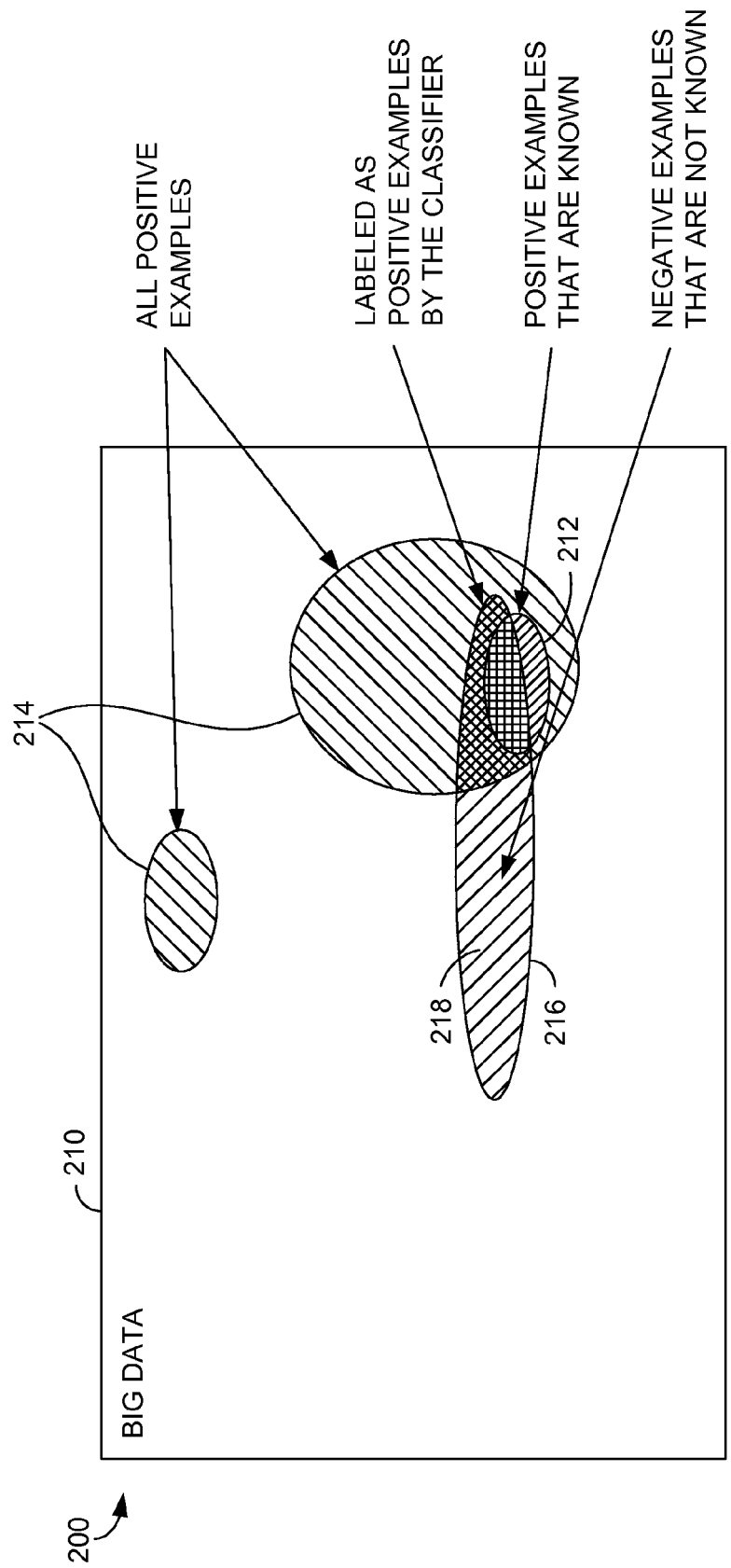
FIG. 2 depicts an exemplary data set that represents a corpus of searchable data items in accordance with an embodiment of the present invention.

Building a classifier (or a schematizer) on a very large data set presents a unique challenge: From what distribution should the training set be drawn? Randomly selecting items from the true distribution may not yield any positive examples after observing a million samples. A biased sampling could yield more positives but it may be so uncharacteristic of the true distribution that the resulting classifier is unlikely to perform well when deployed into the real world. Consider a fictitious scenario where the task is to build a classifier to find cooking recipe pages over the Web. A random selection of pages is unlikely to return any recipes (even after viewing one million pages). A search for the term "recipe" would return a biased sample of recipes (it would find "Numerical Recipes" and miss "Cooking Adventures"). The traditional development in four phases: data collection, labeling, training and featuring and tuning, and deploying, is suboptimal and can lead to disasters. For instance, one may discover during deployment that the classifier misses many of the ethnic recipes and returns cement mixing pages as cooking recipes. The classifier is not at fault. The problem lies with the sampling and the problem formulation. A classifier trained with a uniform sampling will quickly learn that the constant answer "not a recipe" is good enough for that distribution. A clever operator may tweak the distribution to build a more useful classifier, but this introduces biases that betray the ignorance of the operator. The operator, for instance, may have no knowledge of African recipes until the system is deployed and users start complaining. From the operator's point of view, the world looks like the picture in FIG. 2. FIG. 2 illustrates an exemplary data set 210 ("BIG DATA") that represents a corpus of data to be searched. Region 212 (within the entire ellipse) represents the positive examples the operator is aware of. Regions 214 (the entire region within both ellipses) represents all positive examples within the corpus 210. Region 216 (within the entire ellipse) represents examples, which the classifier labels as positive examples. Region 218 (the relative complement of region 214 in region 216, i.e., the portion of region 216 not contained in region 214) represents examples that are mislabeled as positive by the classifier (false positives).

The question is, how can a system be deployed that will perform well on data that one does not know exists? One observation is that the operator can be ignorant of the distribution as long as he/she can correctly classify items on demand. The Active Labeling Exploration (ALE) algorithm is based on this observation. Labeling is the process of classifying data or patterns of data as belonging to a particular class, e.g., labeling "321 Market Street" as being part of an address. Active labeling exploration is performed using a large set of unlabeled data (data on which the labeling process has not yet been performed), drawn from the true distribution. After each label (or few labels), a classifier is retrained with the new label, and the large unlabeled data set (e.g., tens or hundreds of millions of unlabeled patterns) is rescored. The system then selects which patterns to label next according to their scores. For this approach to work, one needs to solve the cold start problem (i.e., find "seeds" of positives).

In one aspect, an integrated interactive labeling system includes a labeling component, a training component, a scoring component, a sampling component, and a search engine component. The integrated interactive labeling system may also include one or more other features, such as where the search engine is based on keyword search; the search engine uses feature scores as a filter; training and scoring are done automatically without being triggered by the operator; or where scoring and sampling can be done asynchronously.

In another aspect, an integrated interactive labeling system includes a labeling component, a training component, a scoring component, and a sampling component, where labeling can be can offloaded as a service and labeling quality is measured by generalization gains. The integrated interactive labeling system may also include other features, such as where multi-class labeling consists of multiple binary labeling; or where multiple samples are labeled approximately simultaneously using system generated pre-labels, and a verification mode is included in the system to review approximate labels sorted by confidence.

Consider the example of building a classifier for web pages (the methods would work for queries, images, or other types). Assume that a user has access to 100 million web pages, referred to herein as the working set. These web pages may be biased by importance (e.g., high page rank) but they are not biased by the nature of the classifiers intended to be built. These pages are neither labeled nor ordered. Assume there is a small and biased set of positive and negative examples and that a classifier can be trained with these examples with reasonable generalization performance. (The "cold start" challenge for training classifiers with small data sets with good generalization performance is discussed below.) The result of training is called a "scorer." Scorers have version numbers that reflect the set they were trained on. As soon as the first scorer is available, "scoring" of the working set begins. This process requires a large amount of computing power. As a result of scoring, the items can be ordered by their probability of being an "X," where "X" is a class of the classifier to be built, i.e., where "X" is a positive example of the feature, or label.

Figure 3:
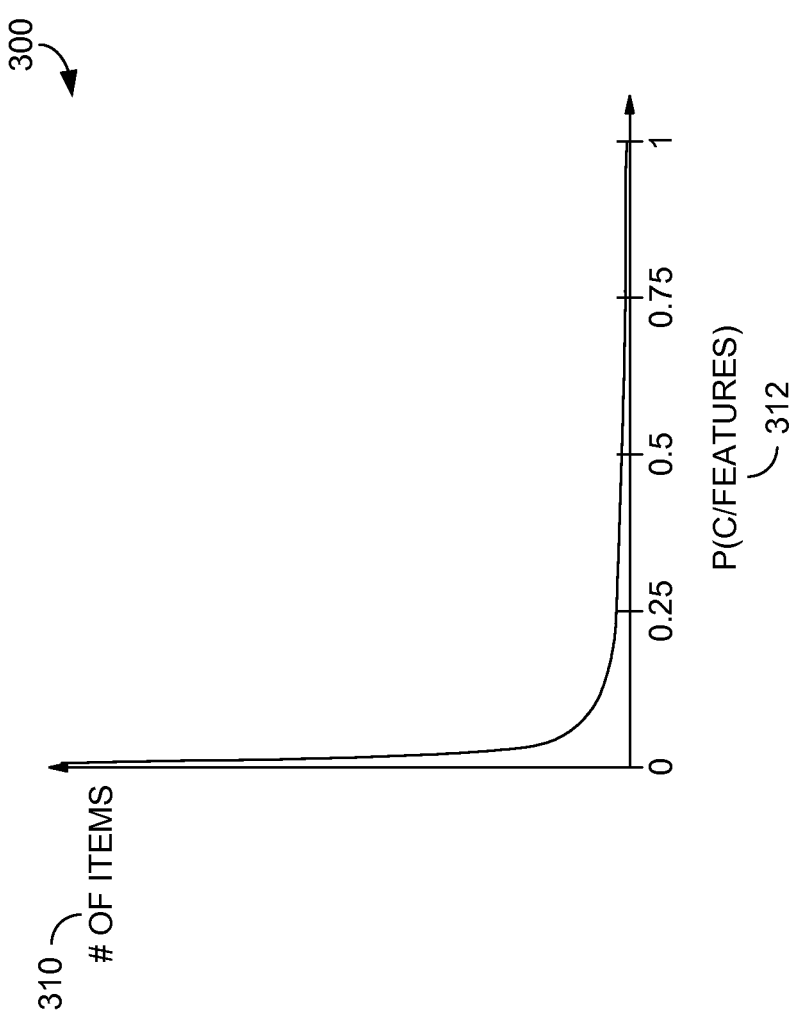
FIG. 3 depicts an exemplary probability plot in accordance with an embodiment of the present invention.

FIG. 3 illustrates an exemplary plot 300 of the number of items 310 versus the probability P 312 that an item is an "X." As depicted in FIG. 3, if the working set is sampled based on the scores produced by a given scorer, the following observations can be made:

Labeling items around P=0 yields little value. There are many of these items and it is already known that they are not of the desired class.

Labeling items around P=1 yields a bit more value but the items are very scarce. It takes a long time to find them (the whole working set may need to be scored) and one has to dip into the lower probabilities to find items to label. This assumes a distribution like the one shown above (reverse P=0 and P=1 if the distribution is lopsided in the other direction).

Labeling around P=0.5 can sometimes be costly and can yield little information if the class boundary is inherently ambiguous.

Labeling around P=0.75 finds a false positive in every 4 items. Labeling in this region improves precision.

Labeling around P=0.25 finds a false negative in every 4 items. Labeling in this region improves recall.

FIG. 5 illustrates examples of sampling distribution around the probability of 0.25 and 0.75 respectively. To sample around 0.75, for instance, one could put all the examples in 1000 buckets according to their scores. The first bucket would have all the examples with scores between 0 and 0.001, the next bucket all the examples with scores between 0.001 and 0.002, and so on. Each bucket may then be assigned a probability of sampling, such as for instance, the right side of FIG. 5. Examples with this distribution would result in a 25% rate of false positives.

The objective of ALE (Active Labeling Exploration) is to replace the long and arduous "data-collection, labeling, training and tuning, deploying" cycle by an interactive loop that runs in minutes or seconds.

ALE has three processes that run simultaneously. These are Sampling+Labeling, Training, and Scoring, as illustrated in Table 1:

TABLE 1

The 3 parallel ALE processes (sampling, training, and scoring)

| Filtering + Labeling | Training | Scoring |
| --- | --- | --- |
| Repeat:<br>Improve precision:<br>Filter working set for items with scores in the neighborhood of P = 0.75 starting with newest scores.<br>Label these items.<br>Improve Recall:<br>Filter working set for items with scores in the neighborhood of P = 0.25 starting with newest scores.<br>Label these items. | Repeat:<br>If number of labels has increased by factor f since last training then:<br>Randomly split working set into Train/Validation/Test sets.<br>Train n Classifiers $C_i$ on train set.<br>Pick best classifier $C_i$ on validation set, produce Scorer $S_t$, and report Test error.<br>else:<br>Wait on new label. | Repeat:<br>If all items have been scored by latest scorer then:<br>Wait on new scorer else:<br>Find an item whose latest score is oldest.<br>Score the item with newest scorer. |

The first process (Sampling+Labeling) is driven by the user. The user's task is to improve precision and recall by labeling items selected by the system. The user is oblivious to the training and scoring processes. From the user's point of view, the system simply chooses good patterns to label and the classifier increases its generalization capabilities with respect to an increasingly diverse set. The user may choose to label for precision or for recall, or that choice could be made by the system.

What happens behind the scenes is slightly more complex. When enough new labels have been collected, a family of classifiers (of different complexities) is retrained. The best classifier of the family becomes the latest scorer. Scoring is an intensive computation process. If the scoring from the previous scorer was not completed by the scoring process, the ongoing scoring is interrupted and the new scorer continues scoring items starting with the oldest scores first. Depending on the task and the size of the data, scoring could take minutes or hours. However, it is desirable that an operator should not have to wait for the querying process: At any point of time, every item should have a score (the scores may come from scorers with different versions), and all the scores should reside in memory. Since the querying is done by an independent process (distributed on several machines), a full linear scan over all the scores should be done in sub-second time (assuming one billion items and 100 machines). Training and scoring are run asynchronously by independent processes so they do not impact the querying response time. The quality of selection of which item should be labeled next degrades if too few items have been re-scored since the last scorer was produced. The ALE information flow is summarized in FIG. 4. User inputs are denoted as "dashed" arrows. The system parameters are denoted as dotted arrows. The data 416 is uploaded once. The labels 418 are supplied by the user and provide semantic meaning to tokens that are identified by the user during training.

Given new training data 420 and corresponding labels 418, the training 422 produces a new scorer 424. The new scorer produces new scores 426 which, after filtering 428, produce new training data 420. The filters 432 may include dictionaries, discussed below, and may also include previously created classifiers.

The cycle continues until the operator decides that the scorer's performance improvements are no longer worth the labeling costs. The result is a new classifier 430.

Figure 4:
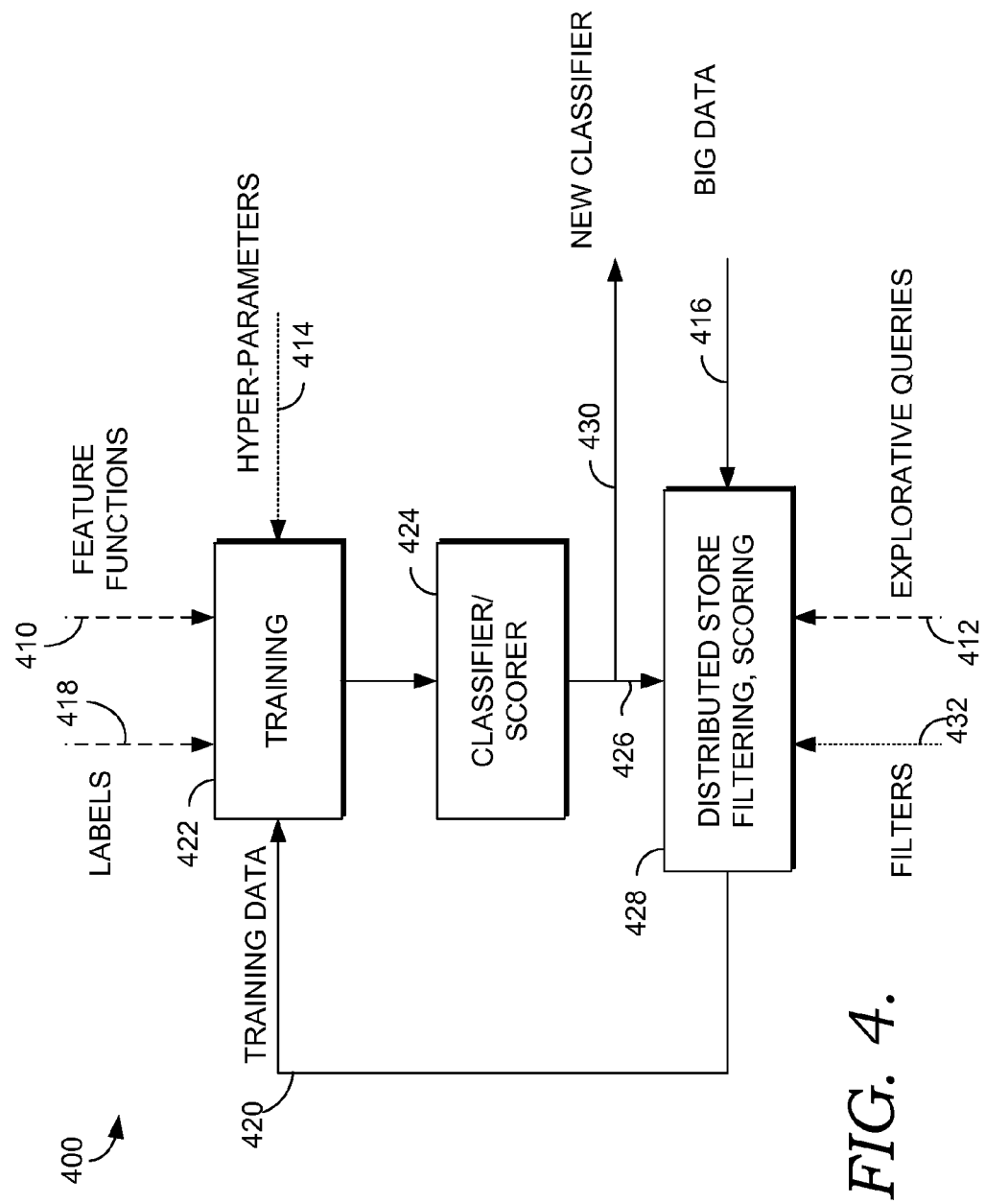
FIG. 4 depicts an exemplary Active Labeling Exploration information flow in accordance with an embodiment of the present invention.

The "Feature Functions" input 410 depicted in FIG. 4 is discussed below in the discussion of Active Featuring. The purpose of the "Explorative Queries" input 412 depicted in FIG. 4 is for the cold start problem and for exploration (repetitive cold starts) as described below with regard to cold start. The system's "Hyper-Parameters" input 414 has to do with automatic regularization and is also discussed below.

Coming back to FIG. 3, in one embodiment, a system samples by filtering data around P=0.75 to improve precision and around P=0.25 to improve recall. These thresholds are adjustable. As previously mentioned, FIG. 5 depicts exemplary plots 500 of sampling distributions 510 as a function of score 520. This alternating strategy has proven more useful than, for example, sampling uniformly for all the scores between 0 and 1.

A. Interactive Problem Definition Refinements

The semantic meaning of the classification may change as a function of exploration. ALE provides the flexibility to evolve the task while it is being performed. For instance, one may start with the goal of building a "Home page" classifier. But as the system discovers candidates such as social media pages, obituaries, events, and other pages centered on a single individual during exploration, the definition of what is a home page needs to be refined. This is easily done interactively while running the ALE loop.

Building a classifier that performs well on data that is not known about when the task is started seems like an elusive goal. However, experience has shown that humans are trustworthy when it comes to labeling, even though they are ignorant when it comes to estimating the shape of a distribution. If humans are paired with a system that cleverly explores the distribution via exploration, very robust systems can be built. The ALE algorithm leverages both the scaling capability of computers and the human ability to provide semantic meaning through labeling.

Active learning has its challenges. Potential problems typically encountered in active learning algorithms include brittleness of uncertainty sampling, model selection (adapting capacity to the available data), exploration, active featuring, disjunctive classes, and cold start. The ALE system described herein does not have the brittleness of uncertainty sampling because it focuses away from the decision boundary. Automatic regularization (model selection) and cold start are discussed below. In a later section, active featuring and how it complements active labeling is described.

1. Lopsided Data and Reachability

Active learning is often viewed as a means to increase the efficiency of labeling on a fixed size set with a fixed number of features. In a typical machine-learning setting, the goal is to improve accuracy. The emphasis described herein is different in that it pertains to providing an exploration tool that will help the user add labels and features to produce a valuable classifier or schema extractor. With Big Data with lopsided classes, only a small fraction of the data will ever be observed and some nuggets of positive or negative may never be discovered. When they are discovered, one may as well assume that the distribution has changed. When the distribution is discovered on the fly, the basic assumptions on which machine learning relies—IID sampling for train and test set—are violated. If the number of positives is T and the size of the data is N, one cannot estimate recall without labeling a number of patterns that is proportional to N/T. If T<<N, one may never know what the recall is. Learning convergence on the overall distribution cannot be proven.

However, the overall classifier progress can be measured by means of a measure called reachability. As defined herein, reachability is the number of positives that are classified as positive by the classifier. Let S be the set of positives estimated by the classifier (depicted in ellipse 216 in FIG. 2):

$$S=\{d:\text{classifier output is positive}\}.$$

Let T be the set of true positives within the total data set (depicted in ellipses 214 in FIG. 2):

$$T=\{d:d \text{ is positive}\}.$$

The reachability (R) is then the number of true positives within the set of positive estimated by the classifier (depicted as the intersection of the ellipses 216 and 214 in FIG. 2):

$$R=|S \cap T|.$$

Reachability can be represented in terms of either recall or precision, as $\rho=r|T|=\phi|S|$, where r is the recall of the classifier and $\phi$ is the precision of the classifier. However, recall cannot be computed directly in this case as the set T is not known. However, because T is fixed, reachability is directly proportional to recall. To increase recall of the classifier, one can instead increase reachability. The goals of a classifier-building task can thus be formulated in terms of reachability and precision.

For example, let $\phi$ be the precision in S, i.e., the number of true positives inside S (the intersection of the ellipses 216 and 214 in FIG. 2) divided by the size of S:

$$\varphi = \frac{|S \cap T|}{|S|}$$

and let r be the recall in S, or the number of true positives inside S divided by the total number of true positives within the data set:

$$r = \frac{|S \cap T|}{|T|}.$$

One can compute an estimate $\phi'$ of $\phi$ by labeling a random subset (or all) of the examples in S. The number $\phi'|S|$ estimates the number of positives found by the system. The recall $\phi'|S|$ cannot be computed because T is not known. However, using an estimate $\phi'$ of precision and an estimate $\phi'|S|$ that is proportional to recall, one can track the forward overall progress of the system. At a fixed (or non-decreasing) precision, increasing the reachability increases the recall. Increasing the precision at a fixed (or non-decreasing) reachability also increases precision for a constant (or increasing) recall.

There are other criteria that can also be used to measure progress. For instance, if most misclassified patterns that are discovered by exploration are ambiguous, then the classifier is doing well on precision; if most misclassified patterns are easily handled by adding features, then the classifier is exploring well.

a. Estimating Reachability

Reachability can be estimated based on the labeling strategy and the score distribution of the unlabeled examples. As an example of this, let L be the set of labels and U the universe, and let S be the patterns with score $\geq \tau$, a threshold that one sets (the entire region in ellipse 216 in FIG. 2). Suppose the labeling strategy is defined by sampling according to a probability distribution conditioned on the score of the sample, i.e., one can compute for each document $w \in U$, the probability of sampling $p_s=\Pr[w \in L | \text{score}(w)=s]$.

Let $$n_s=|T \cap \{w:\text{score}(w)=s\}|$$

be the number of positives with score s and let $$m_s=|L \cap T \cap \{w:\text{score}(w)=s\}|$$

be the number of labeled positives with score s. The expectation for the number of labeled positives can be written as:

$$E[m_s]=n_s p_s.$$

Thus, $$n_s = \frac{E[m_s]}{p_s}$$

and since $\rho=|T \cap S|=\Sigma_{s \geq \tau} n_s$, the reachability can be estimated by the following:

$$\rho = \sum_{s \geq \tau} \frac{E[m_s]}{p_s} = E\left[\sum_{s \geq \tau} \frac{m_s}{p_s}\right]$$

The expectation can be estimated, for instance, by sub-sampling the label set.

Note: The estimate above can be done in many different ways by covering the interval [$\tau$ . . . 1] by disjoint intervals. Not all decompositions are equal in that some will have smaller error bars in the estimation.

With large data sets with lopsided distribution, improving accuracy while assuming a uniformly sampled fixed distribution quickly reaches a state of diminishing returns. A more interesting problem is to view the distribution as a moving target and involve the operator in tracking it down. From a machine-learning theory standpoint, the two problems are very different. Both engineering challenges (scaling, process, user experience (UX)) and scientific challenges (exploration metrics, sampling strategies, revision training, among others) are encountered. The ALE algorithm addresses these challenges.

II. The ARCS (Automatic Regularization and Cold Start) Challenge

To work well, the ALE algorithm needs a few labels, a few features, and good generalization properties of the early classifiers. This requires solving two problems. First, both positive and negative examples are needed, as well as startup features. This is the cold start problem. It is difficult because in a lopsided distribution, the positive (or the negative) examples might be extremely rare. For instance, if the positives are less than one in a million, finding enough of them to get the classifier going could be time-consuming (using random sampling). Without features or a working classifier, the ALE algorithm is of no help. The second problem is automatic regularization. With only a few labels, the classifier needs to be heavily regularized to avoid over-training. Regularization needs to be adjusted automatically so that the complexity of the algorithm can be matched to the increasing number of labels. This could be called the "warm start" problem.

A. The Cold Start

The problem can be summarized as follows: Assume that a large database of generic examples of the same type T has been entered in the system, how does one distinguish them? To enable training, features (that distinguish the items from each other) are needed, and a means to find positive and negative examples is needed. This problem is addressed by providing modules that implement the IScorer <T> interface. The IScorer modules may be provided by the system or entered by an engineer (e.g., when the data is collected). A module that implements that interface can compute the function T→ScoreType, where ScoreType is a type understood by the system (e.g., a floating point number between 0 and 1) for all items in the database. The scores can then be computed on some or all the items, and be queried and sorted. This allows the operator to find the first examples of each class and to label them as such. IScorer modules can also be used as the first features of a classifier. The next cycle occurs through the ALE algorithm.

If the data type is known a-priori, one can provide some standard system features that are specific to the data. The data-specific features can even accept parameters from the operator. Such features can then be used to distinguish, filter, label, or explore the data. For instance, if the examples are web pages, a system IScorer <WebPageType> could be a module that computes the relevance of a web page with respect to a query. The query is the parameter of the feature and is provided by the operator. Once the query parameter is fixed, the module could run under the ALE algorithm, thus evaluating every web page for its relevance. Such implementation is very inefficient compared to a reverse index, but it has the advantage of being generic. Regardless of the data type T the operator can provide the following:

A collection of N items of type T.
Modules (e.g., DLLs) that support the IScorer <T> interface.

The system does not need to understand the type T. The module could be parameterized outside the system (the provided dll contains the query terms), or the system could provide means for the operator to set the parameters at run time (e.g., a query).

Given the ubiquitous need for text understanding, both a generic API (where the operator can input a module that implements IScorer <T>) and built-in text features may be supported.

The definition of a feature may be confusing. The strict definition of a feature is a function whose output is used as the input of a classifier (or schematizer). Since a query is a form of classifier, a feature can be used for querying. Since the output of a classifier can be used as the input of another classifier, classifiers are themselves features. Features come from three places: built-in, operator-generated (without training), and trained classifiers. Some built-in features can be parameterized by the operator (a hybrid). Some built-in features may only be available for certain data types.

For text features to be enabled, the type T of the items entered in the database must support the IWordCollection interface. This interface allows the automatic build of a reverse index, and enables an efficient query-like interface to the database. For databases that support this interface, the cold start problem is pretty much solved. When this is not enough, and for databases that do not support the IWordCollection, the operator can provide additional modules that support the IScorer <T> interface. Once the system has IScorer <T> modules that are powerful enough to effectively distinguish the items of the database, the cold start problem has been solved.

B. AR (Automatic Regularization)

In interactive machine learning, the number of labels and features varies over time, as labels and features are added. A classifier may be (re)trained successively with example counts of 10, 20, 40, 80, 160, as the labels are coming in. For each training session, the optimal regularization will be different. It is desirable that the system perform well even with very few examples because finding good examples to label next will help the system learn more quickly. Since this will in turn enable the system to select which examples to label next, the effect on generalization is compounded (each iteration increases the value of subsequent labels). The problem of performing well in the presence of few labels is referred to herein as the "warm start" problem.

Requiring the operator to manually adjust regularization introduces complexity and is unnecessary. For operators that are not familiar with machine learning, the concept of regularization is hopelessly confusing. Fortunately, given labels and sufficient computational power, one can train a small family of classifiers of different complexity and use cross validation to determine which one generalizes the best.

For instance, if the task is to recognize handwritten digits, one could have two classifiers: a linear classifier and a state-of-the-art, four-layer convolutional neural network (both take pixels as input and output a probability for each class). The second classifier does much better than the first when trained with 1000 examples per class, but it is comparatively terrible at scoring with fewer than 30 examples per class. The linear classifier produces a very decent classifier and scorer when trained with as few as one or two examples per class. It is remarkably easy to automatically decide which classifier to use if they are both trained and measured with cross validation. At the point where there are enough examples for both classifiers to be comparable, the operator cannot easily distinguish which classifier is better (they have the same generalization performance). This means that with proper timing, switching between classifiers with different regularization can be done transparently, automatically, and without the operator ever knowing.

Regularization is interpreted herein as constraining the family of learnable functions to a subset of functions more likely to generalize. This can be done at the output level, at the architecture level, or at the input level:

Output (labels generation): By generating or altering labels, one can control what functions are realizable through training. This constraint can be used for regularization. For instance, instead of training on the set for which one has labels, a new set is generated on which one provides labels using a-priori knowledge. For web pages, this could be done expanding the positive (respectively the negative) examples by using the click graph to find similar pages and assigning them the same labels. For images, this could be done by applying a transformation (e.g., rotation or translation) and assuming that the resulting images have the same labels as the image they originated from. In both cases, the size of the set and the intensity of the distortion can be adjusted. Each regularization value defines a classifier. The winning classifier is picked using cross validation.

Architecture: One can affect the family of learnable functions by changing the learning algorithms (e.g., SVM, neural net, decision trees) or the capacity parameters (weight decays, training time, number of hidden units).

Input: One can change the input features. By changing the discriminative power of the input features, different levels of regularization can be achieved. For instance, one may have a set of system features that compute various useful attributes of a web page. By controlling when these input features are available, one can automatically adjust capacity and regularization. For an example of capacity induced by an input feature(s), consider a feature (or set of features) that measures the Log of the size of a web page. That feature may have useful information but it would be a mistake to use it too early. When the number of labeled examples is low, every example may have a different length and it might be enough capacity to perfectly classify the positive and negative examples on the training set. The resulting scorer would then suggest labeling pages based on the length of the page which is likely to be a waste of time. By carefully selecting input features one can construct a family of classifiers with different regularization properties. This could be viewed as an example of "anti-regularization." Capacity is increased selectively.

III. The Scaling Challenge

The ALE algorithm scales in two different directions. One is the ability to query, score, and train as a function of the number of items. The second is the ability to scale with the number of classifiers and schematizers provided by contributors. An exemplary summary of this is illustrated in FIG. 6 and is generally referred to as scaling 600.

A. Scaling with the Number of Items

Figure 6:
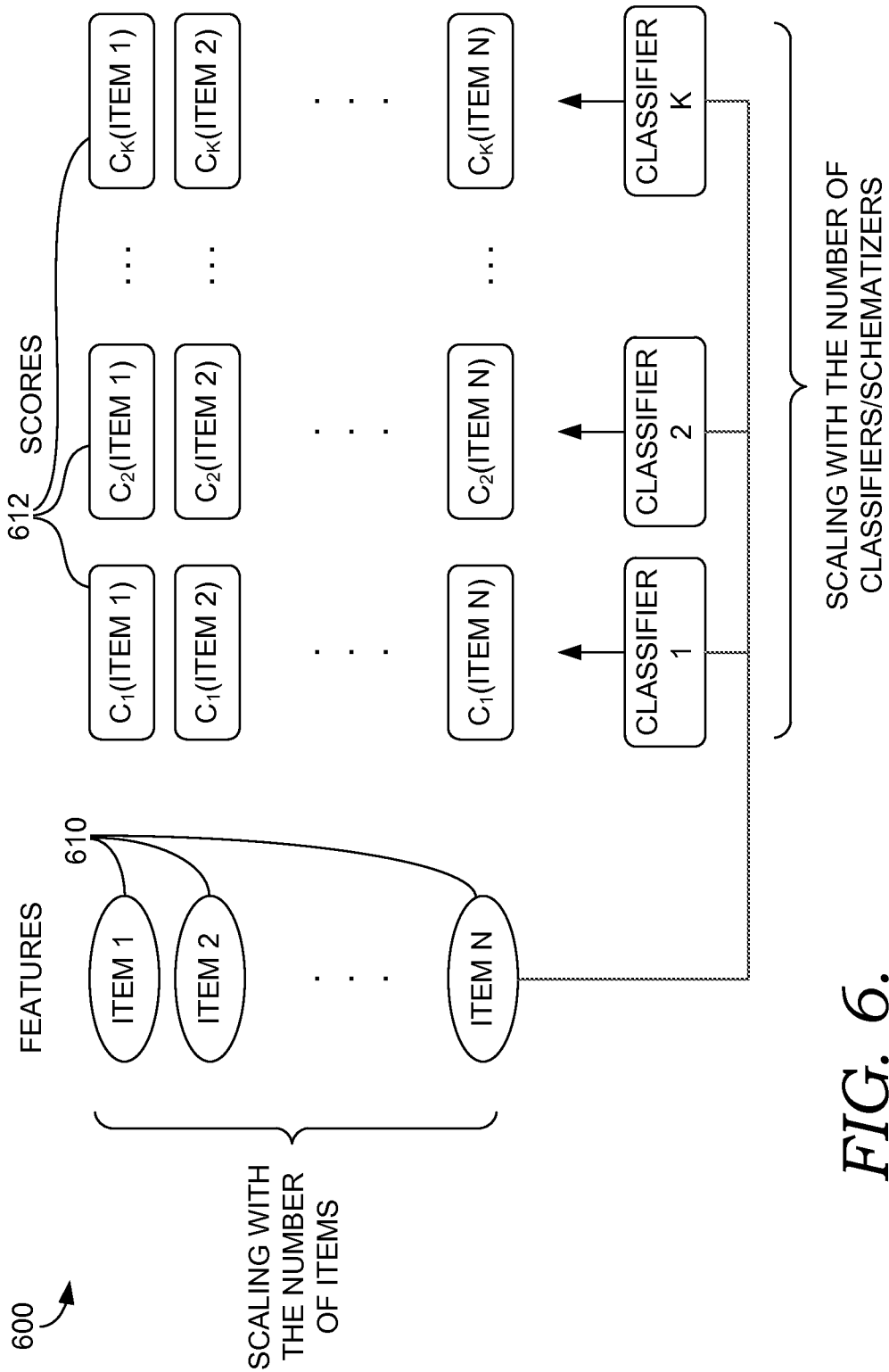
FIG. 6 depicts a summary of exemplary Active Labeling Exploration scaling in accordance with an embodiment of the present invention.

The leftmost column in FIG. 6 depicts a number of features as items 610 ("ITEM 1" ... ITEM n"), which represent scaling with the number of items. Scaling with the number of items is a computational challenge. For ALE to be effective, three kinds of computations are required: training, scoring, and querying. Training can be done on a single machine—a linear classifier can train on 1 M+examples in a few seconds—or on multiple machines if multiple classifiers are trained simultaneously. Scoring is an inherently parallel task that can be distributed on multiple machines. The typical "sampling" is most often a filtering operation by scores, e.g., returns items whose probability of being X is between 0.70 and 0.80. Such filtering can be done with map-reduce but it should be very responsive because the user of the system will be waiting for the next item to label. This suggests a distributed in-memory column store optimized for the filtering operations.

B. Scaling with the Number of Classifiers

The three rightmost columns in FIG. 6 depict a number of classifiers 612 ("$C_1$" ... "$C_2$") that are utilized to score each of the items 610. Scaling with the number of classifiers or schematizers is a human-computer interaction (HCI) challenge. A machine-learning expert can build dozens of classifiers. Recruiting and retaining 100 machine-learning experts is difficult and expensive. Building 10,000 classifiers is impractical without changing the game. ALE allows a company to quickly build 10,000+ highly performing classifiers and/or schematizers.

To build classifiers at scale, three things are utilized:
  Accessibility: Reduce the expertise needed to build classifiers. No machine-learning background is necessary.
  Motivation: Make building classifiers easy, interesting, and magical.
  Efficiency: Vastly improve the efficiency of building classifiers in terms of operator's time.

Accessibility creates a large pool of people capable of building classifiers. Motivation increases the motivation of people in that pool to build classifiers. Efficiency multiplies the productivity. Motivation is described last below, because it encompasses the other two from a UX perspective.

1. Accessibility

Ordinary people do not understand machine learning. If the system requires machine learning expertise, then the number of available machine learning experts becomes a bottleneck. To circumvent this bottleneck, the interface may be restricted to only a few actions that require no engineering skills. The interface has guardrails that discourage behaviors that are not compatible with improving generalization. The actions of the operator may be limited to the following:
  Creating a new Classifier/Schematizer task
  Labeling
  Featuring:
    Creating a dictionary of terms
    Finding and selecting features from existing classifiers.

Note that "training," "scoring," and "regularizing" are not standard actions. These computations happen implicitly and transparently. As a result of these activities, the operator will observe a change in the types of errors presented to him or her. This is both an effect of improving precision, and what will contribute to the next precision improvement. Similarly, new patterns will be extracted for labeling. This is both an effect of improving recall (and in some case precision), and what will contribute to the next recall (respectively precision) improvement.

There will be some progress metrics like precision or estimators of the number of positive or negative examples found by the system, or the rate of improvement around the classifier's class boundaries. Metrics will be displayed with errors to encourage a data-focused approach to training. The use of automatic features is limited to encourage the operator to provide valuable concepts and labels instead. To explicitly discourage over-training, the test set is constantly recycled so there are no benefits to fixing a single error, but rather benefits manifest by fixing categories of errors. The operator may have no machine learning background to start with, but the UX is optimized to train him/her to improve generalization.

2. Efficiency

The efficiency could be measured in how much energy it takes for an operator to create a classifier with a given precision and recall. This definition can be problematic because one does not know what recall is (on a large data set with few positives, it may be very difficult to know how many positives there are). Even the class definition may not be well defined until some examples are discovered: Is an obituary a home page? Is a cocktail mix a cooking recipe? These questions are likely to arise only during the building of a classifier. Two assumptions are made: First, assume that it is possible to compare two classifiers and unambiguously determine that one is better than the other (better recall, better precision). Second, assume that improving a classifier may include having multiple "revision cycles."

A revision cycle is defined as an operator input that is a function of a computation, followed by a computation that is a function of the operator's last input. At each cycle, the problem is revised in at least one of three ways: the class definition changes, the distribution of examples to label changes, or the input space changes. These quick and targeted revisions of the problem are different from traditional machine learning. In traditional machine learning, the distribution is usually constant (optimization of the features on a fixed training set). Even in active learning papers, progress is measured on a fixed distribution: the emphasis is on reducing the number of labels to achieve a given error rate on a fixed distribution, rather than exploring and discovering the distribution. A true cycle (or a revision) typically takes months. In contrast, the ability to have tens or hundreds of cycles in a single day radically changes the efficiency of classifier building. The cycle effects are compounded. For instance, when a classifier becomes better as a result of a cycle, it becomes better at finding positive or false positive for the next cycle.

In the system described herein, cycles come in three flavors: active labeling exploration (ALE), active featuring, and dictionary refining. The first, ALE, has been discussed in a previous section. Active featuring is the activity of creating a feature for the purpose of allowing a classifier to discriminate between positive (respectively negative) and false positive (respectively false negative). It is akin to curing the classifier of "color blindness." Active featuring is the object of the next section. The last form of cycle is specific to the definition of a concept. A concept is defined herein as a group of words, or a dictionary, that defines a concept when the words are viewed as a group (e.g., the concept of car brand is defined by the list of words "Honda," "Ford," "Peugeot," and so forth). The cycle of dictionary refinement results from an operator giving positive and negative examples, and computation provides concept generalization candidates from these examples. The operator can then correct the generalization (by striking out words or adding new ones) and so on. The dictionary refinement cycle is described in a later section.

Each cycle requires heavy computation followed by targeted semantic input from the operator. This might be inefficient from a computing point of view, but it is efficient from the operator's view point. The operator only needs to work when the system fails to generalize properly. The overall architecture (active labeling and active featuring) is organized to surface these failings early.

3. Motivation

Accessibility opens up the number of people that could write classifiers. However, that is not enough. Some sort of "magic" is necessary to generate viral adoption. Current machine learning tools are designed by engineers for engineers. They are devoid of magic. This section is about increasing motivation to build classifiers by carefully designing the UX.

To most people, machine learning is complicated and mysterious. Building a user interface that allows machine-learning-illiterate operators to teach a machine learning system to perform recognition and schematization tasks is a challenge. Described below are simple UX principles, which are designed to make the system understandable and trustworthy:

Transparency: The state of the system is accessible and directly actionable by the operator (corollary: there are no hidden states/variables).

Responsiveness: Every operator action produces an immediate and visible effect.

Progress: There is always a clear action that moves from the current state closer to the desired state.

The transparency principle makes the system less mysterious and dangerous. The responsiveness principle allows the user to have immediate feedback on their action and learn the "derivatives" of their action. The progress principle identifies the direction to follow to reach the desired state.

To enable learning, labels and features are needed from the operator. If the labels and/or features change the state of the system, the first principle implies that the labels and features should be accessible and editable. This has several implications:

Labels entered by the operator may be viewed and edited. Undoing is a trivial operation.

Features entered by the operator may be viewed and edited. Undoing is a trivial operation.

System-generated labels and features are highly discouraged. They compromise transparency.

The system's performance should be independent of the order in which labels or features are entered. Order dependence is unlikely to be easily viewable and actionable.

The same set of labels and features should always yield the same result. Learning is a semi-deterministic function. If the learning algorithm is sensitive to slight change of features, the first principle is somewhat violated (the operator may not be able to distinguish the input variations).

The data should be "pickled." It is not desirable, for instance, for links in a web page to have dangling pointers that could change the behavior of the system when the links are out of date.

The first principle will be violated occasionally, but hopefully this will not affect the trust of the operator in the system. For instance, certain features may be automatically provided as system services, like synonyms, misspellings, click graph, and so on. One could freeze these functions, but it might be better to freeze their semantics and let the features be updated regularly and transparently (with a small cost to predictability). If a classifier learns to depend on the semantic meaning of the feature, then regular updates of the feature will improve the classifier. Surprisingly, one may even introduce artificial noise in the system to drive the concept that machine-learning only provides statistical guarantees, not single-pattern guarantees. The resulting non-determinism does not affect the overall performance, but it discourages novice users from over-training.

The responsiveness principle allows users to quickly learn how to operate the system (feedback). It also produces rewards by translating actions into progress. Every label and every feature should create a visibly better classifier. This is difficult for three reasons: retraining a classifier after every action is expensive. Rescoring all items with every new classifier is even more expensive. And finally, many operator interventions may be necessary for the classifier to show a visible and statistically significant improvement. If exploration changes the distribution significantly, the global metrics may be affected in unpredictable ways. These challenges are compounded by the fact that retraining and rescoring should be transparent. Without infinite resources, the immediacy and visibility aspects of the design principle will be compromised (for instance, by not retraining on every operator input). This can be alleviated by increasing the number of resources dedicated to training and scoring, retraining at regular and frequent intervals (e.g., every 50 labels), and taking advantage of partial scoring (in the ALE algorithm, the query/filtering returns without waiting for every item to be scored). Unsurprisingly, the responsiveness principle is best addressed by increasing the number of resources (compute power) and clever management (partial computation).

a. Error Categorization

The progress principle implies that the operator always knows when the job is done and what to do to make the system better. Neither of these two things is simple. When should one stop improving a classifier? How does one know how to improve a classifier? To help answer this question, the errors made by the system are categorized in three buckets:
   Ambiguity errors: Errors for which labelers cannot agree on what the label is.
   Color-blindness errors: Errors for which the system does not have the necessary input information to distinguish the pattern from other patterns that belong to the wrong classes.
   Ignorance errors: Errors for which the system has the input information to distinguish the pattern from a pattern of the wrong class, but insufficient label information to be able to learn the relationship between the input and the pattern class.
This classification of errors assumes that the system has the capacity to learn the problem and is properly regularized. This assumption does not constrain the user interface. If the system did not have the capacity to learn the problem one would have errors of the type:
   Low capacity error: Errors for which the system has the necessary input and necessary labels to classify correctly but cannot do so because of low capacity.
One need not be concerned about this case because the learning problem can be simplified by adding good features, and for most machine-learning algorithms adding features increases capacity. Therefore, one could only encounter this error as a result of a feature limitation, which would make it a "Color-blindness" error. Conversely, there could be a case where the capacity is too high. In this case, the symptom would be that a large number of "ignorance errors" would be observed even after adding a large number of labels.

The choice of machine learning algorithm, the expressiveness of the features, and the quality of automatic regularization affect how long it takes to learn and what is the best result that the system can achieve. However, these can be modified and improved without having to redesign the user interface.

The error categorization helps us address the progress principle, e.g., the first type of error (ambiguity) suggests the desired state: If the majority of errors fall in the "ambiguity error" category, the operator is done. The system has little hope of surpassing the operator. If a large fraction of errors are due to color blindness or ignorance, the operator knows what to do: Color-blindness errors are fixed by adding features that distinguish positive from false positive or negative from false negative. One can design an interface to enable this (next section). Ignorance errors are fixed by adding labels. At any point in time, the system can suggest which type of errors should be addressed for maximum efficiency. If the training and testing error curves of the learning algorithm are close, more features are needed. Otherwise, more labels would be more effective.

b. Immutability

For the path from the present state to the desired state to be unambiguously clear, one should guarantee that progress is always going forward. This should earn the operator's trust. It requires some precautions. Once a classifier is trained, it can become a feature. Once it becomes a feature, it is not allowed to be retrained as part of a larger model. Retraining a feature as part of a larger classifier could have several negative consequences: First, it could change the semantic meaning of the feature. This could cause operator confusion and backward progress on other features. Second, the capacity of the feature when it was trained may be much higher than the number of labels available on the larger classifier. The unexpected infusion of capacity could cause a backward step. Machine-learning experts may object that freezing the parameters might be suboptimal from a machine-learning standpoint. However, as described herein, system stability and predictability trump optimality.

Progress can be measured with metrics. For instance, the number of positives found by the classifier multiplied by the precision can yield an estimate on the number of positives reached by the system. This metric is proportional to recall. The precision progress per label made on the boundary (e.g., all the patterns that had a probability of being X between 0.25 and 0.75) is an interesting measure of efficacy.

Motivation comes from magic. The magic comes from the system generating three things:
   Empathy: The operator should understand the errors made by the system. Discouraging system-generated labels and features (e.g., "bag-of-words") keeps the system interpretable. Color-blindness errors should cause the operator to be eager to provide new features. Ignorance errors should cause the operator to be eager to provide more labels. The system errors should be welcomed as useful. The transparency, responsiveness, and progress principles all contribute to making the system behave as a gifted learner.
   Surprises: The system should impress the operator by how it pushes the boundaries of what it has been taught. Its errors should zoom in on the missing features/concepts. Its requests for labels should challenge the operator to discover unforeseen example types and to redefine the class concept. The ability to surprise comes from 1) the streamlining of the concept features, and 2) scoring very large data sets.
   Efficiency: With the system doing extraordinary computation for each operator input, the classifiers should make progress very quickly.

With accessibility, efficiency, and magic, building classifiers will produce both value and wonderment. This will allow classifiers and schematizers to be built at scale.

IV. Active Featuring

A. Featuring

A common activity in machine learning is to search for the right features. People typically do this in an ad hoc way: adding a feature via programming or processing the data, starting a completely independent process to retrain the system on the modified data, then they look at the errors, and so forth. None of it is typically integrated in a system where errors can be browsed and features can be shared and searched without exiting an application. As described herein, active featuring enables interactive feature creation, editing, and refinement.

Some methods for helping users select features to fine tune a system's performance either select features automatically (e.g., Bag of Words) or select from a number of pre-existing features (model selection, feature selection, and so forth). Active featuring encourages the user to interactively create useful features, and the complexity of the machine-learning algorithm is kept to a minimum. The idea is that it is better to fix errors interactively by adding features and labels than it is to avoid errors by adding complexity in the machine-language algorithm and the feature selection. Complex learning algorithms and a large number of features are likely to work well in an initial phase, but may quickly leave the practitioner with a complex system that no obvious decision can improve; in which case removing errors is prohibitively difficult. In contrast, an interactive loop that allows the user to add features and labels while relying on a simple learning algorithm may yield a more actionable system. When the user has contributed every label and every feature, the errors may become clearer and easy to fix (either by creating/editing/refining a feature or adding labels).

As described herein, features can come from 1) pre-existing system features, 2) pre-existing features created on the system by other users, and 3) features created on the fly by the user. For 3), two categories are distinguished: 3a) features that are themselves classifiers and entity extractors built interactively using active labeling, and 3b) word features that are created by entering a list of words (also called a dictionary) to capture a "concept." For instance, a list of months (January, February . . . ) captures the concept of "Months." The words in a dictionary together form a feature that can be utilized by computing statistics between a document and the given dictionary (how many words in the dictionary appear in the document, how many distinct words of the dictionary appear in the document, and so forth).

In one aspect, an integrated active learning system includes a browsing component, a training component, a scoring component, and a user-operated feature-creation component. The integrated active learning system may include one or more other aspects, such as where searchable features are classifiers created within the integrated active learning system, a search for features is guided by labels and classifier scores and validated by the operator, classification errors are organized and displayed to suggest and fix classification feature-blindness, or features are created and shared by multiple operators and stored on a commonly accessible system.

In another aspect, an integrated system includes a browsing component, a training component, a scoring component, and a feature-creation component based on user-provided dictionaries. The integrated system may include one or more other aspects, such as where the number of parameters for the feature dictionary is independent of the number of words in the dictionary, or the user can specify whether the parameters are common to the all the words in the dictionary or individual to each word in the dictionary.

By design, the interfaces described herein are agnostic to which learning algorithm is used. In this section, the creation of features is discussed.

Consider an input space D. For each data item $d \in D$, compute a classification value y from an output space O. To do this, a classification function g is used, which maps a point $d \in D$ and a parameter vector w of the parameter space W to a vector $y \in O$. The space of such functions is denoted G:

$$G: D \times W \rightarrow O$$

$$g: d, w \rightarrow g(d, w) = y$$

For instance, the data space could be the space of web pages, the parameter space W could be a vector of real values computed by a machine learning algorithm, and the output space O could be a number between 0 and 1 representing a probability of being of the desired class for each web page. One problem with this formalism is that the space D may be extremely complex and the set of function G that maps $D \times W$ to O could be too large to be trainable from a few labeled examples. For instance, if d is a web page that is truncated to, at most, 100K words, then given a dictionary of, at most, 10 M words, the input space's dimension could still be $10^{12}$. To simplify the problem, the space D is projected to a lower dimensional space I, which herein is referred to as the "feature space." The set of projections is denoted F. The projection $f \in F: D \rightarrow I$ is fixed during the training of the parameters. One can now restrict the learnable function from G to a space G' that verifies $$G'(f, h) = \{g \in G | \exists w \in W, g(., w) = h(f(.), w)\}$$

where h is a function that maps the feature space and the parameter vector to the output. The space of function $H: I \times W \rightarrow O$ is determined by the learning algorithm. The feature space I induced by F and the learnable function space H are chosen to make the learning of the parameters w easier and require as few examples as possible. For instance, for web page classification, the feature function f could be extracting the term frequency $f_i$ normalized by the inverse document frequency (tf*idf) for the k most relevant terms (e.g., k=1000) to the classification task. In other words, given a web page of data d, the featurization function computes a feature vector $x = f(d) = (f_0, f_1, \ldots, f_k)$, where $f_i$ is the normalized number of occurrence of term i in document d and $f_0 = 1$. The classifier could use logistic regression to compute the classification function:

$$h(x, w) = \text{logistic}(w^T x)$$

Figure 7:
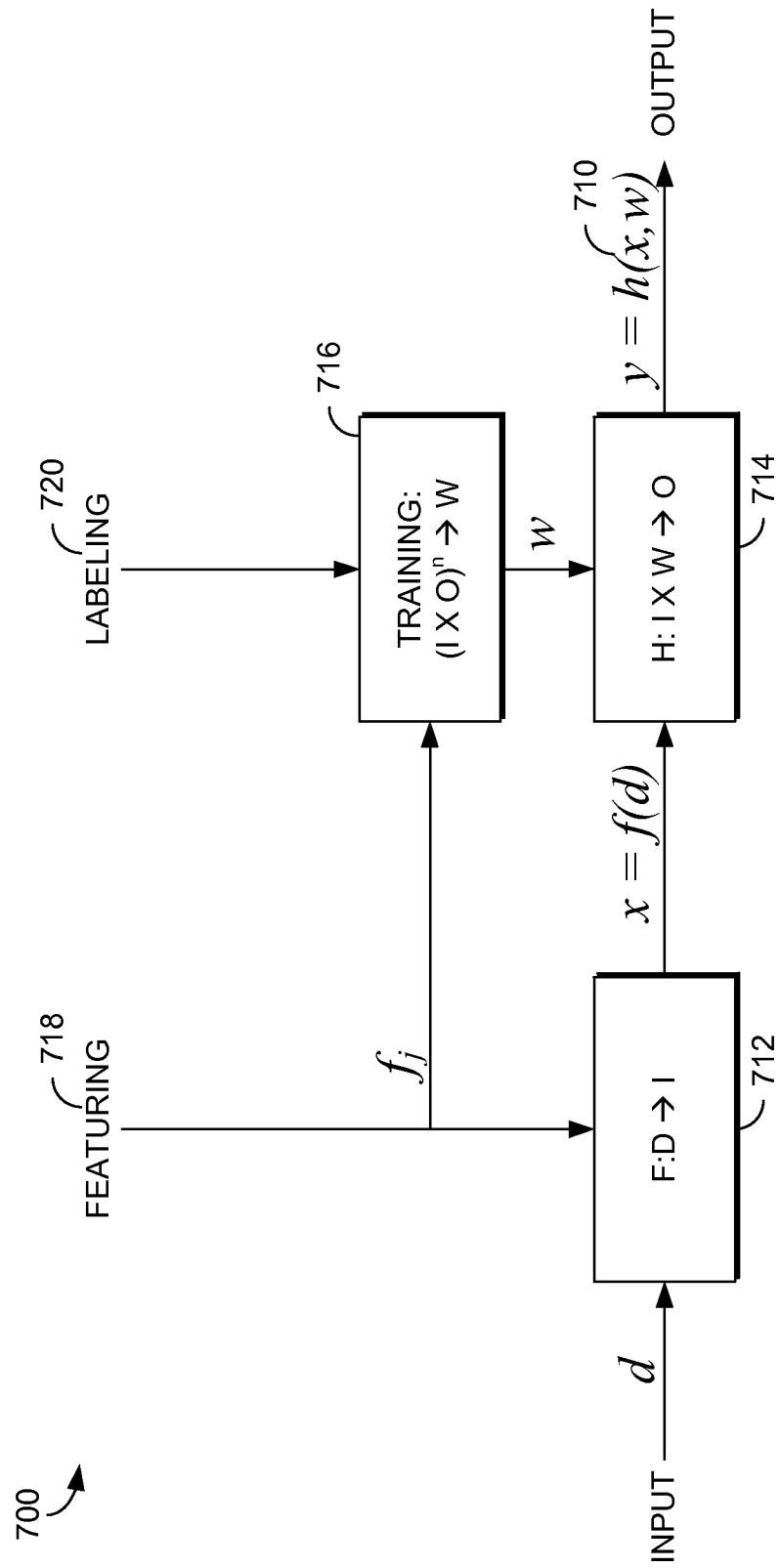
FIG. 7 depicts an exemplary classification function in accordance with an embodiment of the present invention.

Once f and h are defined, traditional machine-learning algorithms can be used to estimate the parameters w using a set of training examples $(x_j, l_j)$ where $x_j = f(d_j)$ and $l_j$ are respectively the jth featurized example and its label in the training set. Of interest here is a scenario where an operator building a classifier is allowed to contribute both labels l and feature function f. FIG. 7 illustrates an exemplary information flow 700 that represents a classification function 710 as the composition of a featurization function f (item 712) and a function h (item 714) that is trainable (item 716). The operator can input both features 718 and labels 720 in order to affect the classification function 710.

In previous sections, active labeling was discussed as a procedure for exploring and improving the classification space. Following is a discussion of the input side equivalent of active labeling: "active featuring."

B. Color Blindness

There is a significant amount of literature related to the automatic selection of features. It is sometimes referred as "feature selection." The implicit goal of automatic feature selection is to improve generalization given a training set. The goal as described herein is different: Provide the operator with a means to contribute the feature-equivalent to labels. This is following the principle described above that humans should contribute semantic meaning and computers should provide scale. In the previous section, three classes of errors were distinguished: ambiguity, ignorance, and color blindness. Ambiguity errors are beyond fixing (they come from the operator or the intrinsic noise of the problem). Ignorance errors are fixed by adding labels. Color blindness errors are fixed by using "color filters," or following machine-learning terminology, by adding features that allow the system to "see" the difference between members of one class and members of a different class.

The interface for featuring may be problem specific. For instance, a feature could be a function of pixels in image recognition, a function of words in query classification, or a function of cepstral coefficients in speech recognition. The operator is not required to understand pixels, cepstra, or bag-of-words to build a classifier. But there is a need for someone that does to set up the problem. Two kinds of users are therefore distinguished:

The Engineer: This user can program and knows the basics of machine learning. The engineer is responsible for doing the following four things:
Uploading the data to the system.
Providing a generic featurizer that converts the data into a set of features that the training algorithm can consume.
Providing a visualizer that converts the data into something that can be displayed by the system.

Selecting the training algorithm and set its hyperparameters if required.

The Operator: This user has no engineering or machine-learning background. The operator is responsible for creating and training classifiers and schematizers.

Once the engineer has set the problem, operators can build multiple classifiers and schematizers. At the beginning, the inputs of the new classifiers are the generic feature(s) provided by the engineer or the system. Once some operators have built and trained some classifiers, they can be frozen into features. As described above, features are immutable. These new features then become available for input for building higher level classifiers, thus creating an ecosystem.

An operator could build a classifier by selecting a few features and then turning to the ALE algorithm to add labels. Indeed, many systems in machine learning operate from a fixed set of features. For big data with lopsided distribution, however, one does not know a-priori which features will be needed. The need for new features is likely to manifest itself through exploration. For instance, while building a cooking recipe classifier, it may be useful to have a feature that identifies ingredients found in African recipes. The operator may not have known about the existence of African recipes and their specific ingredients until they are discovered through exploration. When building a car detector, having a wheel (or circular shape) detector as a feature would make the segmentation problem a lot easier. The operator may not have known that the problem was too hard without this additional feature until she attempted to build the classifier. To address this limitation, the operator should have the flexibility to add features as needed. In active featuring, an operator inspects the errors made by the classifier, and searches for features that enable the classifier to easily distinguish portions of positive from false positive or conversely, portions of negative from false negative. In other words, the operator is looking for "color blindness" on the part of the classifier. Once color blindness has been identified, the operator can focus on creating a feature to provide a "color filter" in order to cure the blindness.

The active featuring process is a loop in which the operator inspects errors, creates features and/or edits/refines features, retrains the system, and re-scores the labeled examples for the next iteration. However, creating new features often requires new labels. So the active featuring process is itself embedded in a large loop, which involves both active featuring and ALE, herein referred to as the RAFALE (Repeat Active Featuring Active Labeling Exploration) loop. This is summarized in Table 2:

TABLE 2

RAFALE (Repeat Active Featuring
Active Labeling Exploration) Loop

| RAFALE | Active Featuring | Feature Creation |
|---|---|---|
| Repeat: | Repeat: | Repeat: |
| Active Featuring | Inspect Errors | Search existing features |
| Active Labeling | Create and Add features | Create new classifier |
| Exploration | (and/or Create or Refine existing features) | Create domain specific features |
| | Train | |
| | Score labeled set | |

To create a feature, the operator has 3 choices: 1) find a system feature or a feature created by another operator (using a search engine), 2) create a custom-made classifier to implement the desired feature, or 3) create a domain specific feature. The first choice leverages the power of a community. The second choice leverages the ability to quickly create a classifier using an integrated tool. This ability is not generally available because labeling, training, scoring, and featuring are typically done with different tools and often different people. The third choice depends on the domain. An interface is described below for entering domain-specific features for items containing lists of words.

C. Words and Dictionaries

In many applications of machine learning, the basic features are words, which may include individual words, stemmed versions of the words (e.g., words in which inflection denoting plural, past tense, and so forth have been removed) as well as n-grams (sequences of consecutive words or stems). Often, the representation of choice is bag-of-words. In this representation, the features are based on the frequency of each word (TF: term frequency) in a document with some normalization (IDF: inverse document frequency). While it is possible to get good results with these features, they lack the power of expressing and generalizing to concepts. For instance, while it is possible to count the frequencies of Honda and Toyota in a document, it is preferable to have features that generalize to all the car brands.

Described below is a tool for interactively building dictionaries that represent concepts, for the purpose of being used as features for classification or entity extraction. Concepts are created interactively as part of the active featuring loop to address the errors made by the machine-learning algorithm.

In this section, the items in a database are assumed to be documents made up of words. However, the concepts of documents and dictionaries as described herein are not limited to the use of words, and may include other kinds of data. The assumption is also made that the words inside a document have no inter-relationship (bag-of-words model), and a TF*IDF vector representation is used as the basic feature vector. Before the notion of dictionaries is introduced, this representation needs to be explicitly described.

Assume that C is a collection of documents in the database, and T is a set of terms that are relevant for the classifier that is to be built. For instance, T could be the set of all the words that appear in the corpus C. For each document d and term t, the term frequency tf (t,d) can be computed, which is the number of occurrences of word t in d divided by the length of the document. Intuitively, the term count represents a direction in the semantic space of words. It is normalized by the length of the document to be invariant to verbosity. All the terms do not carry the same amount of information. In particular, the number of bits communicated by the statement "the term t occurs in document d" is given by the formula:

$$idf(t, C) = \log \frac{|C|}{|\{d \in C : t \in d\}|}$$

where |C| is the cardinality of C and $|\{d \in C : t \in d\}|$ is the number of documents where the term t appears. This quantity is also called the inverse document frequency. For each document d, the tf*idf feature vector representation of document d is defined as $$x(d) = (tf(t,d) * idf(t,C))_{t \in T}$$

and has two useful properties: it is invariant to the length of the document and the variance of each word feature is proportional to its information content. Table 3 summarizes how the tf*idf representation is computed:

TABLE 3

Counts of each word in each document

|  | word1 | word2 | word3 | word4 | ... | Doc Length |
|---|---|---|---|---|---|---|
| doc1 | 0 | 2 | 0 | 1 | ... | 100 |
| doc2 | 1 | 0 | 0 | 0 | ... | 147 |
| doc3 | 0 | 0 | 0 | 1 | ... | 1234 |
| ... | ... | ... | ... | ... | ... | ... |
| idf | 3.1 | 2.3 | 6.8 | 0.5 | ... |  |

The tf*idf value is computed by dividing the counts by the document length (last column) and multiplying the result by the inverse document frequency (the last row). The resulting row vectors are the feature representations of each document.

If logistic regression is used for classification, it is desirable to regularize the weights and to not rescale the input to adjust their variance. This is because in the word space, the problem is very high-dimensional and there are very few labels. For logistic regression, the classification function is:

$$y^p = h(x^p, w) = \text{logistic}\left(\sum_i w_i x_i^p + w_0\right)$$

where $x^p$ is the feature representation of pattern p, $y^p$ is the output of the classifier and i is an index over the terms of T. The objective function is:

$$E(w) = \sum_p \text{LogLoss}\left(\text{logistic}\left(\sum_i w_i x_i + w_0\right), l^p\right) + \lambda |w|^2$$

where $l^p$ is the label for pattern p, and $\lambda$ is a regularization parameter. One should realize that $|T|$ may be several orders of magnitude larger than the number of labels. The regularizer could be $|w|^2$ or $|w|$. If there were no regularizers (i.e., $\lambda=0$), the idf normalization could be absorbed into w during training.

If each word in a given dictionary is given its own weight, then the system becomes more equivalent to bag-of-words. The idea is that an operator could communicate invaluable information to the classifier by specifying features that capture semantic meaning. The operator is allowed to single out words in small groups and the individual small group can still have a shared weight, which might be important for additional regularization constraints. If all the words in the dictionary share the same parameter, then their semantic is also shared.

For instance, when building a classifier for automotive, a feature could be a dictionary of all the car brand names, such as {"Toyota," "Ford," "Peugeot," . . . }. Another interpretation of featuring is that the operator is "tying" the parameters of the model. Imagine that the tf*idf representation is still being used, but that the parameters for the terms in the dictionary {"Toyota," "Ford," "Peugeot," . . . } are tied to a common value. The generalization value is immediate: if the dictionary contains rare car brands (e.g., Maserati), the classifier can perform well on documents about that car brand even though no labeled document in the training made any reference to cars of that brand. For example, if both the words "Honda" and "Maserati" appear in a car brand dictionary and if the word "Honda" appears in many training examples, the system will be able to generalize to "Maserati" even though no examples of "Maserati" appear in the training set.

It is possible to have a system that is in between having a weight per word in a dictionary, and a single weight for the whole dictionary. This is done by having a weight per word, but by constraining the weights within a dictionary with a regularization constraint. As soon as a dictionary is entered, the corresponding weights have a common shared value (many gradient descent learning algorithms generalize easily to the weight sharing concept). The idf scaling of the term frequency contribution is desirable because terms that carry less information should not have an equal weighting on the value of the shared weight. After scaling, all the parameter $w_j$ contributions are comparable. The weight sharing constraint can be relaxed and one can induce groups of weights to be similar. As one example, one may constraint a group of weights to be close to their average. In that case, a regularizer may be used to tie the group of weights to their average, such that the weights of the words within the dictionary are constrained to not deviate too much from their average. An exemplary regularization constraint could have the form:

$$\gamma \sum_{c \in E} \sum_{j \in J_c} |w_j - \overline{w_{J_c}}|^2$$

where E is the set of dictionaries, $J_c$ is the set of indices for the terms in dictionary c, $\overline{w_{J_c}}$ is the average of the parameters for the terms indexed by $J_c$, and $\gamma$ is a regularization parameter. In this setting, the weights corresponding to a common dictionary are tied by a regularization constraint. For a large value of $\gamma$, the constraint above strongly enforces near equality which is equivalent weight sharing, or equivalent to having one weight per dictionary. In all likelihood, the regularizer $\gamma$ will be larger than $\lambda$ because the prior knowledge communicated by the operator is much stronger than the prior knowledge that most $w_i$ are small.

The weight for each dictionary can be scaled as a function of document frequency or dictionary size prior to applying the regularization constraint, in order to keep each weight on comparable scale. In effect, in the previous example, this allows the word "Honda" to transfer its knowledge to the word "Maserati" through the regularization constraint, but it still allows the word "Maserati" to have a different weight if there is enough "Maserati" data to pull the weight in a different direction.

D. Interactive Concept Editing (Active Conceptualizing)

As an example of creating a classifier, assume the goal is to create a classifier for "home pages":

Positive: Personal page, social media pages, academic pages, and so forth

Negatives: search results, directory, events, obituaries, companies, commercial pages, and so forth Ambiguous: Fictional people, famous dead people, resumes, and so forth.

The dictionaries might be created in this order (it is hard to guess until the tool is built):

Home page: ["Home page", "Bio", "Resume", "Hobbies", "Facebook", and so forth]

Contact info: ["Contac information", "Address", "Phone", "email", and so forth]

First names: ["John", "Steven", and so forth]

Last names: ["Smith", "Dupont", and so forth]
Search/directory: ["Search", "Login", "Signup", and so forth]
Obituary: ["obituary", "passed away", "died", "beloved", and so forth].

The first four dictionaries help find positives (remove false negatives). The following two reduce the number of false positives. This process is highly interactive. It is difficult to know which dictionary will be useful without building the classifier. The user may decide to create a classifier for obituaries or for events on the fly. This process is recursive. The features/classifiers created on the fly are not required to be good. To be useful, they only need to be better than chance and bring new information.

1. Issues

If the number of dictionaries is large, one may think that featuring is similar to creating rules and exceptions, in the tradition of "expert systems" and old style "AI." However, there are three things that may be taken into account:

First, dictionaries are merely features or filters. How they are combined is completely left to the machine-learning algorithms. From the user's viewpoint, there is no explosion of complexity. The featuring task is merely to provide the system with the means of distinguishing positive from false positive or negative from false negative. The complexity of adding the $1^{st}$ or the $n^{th}$ dictionary is the same. The operator is providing sensors, not rules.

The difference between building classifiers efficiently and inefficiently is likely to come from keeping the dictionaries "clean" in terms of semantic meaning. For instance, in the Home Page example above, it would be a bad idea to mix the dictionary of home page cues with the dictionary that detects whether there is an address in the page. This would reduce compositionality. While adding a few address terms to the first dictionary is better than not having an address dictionary, having two dictionaries for two semantic meanings is far better. It allows the system to weight their influence differently and it makes debugging and reusability of feature-dictionaries much easier. The "sensors" should be as orthogonal and pure as possible. Maintaining clean dictionaries may also make them better suited for later reuse. Pure dictionaries are easier to understand by other humans and more likely to be helpful to other classification problems.

The optimization is non-parametric. This means that through cross validation, the capacity of the system is adjusted automatically to match the amount of data available. The system should perform as well as any currently in-use system based on bag-of-words, with the same amount of data. The additional information provided by a feature could be very helpful if it saves the operator from entering thousands of labels.

The dictionary editing could be useful for any system that uses bag-of-words. This may work well for data where the relationship between the words is hard to extract, e.g., queries, ad text, user product descriptions, or free flow text. For documents that have a schema structure, such as recipes, job descriptions, products, and forums, the positional information and the relations between the words is important. This will be the object of the next section.

Entering dictionaries could be a tedious task. For instance, the dictionary of first names and last names in the previous example would have many entries. The dictionary for cooking ingredients extracted from freebase had 1,709 ingredients at the time of this writing. Fortunately, the process of entering dictionaries can be automated. This is the object of the next sub-section.

In one aspect, an integrated system includes a component with means to display training patterns, a training component, a scoring component, and a dictionary-editing component. The four components are used in an active featuring loop. The dictionary-editing component contains an interactive loop to allow the operator to edit and refine concepts characterized by lists of words or group of n-grams.

In another aspect, a dictionary feature is provided in which each word or n-gram in the dictionary has its own weight. The weights of the dictionary can be rescaled by a function of frequency and dictionary size. The rescaled weights are tied by a regularization constraint that pulls the weights of the words that have less training data toward a default value determined by the words that have more training data.

In another aspect, a dictionary interface is provided for constructing the features of a classifier or entity extractor. The interface allows concepts, defined by a large list of words or n-grams, to be specified interactively by providing a small list of positive or negative word or n-gram examples. At each iteration, the concept list is automatically expanded using a collection of algorithms and editing by using input.

In another aspect, a dictionary interface is provided for constructing the features of a classifier or entity extractor. Each feature is composed of a list of words or n-grams. The interface allows the operator to specify options on how the feature is computed. The generalization effects of various options alternatives are computed on a validation set and previewed.

2. Dictionary Creation

A dictionary can be viewed as a concept. As a concept, it can be generalized. When an operator types a few positive examples for a dictionary, the system can provide suggestions for possible generalizations. If the generalization is too aggressive, the operator can provide feedback by adding negative examples. This becomes an iterative process where the operator provides positive and negative examples to guide the system toward the correct generalization of a targeted concept. This follows the philosophy described above: the operator provides semantic meaning, and the system provides computation at scale to refine the meaning. This section is divided into two parts: A user interface for active conceptualization, and a collection of algorithms for concept generalization.

a. Active Conceptualization Interface (ACI)

Figure 8:
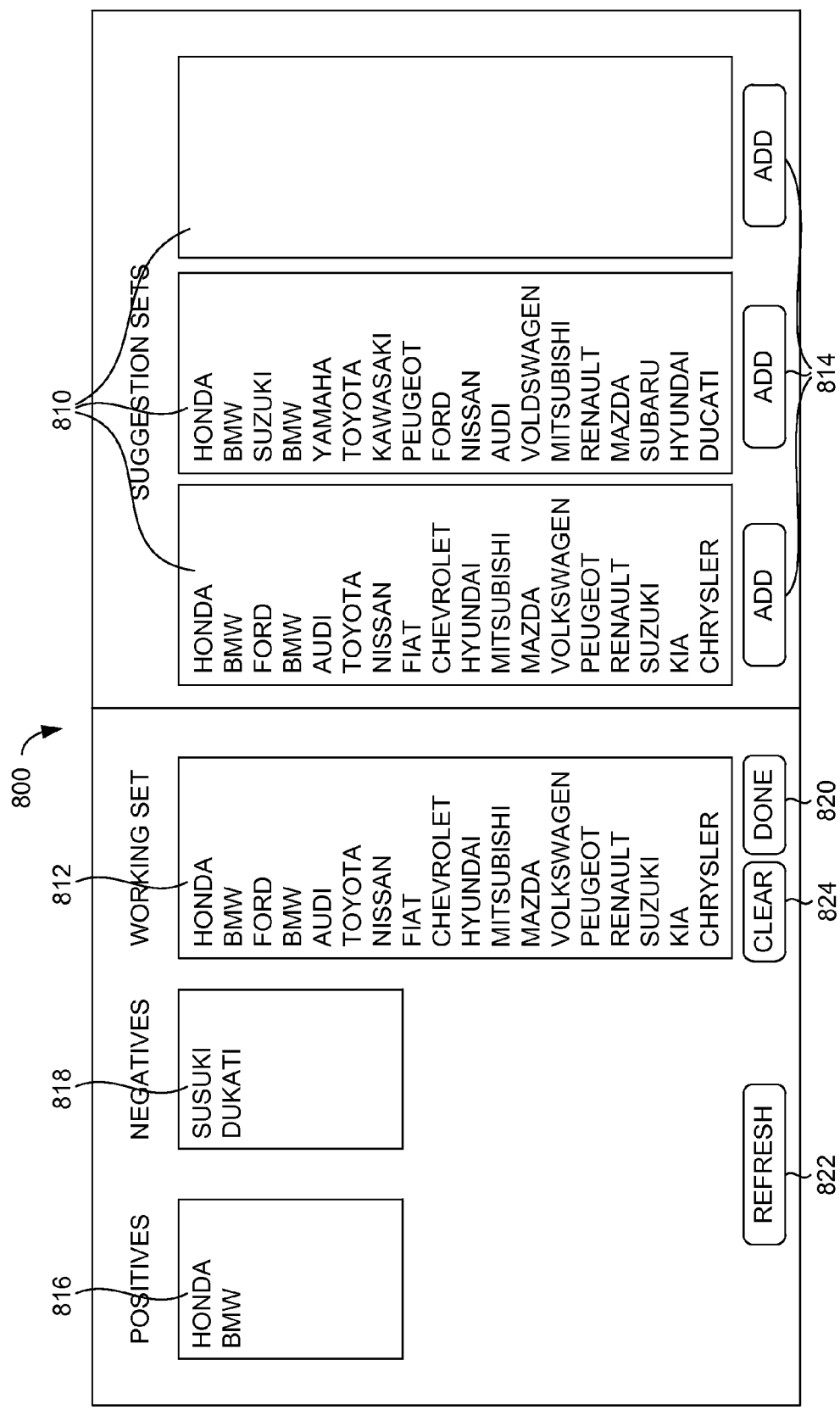
FIG. 8 depicts an exemplary interface in accordance with an embodiment of the present invention.

The goal of the interface is to help the operator communicate concepts to the system in order to create dictionaries. The dictionary creation and editing can be done in a feedback loop where the user provides a list of positive examples. FIG. 8 illustrates an exemplary interface 800 suitable for use with active conceptualization and dictionary editing. When the operator clicks on the Refresh button 822, the system generates suggestion sets 810, such that each suggestion set 810 is a new list of words meant to generalize the concept implied by words entered by the user. Each suggestion set 810 is generated using a different algorithm. The user can then add more words as positive examples 816 or negative examples 818 by typing them, or by clicking or dragging them from a proposed list.

Words from the suggestion sets 810 may be added to a working set 812 by clicking on a corresponding Add button 814. Words clicked on, or selected, in the suggestion sets 810 are added to positives 816. Words selected in the working set 812 are added to a negative set 818. Other methods for adding positives 816 and negatives 818 may also be used, such as clicking on the suggestion set words 810 to add positives and shift-clicking on the suggestion set words 810 to add negatives. For large sets, the operator can copy an entire suggestion set 810 to the working set 812. The suggestion sets 810 are recomputed for each edit. Clicking on the Done button 820 submits the union of the positives 816 and the working set 812 as a new dictionary. Alternatively, clicking on the Clear button 824 clears the words from the working set 812.

The dictionary editing interface could present machine-learning options (e.g., check box, thresholds) that constrain how they are used as features. For instance, a dictionary interface could have checkboxes or dialog boxes for:

- A flag that indicates whether each word has its own trainable parameters (as opposed to one parameter for the whole dictionary),
- A flag or an option to make the feature value a function of quantity (the dictionary feature could have 0 or 1 value (binary) or be a pre-determined function of the dictionary term frequency,
- A flag that indicates whether the term frequencies are normalized (e.g., multiplied by a function of the inverse term frequencies, IDF),
- A regularization threshold, which suggest the degree of tying between the weight of a dictionary, and
- A flag or an option to favor diversity: different word appearing in a document generates a higher feature value than the same word appearing multiple times.

The dictionary option interface can preview the generalization effects of each option by training the classifier or entity extractor with or without the option and by measuring its performance on a validation set.

When the operator is finished, the union of the positive set and the working sets is saved as the new dictionary. This interface is very interactive in the sense that the system provides immediate feedback to the operator as to what it understood to be the concept. The operator can react and refine the system's interpretation.

There are many ways to generate valid concepts captured by a list of words. Some points are:

- Users may generate a concept captured by a long list of words by only typing a few positive and optionally a few negative examples.
- The concept editing is an interactive process that can go through several refinements.
- The suggestion sets can be of multiple natures. For instance, one could come from a collection of pre-existing dictionaries (based on tables found on the Web, or database such as Freebase). Another could come from semantic concepts automatically derived from clustering words based on a large database of documents. A third one could come from analyzing a click graph on (query, URL) pairs (queries that generate clicks on the same page are probably related and their words are probably in a related concept). Even though the suggestion sets have very different origin, they can share a common interface for concept editing. Some algorithms for active conceptualization are described more fully below.

b. Active Conceptualization Algorithms

The ACI can be used to allow the operator to interact with different active conceptualization algorithms. For example:

Knowledge Bases: Freebase and Yago are examples of knowledge databases that contain many human-entered dictionaries. It is possible to test each human-entered dictionary for inclusion of the positive and exclusion of the negative. A matching dictionary is a suggestion set.

Click Graph: This graph is a bi-partite graph between queries and web pages, where an edge means that a particular web page was clicked by a user after submitting the corresponding query. This induces a topology on the queries, and by extension, on words. For instance, a set of words can be looked up as queries. The click history on these queries induces a probability distribution of clicks on the associated web pages by following the edges of the graph for the queries. One can then induce a probability on queries that could have generated the clicks on these pages. The top (highest probability) queries of the induced distribution can be used as a dictionary suggestion.

Link Graph: The hyperlink graph connects documents to each other through hyperlinks embedded in their HTML code. This provides another topology that can be exploited in a similar manner as the proposed click graph technique.

Web Tables: An analysis of the tables (or the columns or rows of tables) found on the Web can provide a list of semantically meaningful dictionaries. An algorithm similar to Freebase can be used to suggest dictionaries.

Semantic Representations: The internal representation of the classifier induces a topology on English words. In that topology, words that are close to the positive set and further apart from the negative set are candidates for the suggestion set.

Each of these algorithms provides a different form of generalization. It is fortunate that a common interface can be used for an operator to interface with all of them. The ACI allows an operator to enter concepts implemented by large dictionaries with relatively few interventions.

3. Dictionary Smoothing

One issue with using dictionaries to define a classifier is that a dictionary may be likely to misfire on a word that occurs in multiple, unrelated contexts. For example, suppose a dictionary for movies is built by inputting a list of movies found on the Web. However, the list includes a movie called "It." The problem with a movie called "It" is that the word "it" may appear in almost every document in the database. This may significantly impact the dictionary's ability to measure the presence of the intended concept. As another example, suppose a dictionary is created for "months." It misfires on sentences like "May I help you," and "I had dinner with April." The problem is that in the wrong context, the word misfires and introduces errors.

Such potential misfiring can be addressed by means of dictionary smoothing. The idea of dictionary smoothing is that the context of a particular word may be used to try to predict whether the dictionary should fire on that word or not. The context of a given word includes some number of words that immediately precede and follow the word. With regard to the "months" dictionary, for the word "May," all the instances of "may" throughout the entire corpus might be considered. For each instance of "may," the two words before and the two words after the word "may" might be examined, for example. Based on those four words, a prediction may be made as to whether the word in the middle ("may") is a month or not.

Continuing with the example of using the two words before and the two words after the given word, suppose that one looks at every possible group of five words in a corpus. Suppose the corpus contains 100 million pages, and every page has an average of 2000 words. For every group of five words, one may predict whether the middle word is a month from the other four context words. This may be done by counting word occurrences over a large corpus. For each word, one may count the number of times it occurs in a group of five words in which the middle word belongs to the month dictionary. Similarly, one may count the number of times the word occurs in a group of five words in which the middle word does not belong to the month dictionary. With these counts, one may estimate the probability that a group of five words contains a dictionary word by looking only at the four context words.

For example, one might predict that "1998" is a good predictor of a month. So, the phrase "May 1998" helps to determine that the dictionary should fire on that occurrence of "May." Every four-digit number may be good predictor of months. However, in the sentence "May I help you," the word "I" might be a good predictor of "may" (as a non-month), but is not a good predictor of "February," i.e., "February I help you" is not a phrase that would occur often, if at all.

Additionally, one may choose not to train the system on problematic words, e.g., don't train the system on the word "May." In that case, the system is only trained to predict the desired concept without "may," and so the word "I" will not contribute at all for "May I help you," but "1998" will contribute because there are many examples of other months that occur in the context of "1998."

Another way of describing dictionary smoothing is to look for word substitutability, i.e., whether other words in the dictionary can be substituted for a given word. In a text window (i.e., the context of the given word), one may determine whether the middle word can be alternatively replaced by some of the dictionary words. For that purpose, one may examine a probability estimate, for each substituted word, that the middle word belongs to the dictionary either using the counting technique defined above, or other language modeling techniques.

For instance, suppose a car brand dictionary includes the terms Honda, Toyota, and Ford, and the sentence "President Ford came into Office in 1973" is being evaluated. Without dictionary smoothing, the dictionary would misfire on "Ford." But if other car brands are substituted for "Ford" in that sentence, e.g., "President Honda," or "President Toyota," one may determine that the phrases "President Honda" and "President Toyota" do not occur, or rarely occur, within the entire corpus, and can thus determine that a context of "President X" is very unlikely for a car brand. As a result, the dictionary no longer fires on the phrase "President Ford" because within that context the other words in the dictionary cannot be substituted for "Ford." This eliminates a large number of misfirings.

A detailed discussion of Dictionary Smoothing follows. The notions of context and dictionary are defined, and then estimating the probability of words belonging to a dictionary as a function of contexts is described.

a. Context

Given a document a and a position p, a word extraction function is defined as $$e:(a,p) \to w$$

which returns the word at position p in document a. Given a set $B=(b_0, \ldots, b_{l-1})$ of relative position to p, the context extraction function $e_B$ is defined as:

$$e_B:(a,p) \to e(a,p+b_0), \ldots, e(a,p+b_{l-1})$$

where $e(a, p+b_r)$ is the word in document a at the r'th offset $b_r$ with respect to position p. For example, for $B=(-2, -1)$, $e_B(a,p)$ returns the two words in document a just before position p. If document a is "The quick brown fox jumps over the lazy dog", then $e_{(-2,-1)}(a, 4)$=(brown, fox). Note that for $B=(0)$, $e_B$=e.

Notations: $B=(b_0, \ldots, b_{l-1})$ is used to denote an ordered list. Equality between ordered lists requires all the elements to be equal and the order to be respected. However, in $b \in B$, B is treated like a set ($b \in \{b_0, \ldots, b_{l-1}\}$). The notation $e_i$ is used as a short form of $e_{B_i}$.

Given a context extraction function $e_i$, the contextual predicate $c_i^w$ is defined as:

$$c_i^w(a,p) = (w \in e_i(a,p))$$

which means that the observed word w is in the context i of position p in document a. This predicate assumes that the position of word w in the context is not important.

Similarly, the formula $$c_i^{w_0, \ldots, w_{l-1}}(a,p) = ((w_0, \ldots, w_{l-1}) = e_i((a,p))$$

is defined to mean that the observed words $w_0, \ldots, w_{l-1}$ are (exactly) the context i of position p in document a. To simplify computation, two assumptions are made: assume that position within a context is not important, and that the presence of each word within a context is independent of the presence of the other words. These assumptions lead to:

$$P(c_i^{w_0, \ldots, w_{l-1}}(a, p)) \approx \prod_{w \in w_0, \ldots, w_{l-1}} P(c_i^w(a, p))$$

b. Dictionary

A dictionary $D=\{d_0, \ldots, d_{k-1}\}$ is defined as a set of k words.

c. Probability

Given a dictionary D and a set of m context functions $c_i$, it is desirable to compute:

$$P(e(a,p) \in D | c_0^{o_0}(a,p), \ldots, c_{m-1}^{o_{m-1}}(a,p))$$

which is the probability that the word at position p in document a is in dictionary D, given that words $o_0, \ldots, o_{m-1}$ were observed in context $0, \ldots, m-1$. To simplify notation, $c_r$ is used as a short form for $c_r^{o_r}(a,p)$.

Naïve Bayes: Using the Naïve Bayes assumption that the contexts are independent and the words within the context are independent, one can write:

$$P(e(a, p) \in D | c_0, \ldots, c_{m-1}) = $$
$$KP(c_0, \ldots, c_{m-1} | e(a, p) \in D) P(e(a, p) \in D)$$
$$P(c_0, \ldots, c_{m-1} | e(a, p) \in D) \approx \prod_i P(c_i | e(a, p) \in D)$$

where:

$$P(c_i | e(a, p) \in D) \approx \prod_{w \in w_0, \ldots, w_{l-1}} P(c_i^w(a, p) | e(a, p) \in D)$$

where $o_r = w_0, \ldots, w_{l-1}$. The result is:

$$P(c_i^w(a, p) | e(a, p) \in D) = $$
$$\frac{\sum_{a \in TrainSet} \sum_{p \in position\ in\ a} \delta(w \in e_i(a, p)\ and\ e(a, p) \in D)}{\sum_{a \in TrainSet} \sum_{p \in position\ in\ a} \delta(e(a, p) \in D)}$$

where $\delta(predicate)=1$ if predicate is true and 0 otherwise.

The counts can be pre-computed:

$$CountWordContext(j, i) = \sum_{a \in TrainSet} \sum_{p \in position\ in\ a} \delta(w_j \in e_i(a, p)\ and\ e(a, p) \in D)$$

$$CountDict = \sum_{a \in TrainSet} \sum_{p \in position\ in\ a} \delta(e(a, p) \in D)$$

$$SumPosition = \sum_{a \in TrainSet} \sum_{p \in position\ in\ a} \delta(true)$$

which then allows the efficient computation:

$$P(c_0, \ldots, c_{m-1} \mid e(a, p) \in D) \approx \prod_i \prod_{w_j \in o_i} \frac{CountWordContext(j, i)}{CountDict}$$

$$P(e(a, p) \in D) = \frac{CountDict}{SumPosition}$$

This computation is $O(\Sigma_i |B_i|)$ where $|B_i|$ is context $i$'s size.

To compute K, one also needs to evaluate:

$$P(e(a,p) \notin D \mid c_0, \ldots, c_{m-1}) = KP(c_0, \ldots, c_m \mid e(a,p) \notin D) P(e(a,p) \notin D)$$

Again, using Naïve Bayes:

$$P(c_0, \ldots, c_m \mid e(a, p) \notin D) \approx \prod_i P(c_i \mid e(a, p) \notin D)$$

where:

$$P(c_i \mid e(a, p) \notin D) \approx \prod_{w \in w_0, \ldots, w_{l-1}} P(c_i^w(a, p) \mid e(a, p) \notin D)$$

where $o_r = w_0, \ldots, w_{l-1}$. The result is:

$$P(c_i^w(a, p) \mid e(a, p) \notin D) = \frac{\sum_{a \in TrainSet} \sum_{p \in position\ in\ a} \delta(w_j \in e_i(a, p)\ and\ e(a, p) \notin D)}{\sum_{a \in TrainSet} \sum_{p \in position\ in\ a} \delta(e(a, p) \notin D)}$$

The counts can be pre-computed:

$$CountWordContextAll(j, i) = \sum_{a \in TrainSet} \sum_{p \in position\ in\ a} \delta(w_j \in e_i(a, p))$$

$$CountWordContextNot(j, i) = \sum_{a \in TrainSet} \sum_{p \in position\ in\ a} \delta(w_j \in e_i(a, p)) - \sum_{a \in TrainSet} \sum_{p \in position\ in\ a} \delta(w \in e_i(a, p)\ and\ e(a, p) \in D) =$$

$$CountWordContextAll(j, i) - CountWordContext(j, i)$$

Note that the quantity CountWordContextAll(j,i) is independent of the dictionary. This means that CountWordContextNot(j,i) does not actually require a table for this dictionary (it can be computed from CountWordContext(j,i) on the fly).

$$CountDictNot = \sum_{a \in TrainSet} \sum_{p \in position\ in\ a} \delta(e(a, p) \notin D)$$

$$= SumPosition - CountDict$$

which then allows the efficient computation:

$$P(c_0, \ldots, c_{m-1} \mid e(a, p) \notin D) \approx \prod_i \prod_{w_j \in o_i} \frac{CountWordContextNot(j, i)}{SumPosition - CountDict}$$

$$P(e(a, p) \notin D) = \frac{SumPosition - CountDict}{SumPosition}$$

$$K = \frac{1}{P(c_0, \ldots, c_{m-1} \mid e(a, p) \in D)P(e(a, p) \in D) + P(c_0, \ldots, c_{m-1} \mid e(a, p) \notin D)P(e(a, p) \notin D)}$$

and from that, one can compute:

$$P(e(a, p) \in D \mid c_0, \ldots, c_{m-1}) = \frac{P(c_0, \ldots, c_{m-1} \mid e(a, p) \in D)P(e(a, p) \in D)}{P(c_0, \ldots, c_{m-1} \mid e(a, p) \in D)P(e(a, p) \in D) + P(c_0, \ldots, c_{m-1} \mid e(a, p) \notin D)P(e(a, p) \notin D)}.$$

i) Probability at the Dictionary Word Level

It may be desirable to compute the probability that a word is a given word of the dictionary given context:

$$P(e(a,p)=w_k|c_0^{o_0}(a,p),\ldots,c_{m-1}^{o_{m-1}}(a,p))$$

where $w_k$ is a specific word in the dictionary.

$$P(c_i^w(a,p)\,|\,e(a,p)=w_k) =$$

$$\frac{\sum_{a\in TrainSet}\sum_{p\in position\ in\ a}\delta(w\in e_i(a,p)\ and\ e(a,p)=w_k)}{\sum_{a\in TrainSet}\sum_{p\in position\ in\ a}\delta(e(a,p)=w_k)}$$

where $\delta(\text{predicate})=1$ if predicate is true and 0 otherwise. The counts can be pre-computed:

$$CountWordContextK(k,j,i) =$$
$$\sum_{a\in TrainSet}\sum_{p\in position\ in\ a}\delta(w_j\in e_i(a,p)\ and\ e(a,p)=w_k)$$

$$CountK(k) = \sum_{a\in TrainSet}\sum_{p\in position\ in\ a}\delta(e(a,p)=w_k)$$

$$SumPosition = \sum_{a\in TrainSet}\sum_{p\in position\ in\ a}\delta(true)$$

which then allows the efficient computation:

$$P(c_0,\ldots,c_{m-1}\,|\,e(a,p)=w_k) \approx \prod_i\prod_{w_j\in o_i}\frac{CountWordContextK(k,j,i)}{CountK(k)}$$

$$P(e(a,p)=w_k) = \frac{CountK(k)}{SumPosition}$$

$$P(e(a,p)=w_k|c_0,\ldots,c_{m-1})=K_kP(c_0,\ldots,c_{m-1}|e(a,p)=w_k)P(e(a,p)=w_k)$$

Computing K also includes evaluating:

$$P(e(a,p)\neq w_k|c_0,\ldots,c_{m-1})=K_kP(c_0,\ldots,c_m|e(a,p)\neq w_k)P(e(a,p)\neq w_k)$$

Again, using Naïve Bayes:

$$P(c_0,\ldots,c_m\,|\,e(a,p)\neq w_k) \approx \prod_i P(c_i\,|\,e(a,p)\neq w_k)$$

where:

$$P(c_i\,|\,e(a,p)\neq w_k) \approx \prod_{w\in w_0,\ldots,w_{l-1}}P(c_i^w(a,p)\,|\,e(a,p)\neq w_k)$$

where $o_r=w_0,\ldots,w_{l-1}$. The result is:

$$P(c_i^w(a,p)\,|\,e(a,p)\neq w_k) =$$

$$\frac{\sum_{a\in TrainSet}\sum_{p\in position\ in\ a}\delta(w_j\in e_i(a,p)\ and\ e(a,p)\neq w_k)}{\sum_{a\in TrainSet}\sum_{p\in position\ in\ a}\delta(e(a,p)\neq w_k)}$$

For this, the following quantities are needed:

$$CountWordContextKNot(k,j,i) = \sum_{a\in TrainSet}\sum_{p\in position\ in\ a}\delta(w_j\in e_i(a,p)) -$$

$$\sum_{a\in TrainSet}\sum_{p\in position\ in\ a}\delta(w\in e_i(a,p)\ and\ e(a,p)=w_k) =$$

$$CountWordContextAll(j,i) - CountWordContextK(k,j,i)$$

$$CountKNot(k) = \sum_{a\in TrainSet}\sum_{p\in position\ in\ a}\delta(e(a,p)\neq w_k) =$$

$$SumPosition - CountK(k)$$

Note that the quantity CountWordContextAll(j,i) is independent of the dictionary. This means that CountWordContextKNot(k,j,i) does not actually require a table for this dictionary (it can be computed from CountWordContextK(k,j,i) on the fly). The following computation can then be performed efficiently:

$$P(c_0,\ldots,c_{m-1}\,|\,e(a,p)\neq w_k) \approx$$
$$\prod_i\prod_{w_j\in o_i}\frac{CountWordContextKNot(k,j,i)}{SumPosition - CountK(k)}$$

$$P(e(a,p)\neq w_k) = \frac{SumPosition - CountK(k)}{SumPosition}$$

$$K_k = \frac{1}{P(c_0,\ldots,c_{m-1}|e(a,p)=w_k)P(e(a,p)=w_k)+P(c_0,\ldots,c_{m-1}|e(a,p)\neq w_k)P(e(a,p)\neq w_k)}$$

ii) Probability with Word Left Out

It may be desirable to compute the probability that a word is in a dictionary minus word $w_k$ given context:

$$P(e(a,p)\in D-\{w_k\}|c_0^{o_0}(a,p),\ldots,c_{m-1}^{o_{m-1}}(a,p))$$

where $w_k$ is a specific word in the dictionary. Note that, if $e(a,p)=w_k$, the probability above reflects the probability of all the other words in the dictionary. For instance, in the sentence "President Ford was the 38th president of United States," the probability above will have been trained with all the words in the dictionary that are different from "Ford." If the dictionary is {"Honda", "Ford", "Toyota"}, the probability would be very low since there are not many "President Honda" or "President Toyota" instances. So the probability would correctly predict that "Ford" in the sentence is not a car brand.

$$P(c_i^w(a,p)\,|\,e(a,p)\in D-\{w_k\}) =$$

$$\frac{\sum_{a\in TrainSet}\sum_{p\in position\ in\ a}\delta\left(\begin{array}{c}w\in e_i(a,p)\ and\\ e(a,p)\in D-\{w_k\}\end{array}\right)}{\sum_{a\in TrainSet}\sum_{p\in position\ in\ a}\delta(e(a,p)\in D-\{w_k\})}$$

where $\delta(\text{predicate})=1$ if predicate is true and 0 otherwise. The counts can be pre-computed:

$$CountWordContextDictMinusK(k,j,i) =$$
$$CountWordContext(j,i) - CountWordContextK(k,j,i)$$

$$CountDictMinusK(k) = CountDict - CountK(k)$$

which then allows the efficient computation:

$$P(c_0, \ldots, c_{m-1} \mid e(a, p) \in D - \{w_k\}) \approx$$
$$\prod_i \prod_{w_j \in o_i} \frac{CountWordContextMinusK(k, j, i)}{CountDict - CountK(k)}$$

$$P(e(a, p) \in D - \{w_k\}) = \frac{CountDict - CountK(k)}{SumPosition}$$

$$P(e(a, p) \in D - \{w_k\} \mid c_0, \ldots, c_{m-1}) =$$
$$K_k P(c_0, \ldots, c_{m-1} \mid e(a, p) \in D - \{w_k\}) P(e(a, p) \in D - \{w_k\})$$

Computing K also requires evaluating:

$$P(e(a,p) \notin D - \{w_k\} \mid c_0, \ldots, c_{m-1}) = K_k P(c_0, \ldots, c_m \mid e(a,p) \notin D - \{w_k\}) P(e(a,p) \notin D - \{w_k\})$$

Again, using Naïve Bayes:

$$P(c_0, \ldots, c_m \mid e(a, p) \notin D - \{w_k\}) \approx \prod_i P(c_i \mid e(a, p) \notin D - \{w_k\})$$

where:

$$P(c_i \mid e(a, p) \notin D) - \{w_k\}) \approx \prod_{w \in w_0, \ldots, w_{l-1}} P(c_i^w(a, p) \mid e(a, p) \in D - \{w_k\})$$

where $o_r = w_0, \ldots, w_{l-1}$. The result is:

$$P(c_i^w(a, p) \mid e(a, p) \notin D - \{w_k\}) =$$
$$\frac{\sum_{a \in TrainSet} \sum_{p \in position\ in\ a} \delta\begin{pmatrix} w_j \in e_i(a, p)\ \text{and} \\ e(a, p) \notin D - \{w_k\} \end{pmatrix}}{\sum_{a \in TrainSet} \sum_{p \in position\ in\ a} \delta(e(a, p) \notin D - \{w_k\})}$$

For this, the following quantities are needed:

$$CountWordContextDictMinusKNot(k, j, i) =$$
$$CountWordContextAll(j, i) - CountWordContextDictMinusK(k, j, i)$$

$$CountDictMinusKNot(k) = \sum_{a \in TrainSet} \sum_{p \in position\ in\ a} \delta(e(a, p) \notin D - \{w_k\}) =$$
$$SumPosition - CountDictMinusK(k)$$

Note that the quantity CountWordContextAll(j,i) is independent of the dictionary. This means that CountWordContextDictMinusKNot(k,j,i) does not actually require a table for this dictionary (it can be computed from CountWordContextK(k,j,i) on the fly). The following computation can then be performed efficiently:

$$P(c_0, \ldots, c_{m-1} \mid e(a, p) \notin D - \{w_k\}) \approx$$
$$\prod_i \prod_{w_j \in o_i} \frac{CountWordContextDictMinusKNot(k, j, i)}{SumPosition - CountDictMinusK(k)}$$

$$P(e(a, p) \notin D - \{w_k\}) = \frac{SumPosition - CountDictMinusK(k)}{SumPosition}$$

$$K_k = \frac{1}{P(c_0, \ldots, c_{m-1} \mid e(a, p) \in D - \{w_k\}) P(e(a, p) \in D - \{w_k\}) + P(c_0, \ldots, c_{m-1} \mid e(a, p) \notin D - \{w_k\}) P(e(a, p) \notin D - \{w_k\})}$$

4. Feature Completion

Feature Completion is a more generalized approach to Dictionary Smoothing. Learning techniques to automatically classify documents infer a classifier from a set of labeled training instances. The inferred classifier is a function, which takes a set of input features, i.e., measurements that describe the document, and outputs a class label. One can mainly improve the accuracy of a classifier following two alternative paths, either by acquiring more labeled training instances, or by relying on better features. Feature completion is directed toward the second approach and aims at facilitating the design of better features.

A feature is a function that maps the raw representation of the document (e.g., sequence of characters for text, map of pixels for images . . . ) to an intermediate representation that the classifier relies on (e.g., the number of occurrences of a given word or the presence of a specific color in the image). Most features are built from a simple human intuition about the types of measurements that a classifier could rely on (e.g., a classifier that detects faces in images could use the presence of skin color as a feature). However, the conversion of an intuition to a function that maps the document representation is a complex, imperfect task.

Feature completion facilitates this conversion process. It takes as input the initial feature given by the human and provides a complementary feature that complements the first one, so that the combination of both features is closer to the initial intuited measurement. For that purpose, it relies on a large dataset of unlabeled documents. The raw representation of the unlabeled documents is divided into the part that the initial feature uses (representation A) and the rest (representation B). Given this set of paired representations on the unlabeled set, a learning algorithm is applied to infer a function that takes representation B and predicts the output of the initial feature on part A of the same document. This function is a complementary feature since it behaves similarly to the initial feature but relies on the complementary part of the raw representation (i.e., representation B). The combination of the initial feature and the complementary feature may be closer to the initial intuition since it uses the remainder of the document that the initial feature implementation did not manage to exploit. The combination of the two features is also more robust to noise since corruptions are unlikely to affect representation A and representation B in the same way.

One should note that the classifier determines how to combine the initial feature and its complementary counterpart. This means that the learning algorithm determines for the user whether a complementary feature should have little influence (since the initial feature was already high quality) or more influence (since the initial feature was poorer quality).

In one aspect, a system and method are provided to build complementary features. Each complementary feature is built from an initial feature and a large set of unlabeled data. A complementary feature is a function that takes as input the part of the raw representation the initial feature is not using. It is built by trying to predict the output of the initial feature from this complementary representation over the unlabeled data.

In another aspect, the system and method may include one or more additional features, such as where the initial feature measures the presence of a disjunction of words or n-grams (sequence of words) at each position in a text stream, while the complementary feature input consists of a window of text around the considered position in which the center words have been removed; where the initial feature is a regular expression operating over strings to predict matching position in text, while the complementary feature input consists of a window of text around the considered position in which the center words have been removed; or where the initial feature measures the presence of a disjunction of short nucleotide sequences at each position in a large nucleotide sequence (e.g., DNA), while the complementary feature input consists of a window of few nucleotides around the considered position in which the center nucleotides have been removed.

The following discussion describes exemplary algorithms for feature completion. Feature completion starts with an initial feature and a large unlabeled dataset. A complementary feature is built from these inputs. Once built, this complementary feature can then be used in conjunction with the initial feature in a supervised learning setting.

A. DEFINITIONS

A dataset is a set of items. For example, a data set could
  be a collection of web pages, a collection of queries, a collection of word documents, a collection of molecules, a collection of genes, etc. Each item is represented by its raw representation. This representation is a set of measurements made on the item. The measurements can be of fixed length, such as the number of links pointing to web page, or of variable lengths such as a list of tokens representing each word, with possible annotations (e.g., bold, italic, table position, metadata, etc). The purpose of the raw representation is to capture all the information relative to an item into a computer readable form, without discerning a priori which information is relevant or irrelevant. A feature representation is a function of the raw representation, which captures the information that is relevant to a machine learning algorithm for performing a task on the item, such as classification, extraction, regression, ranking, and so forth. The feature representation typically discards a lot of information from the raw representation because the raw representation space is far too vast for a machine-learning algorithm to perform adequately with a small number of training examples and finite computational time.

The initial feature representation f is the feature representation that is started with. It takes part of the raw representation of an item and computes a value or a vector of values. An example of value could be the length of an item, the number of times a particular sub-component is present in an item, etc. A vector value could be the result of sliding a window over the item and computing a function over that window. For instance, for a window of text, the initial feature could be
  a binary value representing whether any word from a given list appears at the center of the window,
  a binary value representing the presence or absence of a verb in the window,
  a binary value representing the presence or absence of a noun followed by an adjective,
  an integer feature counting the number of occurrences of a given word in the window, etc.

A complementary feature g is also a feature representation. It takes a different part of the raw representation of an item and predicts a value or a vector of values. It is built relying on the algorithm defined in the next section.

This discussion distinguishes two parts in the raw representation of an item. Representation A refers to the part the initial feature uses. Representation B refers to the part the complementary feature uses. Note that both parts may or may not overlap.

A supervised learning algorithm takes a set of input/output pairs and predicts a function that aims at predicting the output given the input.

B. ALGORITHMS TO BUILD A COMPLEMENTARY FEATURE i) Generic Algorithm BuildComplementary

This algorithm computes an additional feature function g. It uses the dataset D and the function f to generate (input, targets) pairs as training examples for g. It then uses a training algorithm to train g. The result is a new feature function g, which can then be used to complement f.

Input: an initial feature f, a dataset D
Output: a complementary feature g
Algorithm
  Initialize a complementary feature training set P to the empty set
  For each item i in D
    Extract $a_i$ (representation A for i) and
    Compute the output of the initial feature $f(a_i)$
    Extract $b_i$ (representation B for i)
    Add $(b_i, f(a_i))$ to P. This (input, target) pair is a training example for function g
  g=SupervisedLearningAlgorithm(P)
  Return g If the features are computed on sliding windows, the algorithm can be modified as this:

Input: an initial feature f, a dataset D
Output: a complementary feature g
Algorithm
  Initialize a complementary feature training set P to the empty set
  For each item i in D
    For each position p in item
      Extract $a_{i,p}$ (representation A for i in initial window indexed by p) and
      Compute the output of the initial feature $f(a_{i,p})$
      Extract $b_{i,p}$ (representation B for i in context window indexed by p)
      Add $(b_{i,p}, f(a_{i,p}))$ to P. This (input, target) pair is a training example for function g
  g=SupervisedLearningAlgorithm(P)
  Return g ii) Specialization for the Binary Case

Assume that f is a binary feature and representation B is a set of n binary measurements. This means that for any item i, $f(a_i)$ is either 0 or 1, while $b_i$ can be denoted as a vector $(b_{i1}, \ldots, b_{in})$ in which each $b_{ij}$ is 0 or 1. Consider a class of supervised learning algorithms that relies only on the following counts from P, $N(j, \alpha, \beta)$, which denotes the number of pairs $(b_i, f(a_i))$ in P such that $f(a_i)=\alpha$ and $b_{ij}=\beta$. In this case, the complementary feature building algorithm can be rewritten as Input: an initial feature f, a dataset D
Output: a complementary feature g
Algorithm
  Initialize $N(j, \alpha, \beta)$ to zero for j=1 . . . n, $\alpha$=0 . . . 1, $\beta$= 0 . . . 1

For each item i in D
   Extract $a_i$ (representation A for i) and
   Predict the output of the initial feature $f(a_i)$
   Extract $b_i$ (representation B for i)
   Increment $N(j, f(a_i), b_{ij})$ for j=1 . . . n
g=SupervisedLearningAlgorithm(N)
Return g

C. COMPLEMENTARY FEATURES FOR CLASSIFICATION

Classification as used herein is the task of predicting a class label given an input item. For that purpose, use is made of a supervised learning algorithm, which can automatically infer a function that maps an input feature representation to a class label from a set of labeled items, i.e., items for which the correct class has been identified by a human labeler. A label item (x,y) is denoted, where x denotes its raw representation x and y denotes its label.

The following algorithm takes a set of labeled items, an unlabeled dataset and a set of initial features $f_1$ . . . $f_n$. It complements each feature and learns a classifier that relies both on the initial feature and its complementary feature.

Input: a set of initial features $f_1$ . . . $f_n$, a set of labeled items L, an unlabeled dataset U
   Output: a set of complementary features $g_1$ . . . $g_n$, a classifier C relying on both $f_1$ . . . $f_n$ and $g_1$ . . . $g_n$.
   Algorithm
     For each initial feature $f_i$,
       define its complementary from the unlabeled data $g_i$=BuildComplementary($f_i$,U)

Initialize pair set P to the empty set
     For each labeled item (x,y) in L,
       compute initial features and its complementary features $v(x)=f_1(x), \ldots, f_n(x), g_1(x) \ldots g_n(x)$ Add (v(x), y) to P
   C=SupervisedLearningAlgorithm(P)
   Return $g_1$ . . . $g_n$ and C As an example, consider the following collection of documents in Table 4:

TABLE 4

| Document ID | Content |
|---|---|
| 0 | "cut off date is May 18 2012"; |
| 1 | "Posted Thursday , May 24 , 2012 at 10"; |
| 2 | "Published on February 18 2001"; |
| 3 | "Customers Viewing This Page May Be Interested in"; |
| 4 | "Posted Thursday , February 24 2012 at 10"; |
| 5 | "He bought 24 candles"; |
| 6 | "May I suggest that you read"; |
| 7 | "Beatles - Let It Be - Lyrics" |

Assume the initial feature is: Word belongs to the set {"February", "May"}. The concept that the initial feature is trying to capture is the concept of Month. Unfortunately, it will not work well in documents 3 and 6 because the feature will fire even though those particular 2 instances of "May" are not referring to months. Any learning algorithm that depends on the initial feature will therefore be handicapped by the feature's "misfiring."

To compensate for this problem, a simple complementary feature may be built. Please refer to the Generic algorithm "BuildComplementary" described above, regarding windows. Formally, the initial representation $a_{i,p}$ is a fixed length window of length one (single word) for item i centered on position p. The second representation $b_{i,p}$ is also a fixed length window of length one, but it is centered on the word at position p+1. This window is referred to herein as the "context" window.

In this example, the complementary feature g is trying to better predict the concept of month. To build this feature, a very simple Bayesian algorithm is used as the learning algorithm to compute g. The function g is defined as:

$$g(w)=P(f(\text{word at } p)=1|\text{word at } (p+1) \text{ is } w)$$

where the word w is read from position p+1 where g is evaluated. In this case, it helps to think of the representation $b_{i,p}$ as being around position p.

Note that other representations could be used, rather than "word at position p+1" as input for g, and any other machine-learning algorithm could be used to train g to mimic the values of f. In this case, a Bayesian model is used because a closed form version of g can be given and demystify the process by giving an explicit machine-learning algorithm. Using Bayes' rule, one can write:

$$g(w) = P(\text{word in } Dict | \text{following word is } w) = \frac{P(\text{following word is } w | \text{word in } Dict) P(\text{word in } Dict)}{P(\text{following word is } w)}$$

As an example, g will be computed for the second document at position 3 (w="24"). Looking at the corpus, one can infer: P(word in Dict)=6/54=1/9 because there are 54 words in the corpus and 6 of these are in the dictionary. For the second instance of May (in document 1), $$P(\text{following word is "24"}|\text{word in Dict})=2/6=1/3$$

because there are six instances of the word in the dictionary and in two of these instances, the following word is "24." Computing P(following word is X) is done by realizing that:

$$P(\text{word in Dict}|\text{following word is } X)+P(\text{word not in Dict}|\text{following word is } X)=1$$

This leads to $$P(\text{following word is "24"}.)=P(\text{following word is "24"}.|\text{word in Dict})P(\text{word in Dict})+P(\text{following word is "24"}.|\text{word not in Dict})P(\text{word not in Dict})$$

or $$P(\text{following word is "24"}.)=1/3 \cdot 1/9 + 1/48 \cdot 8/9 = 1/18$$

And finally:

$$P(\text{word in Dict}|\text{following word is } X)=1/3 \cdot 1/9 \cdot 18/1 = 2/3$$

If this is done for all the instances, the result is:
Document 0: P("May" in Dict|following word is "18")= 1.0
Document 1: P("May" in Dict|following word is "24".)= 0.6666
Document 2: P("February" in Dict|following word is "18")=1.0
Document 3: P("May" in Dict|following word is "Be")= 0.5
Document 4: P("February" in Dict|following word is "24".)=0.6666
Document 5: P("May" in Dict|following word is "I")=1.0

One can see that this complementary feature is better because if it uses a threshold of 0.6, it will detect that May in document 3 is a verb and not a month. But it is not perfect because it fails to detect that May in document 5 is also a verb rather than a month.

Below is an example where a more complex context function was computed on a large corpus of documents (500,000 web pages). The primary function looks at one word and is one if word belongs to ("January", "February" . . . , "December") and zero otherwise. The complementary feature looks at the two words before and the two words after and uses Naïve Bayes to compute the probability of being in the dictionary. For this, a variant of the algorithm above is used, which herein is referred to as "Leave One Out." In this version, the function g used on a particular word is trained on all the instances of the data set except the instances that are defined by that word.

This is useful because when a word has a double meaning (e.g., like May, which can be a month or a verb), it may be trained only with instances that exclude its own double meaning. The double meaning of May could potentially pollute the other months, but that is often not a problem because the context for double meaning for different cases on which f=1 are often not correlated. For instance if g(February, .) is trained with a set that excludes all instances of February but includes all the other months including May, the bad cases like "May I help you?" will do little damage to the February model because the context "I" is quite unlikely for February ("February I help you?").

The listing in Table 5 below shows 100 instance examples taken at random from the data set, and sorted by the value of complementary feature g. The value is shown in the column with heading "Prob." The following 4 columns are the "evidence" at position −2, −1, +1 +2 (relative to May being at position 0). Each evidence can be computed as:

$$\text{Evidence}(k) = \frac{P\left(k \mid \text{word at position } p + \text{word at position } p \text{ is in } (dict\text{-May})\right)}{P\left(k \mid \text{word at position } p + \text{word at position } p \text{ is not in } (dict\text{-May})\right)}$$

The following column Label is the "concept" value or whether the particular occurrence is indeed a month. This value is computed by hand just for the purpose of evaluation. Inspection of the list in Table 5 shows that initial feature would produce 21% error rate. In contrast, the complementary feature using a threshold of p=0.0003 would only have a 2% error rate.

TABLE 5

| # | Doc# | pos | Prob | Ev#0 | Ev#1 | Ev#2 | Ev#3 | Label | N-gram |
|---|------|-----|------|------|------|------|------|-------|--------|
| 0 | 26 | 334 | 0.0000 | 1.22 | 1.21 | 1.65 | 1.26 | 0 | Grams Customers Viewing This Page May Be Interested in These Sponsored |
| 1 | 632 | 418 | 0.0000 | 1.22 | 1.21 | 1.65 | 1.26 | 0 | 99 Customers Viewing This Page May Be Interested in These Sponsored |
| 2 | 96 | 201 | 0.0000 | 1.15 | 1.39 | 1.44 | 1.26 | 0 | the choice below . You May Also Need 1 / 2 |
| 3 | 426 | 29 | 0.0000 | 1.18 | 1.39 | 1.26 | 1.38 | 0 | Prequalify Grants for Women You May Qualify for Grants to Earn |
| 4 | 361 | 197 | 0.0000 | 1.13 | 1.24 | 1.50 | 1.14 | 0 | narrow your search results later May We Suggest These Cool Products |
| 5 | 364 | 1256 | 0.0000 | 1.15 | 1.19 | 1.99 | 1.09 | 0 | real self again . " May be he was postman ultra |
| 6 | 470 | 812 | 0.0000 | 1.10 | 1.39 | 1.36 | 1.12 | 0 | 4 ) by Taboola You May Like Why Stylists Hate Boxed |
| 7 | 901 | 1322 | 0.0000 | 1.08 | 1.32 | 1.09 | 1.33 | 0 | NJ GECKO ' S Cape May , NJ SERAFINA Wyckoff , |
| 8 | 550 | 284 | 0.0000 | 1.05 | 1.19 | 1.48 | 1.31 | 0 | number of times : " May I suggest that you read |
| 9 | 586 | 38 | 0.0000 | 1.15 | 1.39 | 1.26 | 1.16 | 0 | Go To School . You May Qualify For Grants To Start |
| 10 | 799 | 218 | 0.0000 | 0.72 | 1.10 | 1.79 | 1.20 | 0 | : ( Estimated ) * May not reflect current interest rates |
| 11 | 848 | 162 | 0.0000 | 0.72 | 1.10 | 1.79 | 1.20 | 0 | : ( Estimated ) * May not reflect current interest rates |
| 12 | 336 | 453 | 0.0000 | 0.85 | 1.39 | 1.44 | 1.11 | 0 | Bags when Flying Comments You May Also Like How to Get |
| 13 | 1008 | 161 | 0.0000 | 0.72 | 1.39 | 1.44 | 1.11 | 0 | ( 2 min ) You May Also Like Comments Hulu Plus |
| 14 | 782 | 1587 | 0.0000 | 1.10 | 0.53 | 1.99 | 1.17 | 0 | - Jan 22 , 2012 May be beneficial . . . |
| 15 | 816 | 2104 | 0.0000 | 0.93 | 1.01 | 1.45 | 1.25 | 0 | Rihanna In Court Josh Smith May Become Free Agent 50 Cent |
| 16 | 1025 | 359 | 0.0000 | 1.10 | 1.31 | 1.50 | 0.98 | 1 | - $ 420 , 000 May . 28 , 2004 4944 |
| 17 | 300 | 951 | 0.0000 | 0.97 | 0.99 | 1.23 | 1.41 | 0 | Throat Strep ? Flu Vaccines May Protect the Heart Too Health |
| 18 | 616 | 395 | 0.0001 | 1.07 | 1.14 | 1.11 | 1.04 | 0 | Qwote Pitbull Bedroom ( David May Mix ) ( Off | |
| 19 | 1011 | 106 | 0.0001 | 1.16 | 1.01 | 1.09 | 1.24 | 0 | Press Review : * Mathilda May , in French Magazine ' |
| 20 | 145 | 117 | 0.0002 | 1.15 | 0.79 | 1.26 | 1.16 | 0 | To School Online . Moms May Qualify For Grants To Start |
| 21 | 502 | 497 | 0.0004 | 1.15 | 1.07 | 1.09 | 0.89 | 1 | 111 5207589 Current conducting system May , 1993 Lettenmayer 439 / |
| 22 | 1035 | 296 | 0.0005 | 0.90 | 0.73 | 1.42 | 1.20 | 1 | Tanaka , visited Beijing in May to welcome its 1000th member |
| 23 | 794 | 276 | 0.0005 | 1.08 | 0.92 | 1.14 | 1.02 | 1 | T F S S " May Jul » 1 2 3 |
| 24 | 404 | 599 | 0.0009 | 1.42 | 1.27 | 0.71 | 0.75 | 1 | . Caught on the river May 04 2012 11 : 22 |
| 25 | 429 | 1332 | 0.0012 | 0.79 | 0.90 | 1.16 | 1.17 | 1 | 99 2mm Genuine Birthstone - May Emerald Yellow Gold Nose Bone |
| 26 | 947 | 1278 | 0.0044 | 0.94 | 0.61 | 1.34 | 0.58 | 0 | Makete Katsu ( Japan ) May Queen ( Korean ) Miss |
| 27 | 0 | 174 | 0.0060 | 1.05 | 0.84 | 0.37 | 1.42 | 1 | Article Index Akashadoothu : 09 May 2012 current position Watch Aakashadoothu |
| 28 | 659 | 134 | 0.0062 | 1.42 | 0.96 | 0.51 | 1.20 | 1 | World and Beating the Odds May 2006 Views : 23 | |
| 29 | 841 | 40 | 0.0080 | 1.06 | 1.31 | 0.64 | 0.28 | 1 | & Health Culture Change Language May 10 , 2012 , 4 |
| 30 | 318 | 1311 | 0.0102 | 0.91 | 0.61 | 1.33 | 0.88 | 1 | ( May ' 11 ) May ' 11 animal control 3 |
| 31 | 533 | 84 | 0.0124 | 1.16 | 1.11 | 0.43 | 0.98 | 1 | - • - Popular Venues May 2008 The River Ranch - |
| 32 | 530 | 40 | 0.0167 | 1.18 | 0.77 | 0.64 | 1.20 | 1 | : 01 AM - 24 May 12 • Embed this Tweet |
| 33 | 772 | 546 | 0.0186 | 1.35 | 1.06 | 0.54 | 0.28 | 1 | is a Date object for May 28 , 2007 d = |
| 34 | 499 | 51 | 0.0209 | 1.15 | 0.47 | 1.12 | 1.03 | 1 | Br J Dermatol . 2010 May ; 162 ( 5 ) |
| 35 | 192 | 375 | 0.0255 | 0.84 | 0.64 | 1.49 | 1.06 | 1 | album Compass out 17th 18th May on Warp Records warp net |
| 36 | 821 | 329 | 0.0283 | 1.19 | 1.12 | 0.34 | 0.87 | 1 | ( Locks Received & Installed May 2011 - Yoda ) Also |
| 37 | 305 | 1252 | 0.0373 | 0.97 | 1.04 | 0.53 | 1.24 | 1 | Road . Both classes end May 27 . Beginners will attend |
| 38 | 875 | 1077 | 0.0434 | 0.95 | 0.78 | 0.79 | 1.15 | 1 | McDade 18 Jul 1913 15 May 1976 Davis , Noah Vester |
| 39 | 61 | 512 | 0.0454 | 1.19 | 0.92 | 0.54 | 1.00 | 1 | The Shiite pilgrims were abducted May 22 after crossing into Syria |
| 40 | 1031 | 190 | 0.0461 | 1.12 | 0.73 | 0.37 | 1.23 | 1 | studies at Bradley University in May 2012 and am always looking |
| 41 | 763 | 359 | 0.0466 | 1.00 | 0.72 | 0.73 | 0.87 | 1 | March . Summer Rates : May 1 - November 14 ; |
| 42 | 393 | 1223 | 0.0503 | 1.07 | 0.63 | 0.72 | 1.24 | 1 | - 25 . Epub 2006 May 4 . ClinicalTrials . gov |
| 43 | 86 | 105 | 0.0525 | 1.19 | 1.17 | 0.54 | 0.28 | 1 | contract Vigneault ' s contract May 23 , 2012 7 : |
| 44 | 694 | 275 | 0.0769 | 1.19 | 1.11 | 0.54 | 0.28 | 1 | infringing Oracle ' s patents May 23 , 2012 1 : |

TABLE 5-continued

| # | Doc# | pos | Prob | Ev#0 | Ev#1 | Ev#2 | Ev#3 | Label | N-gram |
|---|------|-----|------|------|------|------|------|-------|--------|
| 45 | 610 | 1678 | 0.1129 | 1.10 | 0.51 | 0.59 | 1.24 | 1 | Baba ' s film on May 13 . Those of us |
| 46 | 814 | 87 | 0.1263 | 1.01 | 0.91 | 0.37 | 1.01 | 1 | Cwpan Ceredgion Fixtures Results 7 May 2012 Final New Quay 3 |
| 47 | 438 | 1156 | 0.1341 | 1.10 | 1.02 | 0.59 | 0.28 | 1 | Helpful Customer Reviews Adult Briefs May 18 , 2012 By Dave |
| 48 | 656 | 60 | 0.1345 | 1.00 | 0.69 | 0.47 | 1.12 | 1 | brands Essay by swashukla , May 2007 download word file , |
| 49 | 872 | 430 | 0.1490 | 0.74 | 1.01 | 0.37 | 1.24 | 1 | the last update on 3 May 2012 . [ State of |
| 50 | 152 | 381 | 0.1501 | 1.02 | 1.07 | 0.59 | 0.28 | 1 | Angeles , CA Robert Pattinson May 13 , 1986 London , |
| 51 | 13 | 1061 | 0.1752 | 1.12 | 0.51 | 0.72 | 0.75 | 1 | 0 Hot - Juan on May 4 2012 # growrealfood - |
| 52 | 172 | 67 | 0.1823 | 1.01 | 1.33 | 0.53 | 0.28 | 1 | Stafford from his hospital bed May 29th , 2012 at 11 |
| 53 | 419 | 3 | 0.2125 | 0.83 | 0.72 | 0.63 | 1.13 | 1 | ..Communicator Archives : May 2002 Choose another issue Is |
| 54 | 347 | 283 | 0.2152 | 1.01 | 1.04 | 0.59 | 0.28 | 1 | of Elsa Margareta Sibirien 1736 May 18 , 1736 Age 18 |
| 55 | 217 | 402 | 0.2351 | 0.83 | 1.33 | 0.59 | 0.28 | 1 | the survey cutoff date was May 18 , meaning that the |
| 56 | 299 | 651 | 0.2386 | 0.83 | 0.61 | 0.71 | 0.93 | 1 | ) June ( 30 ) May ( 15 ) April ( |
| 57 | 67 | 459 | 0.2790 | 1.17 | 0.77 | 0.37 | 0.90 | 1 | Section A Section A 30 May 2012 S M T W |
| 58 | 939 | 39 | 0.2984 | 1.05 | 0.76 | 0.37 | 1.21 | 1 | robotic library Updated : 21 May 2010 | 19 comments Chris |
| 59 | 230 | 63 | 0.3124 | 1.10 | 0.78 | 0.79 | 0.28 | 1 | . m . , updated May 2 , 2011 at 11 |
| 60 | 588 | 581 | 0.3167 | 1.03 | 0.92 | 0.64 | 0.28 | 1 | life : D Dominic Watson May 12 , 2010 at 6 |
| 61 | 422 | 114 | 0.3200 | 1.18 | 0.77 | 0.37 | 0.87 | 1 | communities . Kolkata - 24 May 2012 - Cargill re - |
| 62 | 270 | 1969 | 0.3967 | 1.10 | 0.80 | 0.37 | 0.92 | 1 | hit - Wed , 02 May 2012 16 : 25 : |
| 63 | 826 | 50 | 0.4446 | 1.18 | 0.70 | 0.64 | 0.81 | 1 | : 45 PM - 31 May 12 via TweetDeck • Embed |
| 64 | 330 | 1001 | 0.5139 | 1.15 | 0.41 | 0.71 | 0.98 | 1 | Gift twenty two . ̄ May ( 28 ) ̄ April |
| 65 | 1033 | 534 | 0.5152 | 0.85 | 0.90 | 0.37 | 0.87 | 1 | _ Master 12 Comments 10 May 2012 - 01 : 44 |
| 66 | 573 | 193 | 0.5254 | 1.05 | 0.82 | 0.43 | 0.87 | 1 | AIDS Article Date : 01 May 2008 - 5 : 00 |
| 67 | 758 | 1734 | 0.6657 | 1.15 | 0.41 | 0.71 | 0.89 | 1 | Formulas . . . ̄ May ( 9 ) ̄ April |
| 68 | 58 | 137 | 0.7770 | 1.05 | 0.76 | 0.37 | 0.80 | 1 | . . published : 21 May 2012 Author : Magnolia3Scooby 4 |
| 69 | 9 | 1559 | 0.7961 | 0.95 | 0.86 | 0.59 | 0.28 | 1 | announced Hero Complex Film Festival May 18 , 19 , 20th |
| 70 | 726 | 563 | 0.8236 | 0.79 | 0.73 | 0.37 | 1.15 | 1 | . Flag as inappropriate 27 May 2010 Georgia commented on this |
| 71 | 198 | 15 | 0.8330 | 0.82 | 0.96 | 0.59 | 0.28 | 1 | Punk editor rating release date May 16 , 1995 duration 31 |
| 72 | 667 | 140 | 0.8689 | 0.86 | 0.69 | 0.55 | 0.28 | 1 | 12 : 04 AM , May 24 , 2012 | comments |
| 73 | 684 | 1703 | 0.8874 | 1.02 | 0.61 | 0.37 | 0.58 | 1 | June 2010 ( 564 ) May 2010 ( 658 ) April |
| 74 | 3 | 471 | 0.8970 | 0.72 | 0.41 | 0.71 | 0.92 | 1 | June ( 2 ) ̄ May ( 4 ) ▼ April |
| 75 | 560 | 961 | 0.8993 | 0.74 | 0.77 | 0.37 | 0.77 | 1 | Posted by Dicky on 30 May 2012 at 17 : 32 |
| 76 | 297 | 26 | 0.9143 | 0.89 | 0.51 | 0.64 | 0.28 | 1 | Pages This item sold on May 10 , 2011 . Here |
| 77 | 862 | 739 | 0.9150 | 0.72 | 0.41 | 0.71 | 0.90 | 1 | June ( 9 ) ̄ May ( 7 ) ̄ April |
| 78 | 651 | 84 | 0.9321 | 0.75 | 0.72 | 0.67 | 0.28 | 1 | : Java Last Modified : May 6 , 2009 Snippet / |
| 79 | 267 | 155 | 0.9330 | 0.87 | 0.61 | 0.47 | 0.58 | 1 | June 2007 ( 1 ) May 2007 ( 11 ) April |
| 80 | 342 | 709 | 0.9392 | 0.84 | 0.61 | 0.37 | 0.58 | 1 | June 2012 ( 26 ) May 2012 ( 167 ) April |
| 81 | 325 | 533 | 0.9629 | 0.95 | 0.78 | 0.34 | 0.28 | 1 | DIONIS RUIZ 6 307 16 May 2011 , 10 : 41 |
| 82 | 274 | 489 | 0.9649 | 0.92 | 0.51 | 0.56 | 0.28 | 1 | Reply ↓ Mac Hayes on May 19 , 2012 at 5 |
| 83 | 689 | 624 | 0.9693 | 0.64 | 0.72 | 0.40 | 0.90 | 1 | jar84203 Member Join Date : May 2009 Posts : 85 Thanks |
| 84 | 613 | 1235 | 0.9785 | 0.88 | 0.65 | 0.34 | 0.90 | 1 | jjaudio Swap Meet 4 20th May 2011 12 : 29 PM |
| 85 | 662 | 812 | 0.9850 | 1.01 | 0.49 | 0.73 | 0.56 | 1 | ; E - Learning industry May 1995 - January 1996 ( |
| 86 | 405 | 1440 | 0.9915 | 0.64 | 0.72 | 0.47 | 0.69 | 1 | Registered User Join Date : May 2007 Location : Illinois For |
| 87 | 557 | 51 | 0.9923 | 0.64 | 0.72 | 0.56 | 0.28 | 1 | Light Against Dark Released : May 19 , 2008 Label : |
| 88 | 578 | 201 | 0.9937 | 0.71 | 0.51 | 0.57 | 0.28 | 1 | This photo was taken on May 25 , 2012 . 128 |
| 89 | 372 | 378 | 0.9942 | 0.68 | 0.53 | 0.37 | 0.77 | 1 | in Dandeli Archives June 2012 May 2012 Categories dandeli Dandeli Forest |
| 90 | 496 | 196 | 0.9967 | 0.46 | 0.72 | 0.53 | 0.28 | 1 | Storage Content | Posted : May 27 , 2008 4 : |
| 91 | 287 | 250 | 0.9975 | 0.87 | 0.62 | 0.37 | 0.28 | 1 | Display Modes # 1 30th May 2010 , 14 : 28 |
| 92 | 11 | 550 | 0.9978 | 0.68 | 0.53 | 0.37 | 0.67 | 1 | 2012 July 2012 June 2012 May 2012 April 2012 Categories 40 |
| 93 | 537 | 1026 | 0.9978 | 0.68 | 0.53 | 0.37 | 0.67 | 1 | 2012 July 2012 June 2012 May 2012 April 2012 March 2012 |
| 94 | 251 | 72 | 0.9979 | 0.47 | 0.69 | 0.54 | 0.28 | 1 | Contributor Published : Saturday , May 23 , 2009 Print | |
| 95 | 865 | 1621 | 0.9985 | 0.43 | 0.69 | 0.55 | 0.28 | 1 | : ReportsnReports Posted Thursday , May 24 , 2012 at 10 |
| 96 | 900 | 202 | 0.9995 | 0.68 | 0.53 | 0.43 | 0.67 | 1 | 2008 July 2008 June 2008 May 2008 April 2008 March 2008 |
| 97 | 252 | 1462 | 0.9997 | 0.68 | 0.45 | 0.34 | 0.67 | 1 | 2011 October 2011 June 2011 May 2011 April 2011 March 2011 |
| 98 | 518 | 559 | 0.9997 | 0.68 | 0.49 | 0.40 | 0.67 | 1 | 2009 October 2009 June 2009 May 2009 April 2009 March 2009 |
| 99 | 594 | 200 | 0.9997 | 0.79 | 0.49 | 0.51 | 0.56 | 1 | WIT ; Management Consulting industry May 2006 - January 2010 ( |

V. Segmentation and Schematization

A. Segments

By construction, the bag-of-words representation ignores all relationships between words. This may be a limitation because ordering and grouping information can be valuable. For instance, decomposing a forum web page into a sequence of individual posts could be useful for finding posts that compare two products. In the bag-of-words representation, one would get a hit every time two posts mentioning the two products appear in the same page. Decomposing a schema into individual fields allows field-targeted search and pivoting. This could be useful for finding recipes that have less than 500 calories per serving and a cooking time under 20 minutes.

To enable these capabilities, assume that each item consists of an ordered sequence of tokens. This token-based representation is much richer than bag-of-words. The tokens' positions induce an ordering and a proximity metric between tokens. The distance between two tokens is the absolute difference between their positions. (In this section, a one-dimensional topology is assumed for simplicity. A two-dimensional topology is possible but more complicated (segments are replaced by rectangles.)) A segment is defined as a pair (b,e) of positions in the document. The first position b (for begin) points to the first token of the segment. The second position e (for end) points to the first token outside the segment. Each segment characterizes a group of adjacent tokens inside the document. A document segmentation is a collection $(s_0, \ldots, s_{k-1})$ of k disjoint segments. More formally, the set of possible segmentations of a document of n tokens is defined by:

$$S = \left\{ \begin{array}{l} s{:}s = (s_0, \ldots, s_{k-1}){:}k \leq n, \forall\, i \in 0 \ldots k-1, \\ s_i = (b_i, e_i){:}0 \leq b_0, b_i < e_i, e_i \leq b_{i+1}, e_{k-1} \leq n \end{array} \right\}$$

A feature $f_j$ (i,d) is a vector function of the document d, defined over each of the token position i. The featurization of the document is defined as $f(d)=(f_0(., d), \ldots, f_{J-1}(.,d))$, where J is the number of individual features. Note that the feature value at position i may depend on the whole document. This definition of feature is general enough to encompass global features (constant over all tokens), token features (features whose value at position i only depend on the token at that position), or trellis (which will be introduced later in this section). A segment classifier h is a function that computes a probability:

$$h{:}d,s,w \rightarrow h(f(d),s,w)$$

where d is the original data, f(d) is a featurization of the token data, s is a segmentation over the tokens, and w is a trainable parameter vector. Ideally, the segment classifier should verify:

$$\sum_{s \in S} h(f(d), s, w) = 1$$

Figure 9:
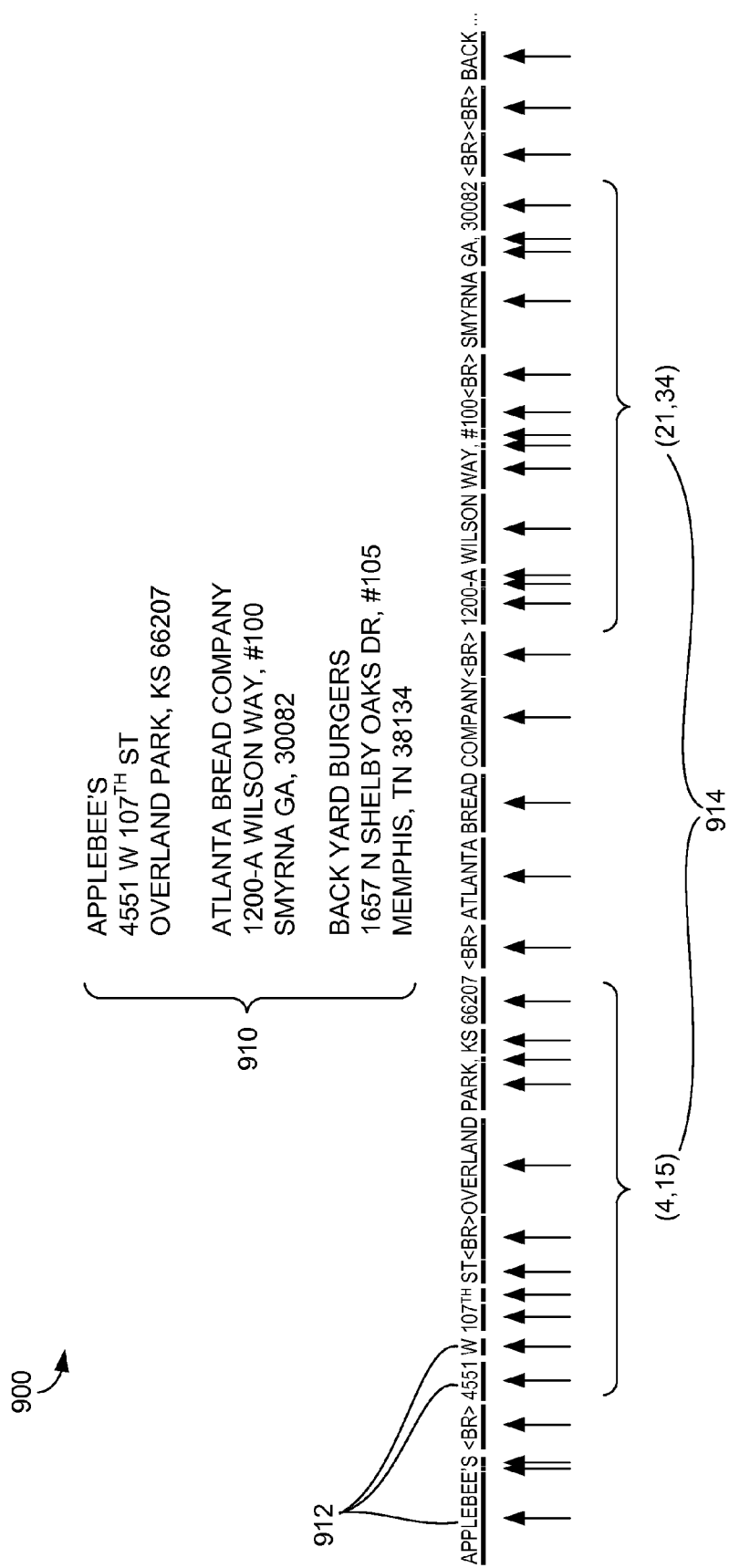
FIG. 9 depicts an exemplary segmentation of a street address in accordance with an embodiment of the present invention.

FIG. 9 illustrates an exemplary segmentation 900 of a street address. The top part of FIG. 9 is a visualization of the data 910 (a portion of a web page). Below that is a token representation 912 of the same data, with a street address segmentation 914 underneath: s=((4,15),(21,34),(40,53)).

The street address segmentation contains 3 segments 914 labeled as "street address" (however, the third segment is not shown because of space constraints on the page). A restaurant name segmentation would have returned ((0,3), (17,20), (36,39)). Ideally a street address segment classifier would return h(f(d), s, w)=1 for s=(4,15), (21,34), (40,53)) and 0 for any other value of s. This would be the target signal, or segment label.

B. Modularity and Trellis

Schemas have a recursive structure. A schema's field can itself be a schema. For example, a StreetAddress schema can be made out of 5 sub-schemas:
StreetAddress
  Street
  City
  State
  Zip code
  Country As defined herein, the modularity constraint is the ability to build segmenters independently of the context in which they can be used. The benefit of modularity is that once a segmenter is built, it can be used as a feature for a higher level segmenter in a bottom fashion (similar to the features of a classifier). As described earlier, features are constrained to be immutable. This implies that once a segmenter is built, it will not be retrained inside a higher level segmenter to take advantage of contextual information. This at first appears to be a severe limitation. For instance, a street extractor would do a much better job if it knew about context. Is "Smith Lane, 1234" a street address or a name? If a lower level segmenter decides what is a street and what isn't, the higher level address segmenter is not likely to perform well.

Figure 10:
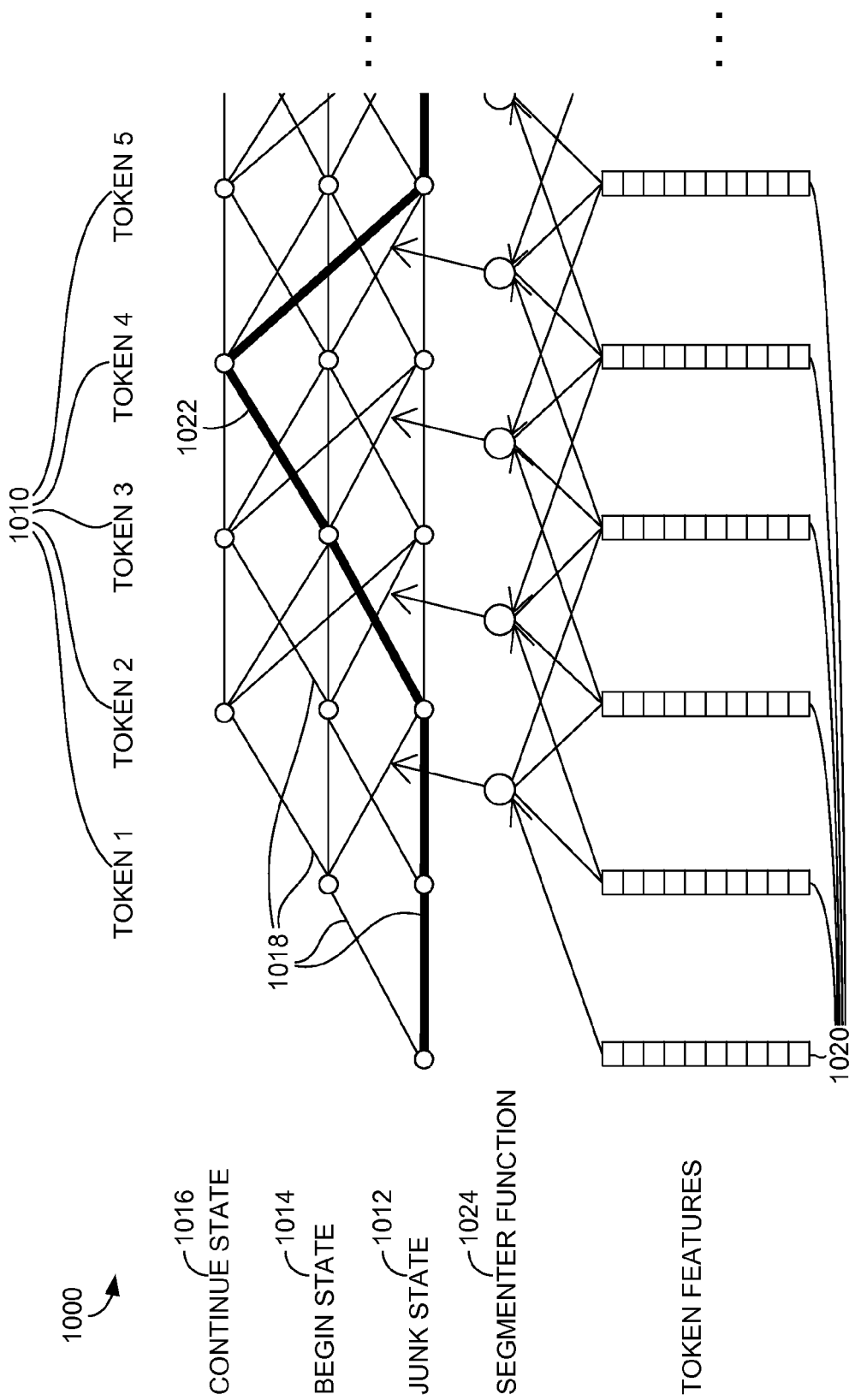
FIG. 10 depicts an exemplary trellis representation of a segmenter in accordance with an embodiment of the present invention.

Trellis:

To circumvent this problem, a constraint is imposed that the segmenter return not a segmentation, but a trellis. A trellis is a transition graph between the states of each token. FIG. 10 illustrates a trellis representation 1000 of a segmenter 1024. For a given entity extractor, each token 1010 has 3 states: Junk 1012 (entity not detected), Begin 1014 (first token of entity), and Continue 1016 (subsequent tokens 1010 of entity). The edges 1018 are the transition probability from one token 1010 to the next. A segmentation is the most likely path from the beginning of the document to the end of the document. The transition probabilities are a convolution function over a window of token features. Let $e_{s_1,s_2,i}$ denotes the transition probability between the state $s_1$ of token i and the state $s_2$ of token i+1. Then $$e_{s_1,s_2,i}=g(f(d)_i, w_{s_1,s_2})$$

where g is a fixed trainable function, $f(d)_i$ is a token featurization window centered on i, and $w_{s_1,s_2}$ is a set of trainable parameters for each transition $s_1,s_2$. As described above, the begin state 1014 and continue state 1016 are states where the segment has been detected, and the state transition edges 1018 are functions of the token features 1020 that compute the probability of a transition. In absence of other constraints, the segmentation is the optimal transition path 1022 (heavy solid line).

An advantage of the trellis representation is that it allows a low level segmenter to communicate to a higher level segmenter the probability of every possible segmentation. In the absence of other constraints, the default segmentation is the optimal path to traverse the trellis. This can be computed in O(n) steps using dynamic programming. When a low level segmentation is used by a higher level segmenter, the higher level segmenter can output its segmentation, and then find the optimal lower level segmentation by finding the optimal transition path subject to constraints. For instance, for an address segmenter, the sub-segments (street, city, Zip code, state, and country) cannot cross the address boundaries (parent constraint) and a given token can only belong to one of the sub-segments (sibling constraint). In other words, the sub-segmenters do not make the final decisions for their own segment. They provide a probability for each possible segmentation for the level above where the decision is made. Computing the high level segmentation is a bottom up process. It is followed by a field filling pass (or back-segmentation) where new segmentation at each level are computed using the current trellis and constraints from parents and siblings.

For each sub-segmenter, the total number of possible segmentations and their corresponding probability is $O(2^n)$ for n tokens. Fortunately, the trellis representation carries all that information in O(n) space. To compute the probability of a particular segmentation from the trellis, one can simply determine which of the 3 states each token is in and sum all the edges while following the corresponding path on the trellis.

When a trellis is used as a feature for training a higher level segmenter, it becomes a token feature (every edge value is associated to the token to its left).

C. Labeling Segments

Labeling segments could be extremely tedious. Each word in a document requires a label. The trellis structure allows for interactive segment labeling. The main feature of a trellis is that it enables the search for the optimal path subject to constraints on the states. The default segmentation comes from the optimal trellis path without constraints. This segmentation can assign the default labels to each visible token. The labels can be made visible to the operator by highlighting the visual representations (e.g., words) of the corresponding tokens when they are either in the Begin or Continue state.

Each click on the bounding box of a visible token (e.g., word) toggles the state of the token. The distinction between Begin and Continue is a rather subtle one; it allows the distinction between a long segment and two adjacent ones. This is a UX challenge. Once a visible token has been clicked, it is constrained. Tokens that have never been clicked are unconstrained. For every operator click on a visible token, a constraint has been added/changed/removed. This triggers a dynamic programming optimization on the trellis to find the new resulting optimal path in O(n) steps. This will likely change the default labels of the remaining unconstrained tokens. In other words, the system is working with the operator to always display the best solution given the operator constraints. For instance, one click anywhere on a missed address is likely to trigger the whole address to be labeled as a segment correctly. This is because if any of the address token is part of an address segment, the likelihoods of the adjacent tokens to be part of an address are greatly increased. If the optimal trellis path is computed on every click, tokens tend to flip in logical groups. This makes labeling segments less tedious and requires less hand-eye coordination. Note that every click is forward progress because it results in an added constraint. A visual clue may be provided to indicate which visual tokens got their values by default and which got their values by labeling.

Confidence:

Similar to classification labels, it may be desirable to deemphasize the importance of labeling accuracy. It is desirable that the operator would only look at segments or missed segments that have a low confidence and label these first. An interesting UX challenge is: how should confidence be displayed?

Given a document with a few identified segments, the low confidence segments should visually pop out so that the operator could zoom in on these, make a decision, and submit the new labels without having to read the whole document. This is even more desirable for missed segments. On a given document, the most likely candidate for a segment should visually pop out so that the operator can zoom in on these and take the appropriate action. If there are no low-confidence candidates, the operator should be able to ignore the whole document without reading it.

Displaying segment confidence is not trivial. There are $O(2^n)$ possible segmentations. Displaying confidence at the token level would be misleading and the page would look like salt and pepper. For instance, every number or instance of the word "main" could be a candidate for a missed address.

This problem is solved by going back to the trellis representation. The default path provides a path score at the document level. Called this score the Default Optimal Path Score, or DOPS. This global score has no meaning at the token level. If a token is clicked, its label is changed and the new optimal path given this constraint provides a different score. Call this new score COPS (token), for constrained optimal path score. This new score by itself has no meaning at the token level. However, the difference Conf(token)=DOPC−COPS(token)

is the system estimate of the effect of flipping the label of a given token. If the difference is close to 0, then the system is not confident that it has the right label (flipping it has not effect). Note that 0≤Conf(token)≤1 since path scores are probabilities and DOPC is the optimal path when no state is constrained. If the score is close to 0, then the system is not confident on whether the corresponding token belongs to a segment. From a UX perspective, confidence can be color-coded at the token level, or the low confidence tokens, which verify Conf (token)≤K, where K is a confidence threshold, can be highlighted. Since labels tend to flip in groups, adjacent tokens are likely to have the same score differences, so it is possible to indicate to the operator which tokens will flip together when one label is changed. It is at least plausible that an operator may label a document by just looking at the low confidence segments (or low confidence non-segments) and may take action only on these segments without having to read the entire document. This is a significant decrease of the segment labeling cost.

The optimal path given a constraint is computed in O(n) using dynamic programming. If Conf (token) is computed for every token, a naïve implementation would consume $O(n^2)$ steps. If a document has 100,000 tokens, this could become a problem. Fortunately, the whole function Conf (token) can be computed in O(n). The trick is to do two dynamic programming passes, one in each direction, to compute the optimal path in both directions from the current token to each end of the document. Both of these passes are done in O(n). The quantity Conf (token) is simply the sum of the scores of the two half paths.

To find the documents that are most likely to have a segment, the segment classifier can be turned into a regular classifier with the operation:

$$h':d, w \to \sum_{\forall s \; s.t. \; s \neq ()} h(f(d), s, w) = 1 - h(f(d), (), w)$$

In other words, h' is the sum of the probabilities of all segmentations that contain at least one segment. It returns the probability that there is at least one segment on the page.

VI. Segment Extraction

Figure 11:
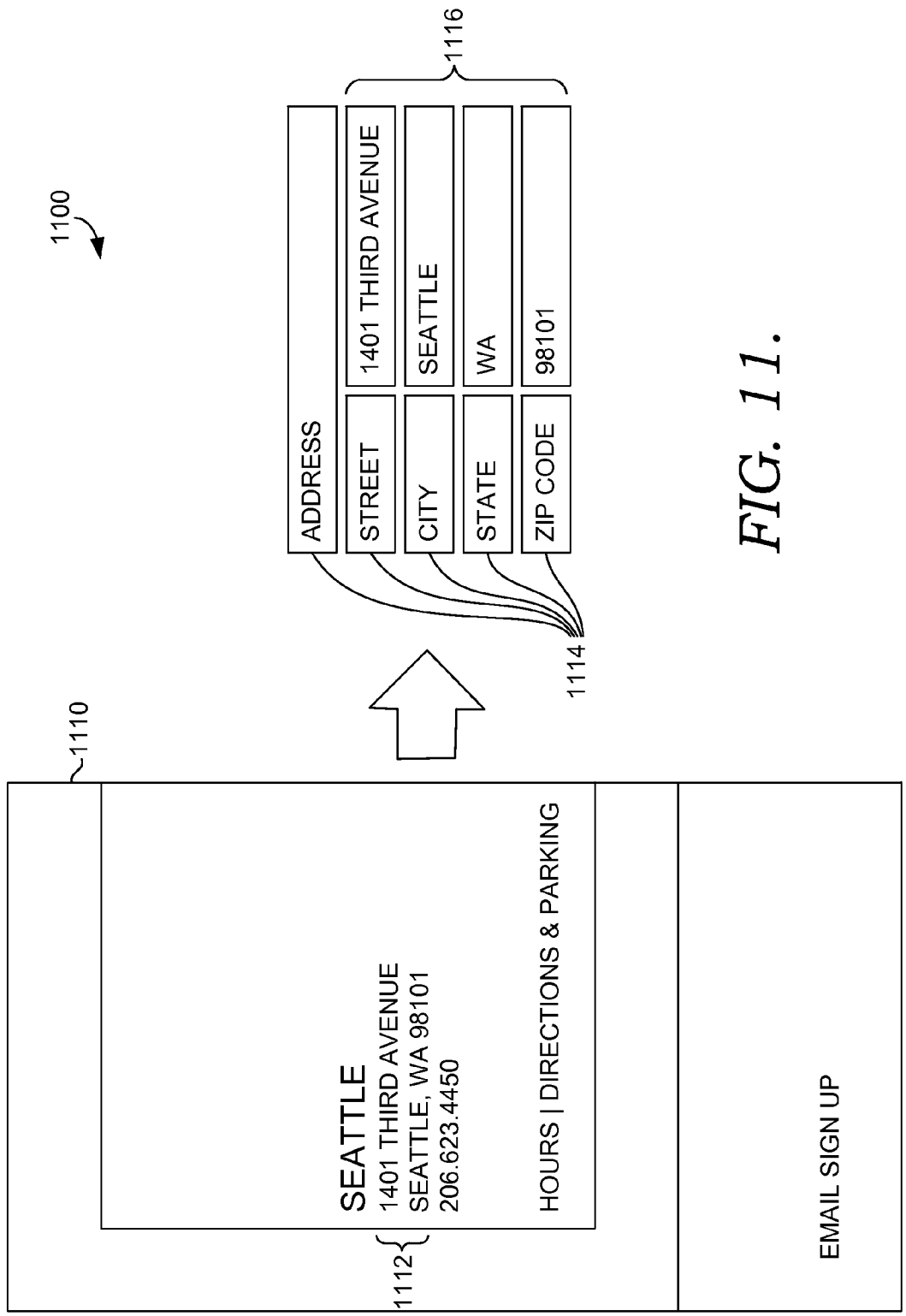
FIG. 11 depicts exemplary parts of an address that have been extracted from a web page in accordance with an embodiment of the present invention.

Segment extraction (AKA entity extraction or EE) is the process of identifying token segments in a document that correspond to a given concept. As an example, suppose a user is interested in automatically extracting addresses and their constituent parts (city, state, etc.) from a web page so that he or she can quickly look them up on a map. FIG. 11 depicts a simplified representation of a web page 1110 that includes an address 1112 along with labels 1114 and corresponding constituent parts 1116 of the address that have been extracted from the web page.

Figure 12:
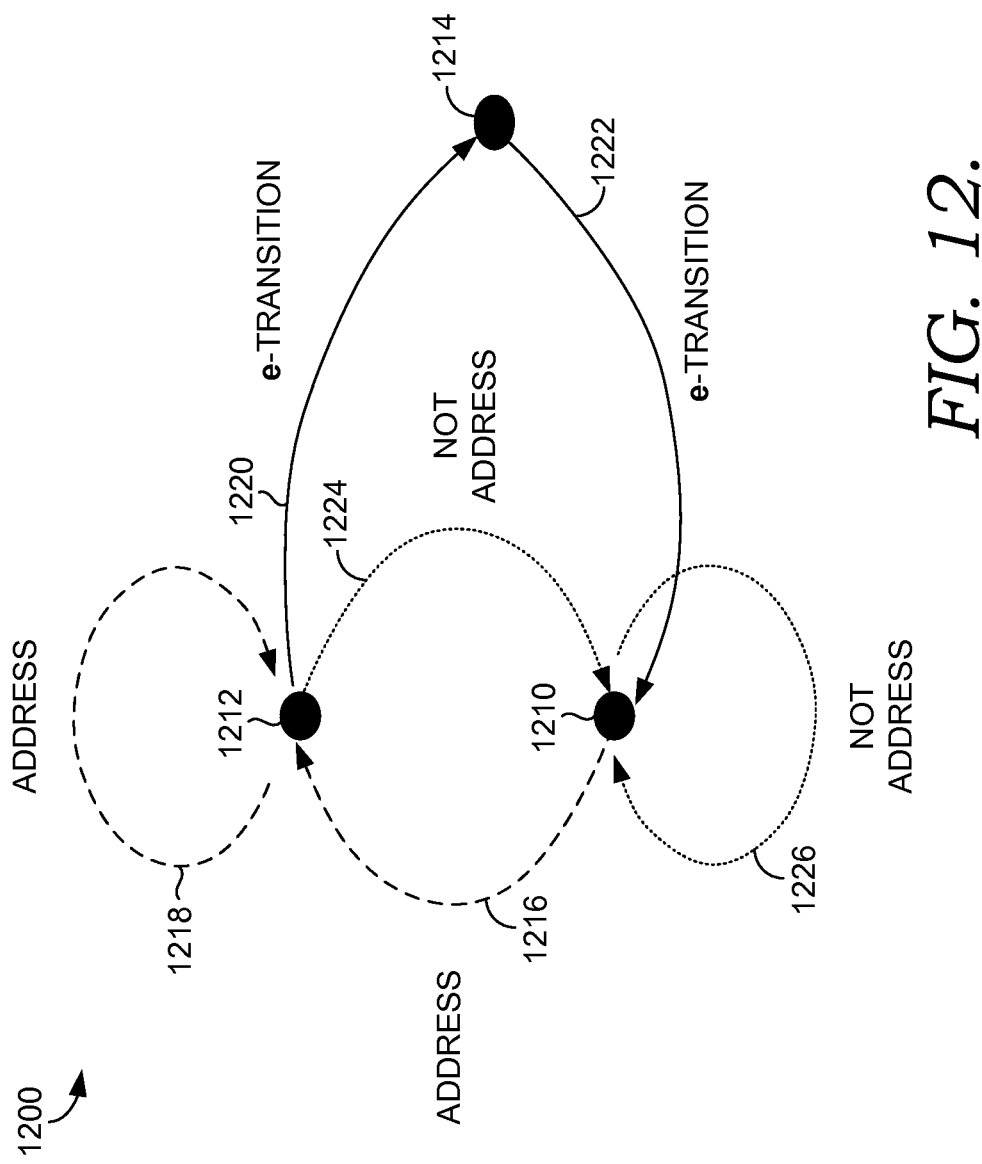
FIG. 12 depicts an exemplary finite state machine for extracting addresses in accordance with an embodiment of the present invention.

Statistical methods for segment extraction typically use training data to build a finite state machine (FSM) that can be used to decode a document. An example finite state machine for extracting addresses is illustrated in FIG. 12. The nodes 1210, 1212, and 1214 are the states of the FSM, and the edges 1216, 1218, 1220, 1222, 1224, and 1226 are transitions between states. Each dashed transition (1218 and 1216) "consumes" a document token and labels it as being part of an address, whereas each dotted edge (1214 and 1224) consumes a token and labels it as NOT being part of an address. The solid edges are epsilon transitions that do not consume any tokens.

Figure 13:
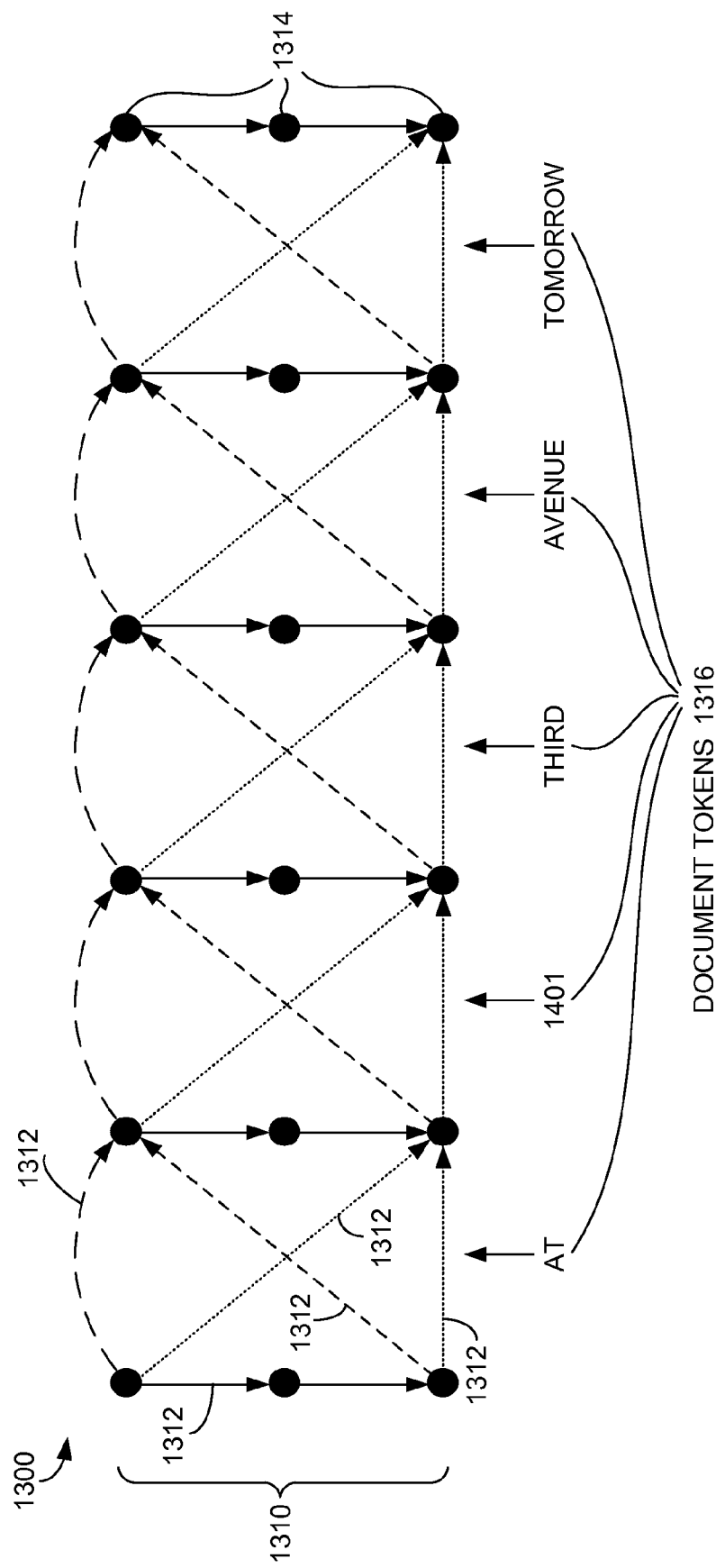
FIG. 13 depicts an exemplary finite state machine trellis for calculating path probabilities in accordance with an embodiment of the present invention.

Given a document, the FSM is "rolled out" to create a corresponding trellis that can be used to calculate path probabilities in the document, as illustrated in FIG. 13. FIG. 13 includes the trellis 1310, edges 1312, nodes 1314, and document tokens 1316. For the sake of clarity, only some of the edges and nodes are labeled. FIG. 13 depicts each token 1316 aligned beneath the possible paths for that token.

Each edge 1312 in trellis 1310 has a weight that is a function of features in the document. Using standard decoding algorithms (e.g., Viterbi), one can identify the highest-weight path through the trellis 1310 and output the corresponding labeling of the tokens 1316 and transitions (edges) 1312. One can also train the weight functions so that the probability of any given path can be extracted.

Figure 14:
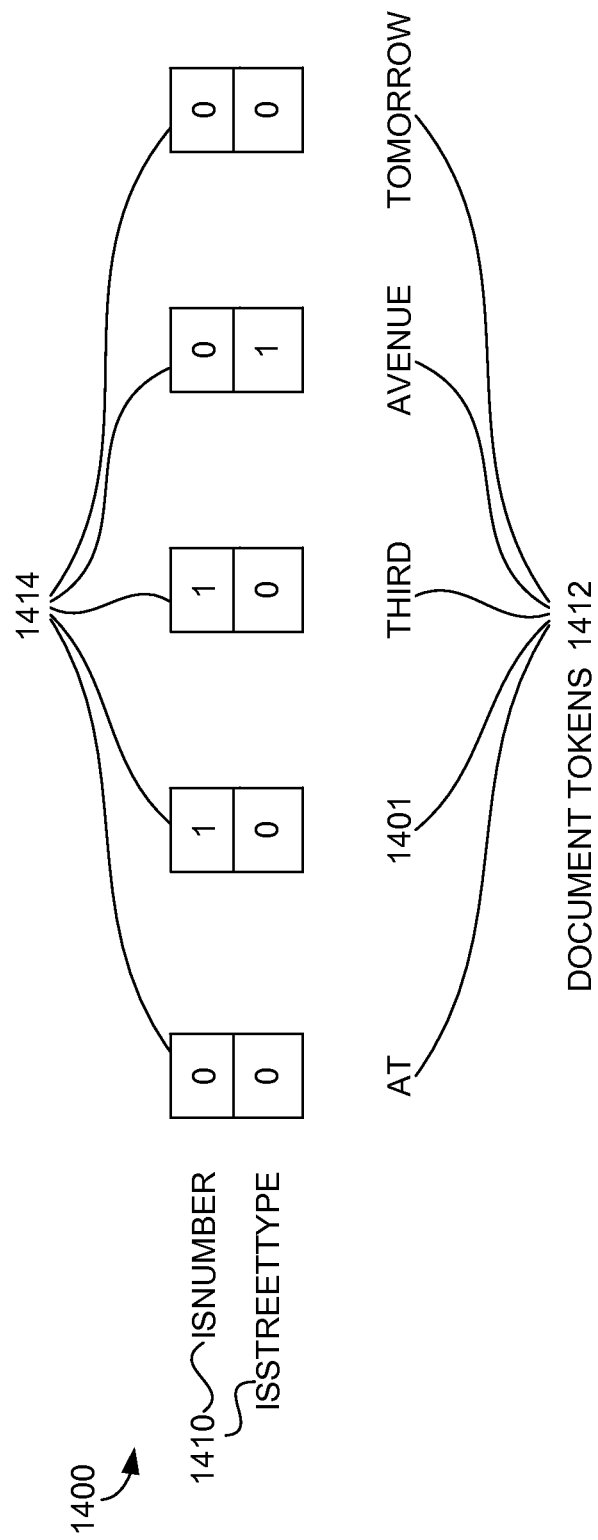
FIG. 14 depicts exemplary trellis edge-weight functions in accordance with an embodiment of the present invention.

The edge-weight functions are typically functions of token features that are "near" the edge of interest, although this is not a requirement. In the example under discussion, and with reference to FIG. 14, suppose there are two token features, IsNumber and IsStreetType, which are depicted as token features 1410. IsNumber, which is 1 if the token 1412 corresponds to a number ("1401" and "THIRD") and IsStreetType which is 1 for tokens 1412 corresponding to types of streets ("STREET", "ST", "AVENUE", "AVE"). Then each token 1412 has a corresponding feature vector 1414 of dimension 2, as illustrated in FIG. 14.

With reference again to FIG. 13, consider the edge-weight function for the solid "horizontal" edge in the trellis 1310. This function could look at the features of the token before the transition and the token after the transition:

Weight(Features)=$\theta_1$×IsNumber(token before)+$\theta_2$× IsStreetType(token before)+

$\theta_3$×IsNumber(token after)+$\theta_4$×IsStreetType(token after).

The parameters $\theta_i$ are trained to maximize some loss function on a training set. The training set typically contains labels that correspond to paths along a trellis. Intuitively, the training algorithms try to learn weight functions such that the labeled paths in the training data have higher total weight than the non-labeled paths.

Training data can also specify constraints on the allowed set of paths through a trellis without uniquely identifying a single path. In the example described above, one could have a label indicating that "1401," "THIRD," and "AVENUE" are all addresss tokens; because of the structure of the trellis, this does not uniquely identify the path, but rather constrains the path to the dashed token-consuming edges on the middle three tokens.

A. Hierarchical State Machine

In most segment-extraction domains, the concepts of interest are hierarchical. In the address example, an address has sub-concepts such as street, and street can have sub-concepts as well. Such a domain can be represented as a "concept hierarchy," where the root node represents the concept of interest, and children nodes correspond to mutually exclusive sub-components; by mutually exclusive is meant that a single token can belong to at most one of the sub-components (thus, "Third" can be part of a street or part of a zip code, but it cannot be part of both).

Finite state machines can be specified hierarchically in a number of different ways to simplify the representation. Consider a hierarchical finite state machine (HFSM) in which an FSM is defined recursively using modules; the transitions within a module can correspond to "normal" state transitions, or they can refer to transitions into sub-modules.

Figure 15:
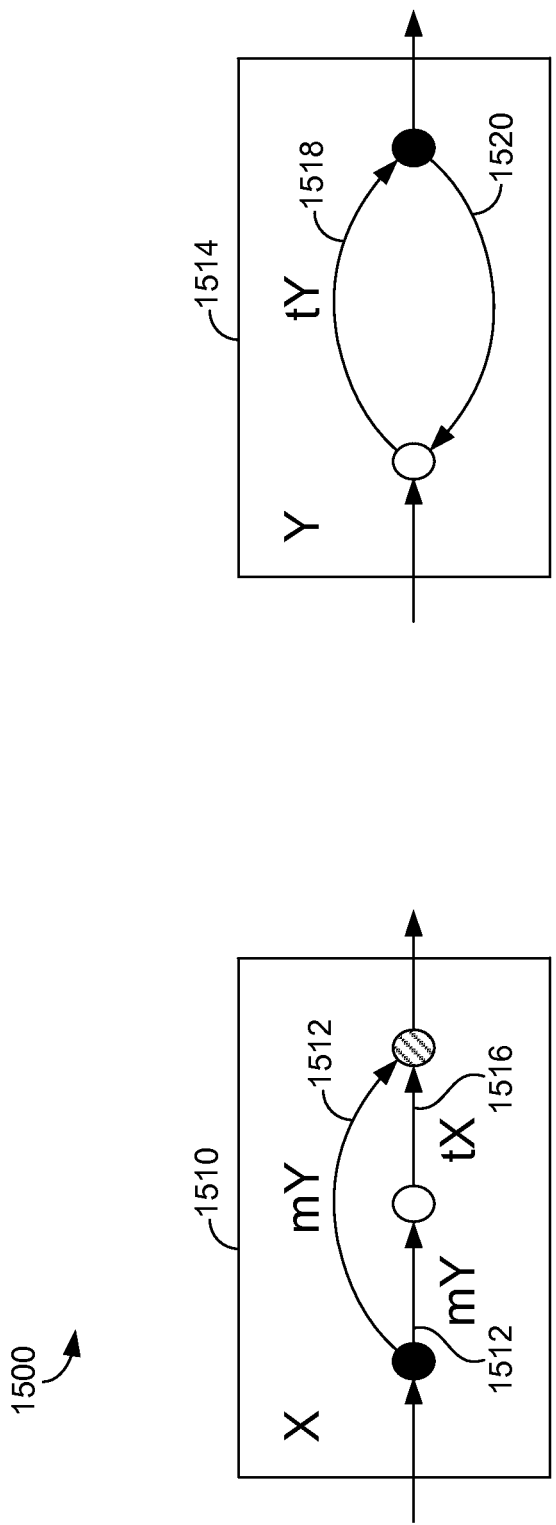
FIG. 15 depicts exemplary finite state machine modules in accordance with an embodiment of the present invention.
Figure 16:
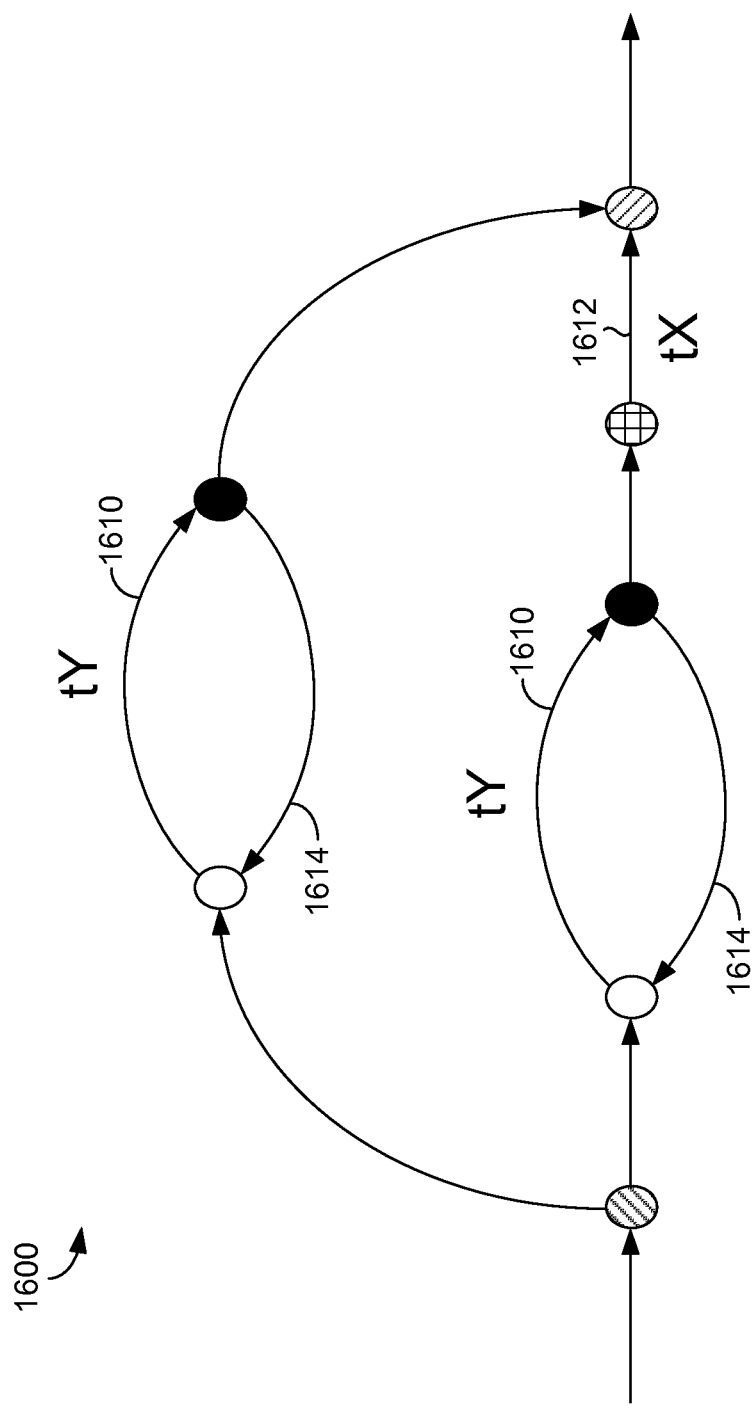
FIG. 16 depicts an exemplary finite state machine in accordance with an embodiment of the present invention.

As an example, FIG. 15 illustrates two modules. Module "X" 1510 on the left has module edges 1512, labeled "mY", which transition into module "Y" 1514 and a transition edge "tX" 1516, which is a normal transition edge that consumes a token. Module Y 1514 has a normal transition edge "tY" 1518 that consumes a token and a normal transition edge 1520 that does not consume any tokens. By recursively replacing the module edges 1512 with the sub modules, one recovers a standard corresponding FSM, as illustrated in the FSM 1600 depicted in FIG. 16. The FSM 1600 includes transition edges "tY" 1610, transition edge "tX" 1612, and transition edges 1614, which correspond, respectively, to transition edge "tX" 1516, transition edge "tY" 1518, and transition edge 1520 of FIG. 15.

B. Interactively Constructing Segment Extraction Models

To build a segment-extraction system for a domain, a machine-learning expert is typically needed to (1) define the structure of the underlying finite state machine, (2) define the feature functions for the edges, which requires tuning the size of the "window" to consider around each edge as well as which features to use, and (3) tune the resulting model so that it meets the performance requirements of the application. Also, the machine-learning expert usually starts with a fixed labeled training set and test set. Described below is a system that allows a domain expert to construct entity extraction models without the need for a machine-learning expert.

An interactive system for building segment extractors may include a means for the user to specify constraints governing whether a token belongs or not to a particular segment, and a means for storing these constraints as labels (labeling capability); a means for the system to re-compute and display the most plausible segments interactively using the latest user input, the current document information, and a trainable function (interactive propagation of labels, with no retraining); a means for the system to train the trainable function using all previously input labels (machine learning required, slow non-interactive training); and a means for the system to automatically select which example to label next, based on the score computed by the trainable function (active labeling).

C. Concept Hierarchy

With the technology described herein, domain experts can provide interactively a concept hierarchy corresponding to the domain of interest. In the address example, it does not take a machine-learning expert to be able to decompose an address into its constituent parts. By providing a user interface that allows the domain expert to specify the concept hierarchy, and then converting that hierarchy into an HFSM by using default structure within the modules, and/or by using labeled data to choose among candidate structures, sophisticated extraction models can be built without the domain expert knowing or caring about state machines.

Furthermore, the "language" that the domain expert uses can be extended to allow him to provide additional constraints within the machine. For example, the domain expert may want to state that an address can contain at most one zip code, or that any address must have a street portion present.

Additionally, a domain expert can build an extractor for some concept, and then "plug it in" as a sub-concept for another task. This corresponds to having modules in an HFSM correspond to previously trained HFSM. In the example, someone could build a zip-code extractor outside the context of addresses. Then, when specifying the concept hierarchy for addresses, the person could say that the zip-code sub-concept corresponds to the previous concept. When one does such a "plug in", one may decide to freeze the weights of the sub-machine so that they do not need to be trained in the new domain.

An interactive system for building segment extractors may include one or more of: a user interface allowing the user to specify interactively a concept hierarchy, and it may be that no other information about the hierarchical state machine is provided by the user, and the system uses default strategies and/or model-selection strategies to complete the specification of the hierarchical state machine. An interactive system for building segment extractors may be such that the user can provide a concept hierarchy and one or more additional constraints about the domain that translate into constraints on the hierarchical state machine, and may also be such that an additional constraint is that a sub-concept instance can occur at most once in an instance of its parent concept (e.g., an address can contain at most one zip code). There may also be additional constraints including that a sub-concept instance must appear at least once in an instance of its parent concept (e.g., an address must contain a state), a partial order over the sub-concepts (e.g., city must precede state in an address), and that two sibling sub-concepts cannot both appear in an instance of their parent concept (an address cannot contain a U.S. postal code and a Canadian postal code).

An interactive system for building segment extractors may also be such that previously built models for concepts can be re-used (e.g., someone builds a zip-code extractor and you can tell the system that you want to use that same extractor but in the context of your address extractor). It may also be that the parameters of the re-used extractor are frozen (i.e., the edge-weight functions are fixed) for the edges contained within the module, but where the edge-weight functions on the in-coming and out-going transition edges to that module are trained for context.

D. Label Modularity/Binary Labeling

When labeling a hierarchical concept such as address, it can be tedious to label all constituent parts of an address for every document. It is much easier for the domain user to concentrate on one node in the hierarchy ("Address" or "Zip Code") at a time, quickly labeling many documents.

Label modularity, as used herein with regard to labeling, refers to labeler focus, i.e., the ability to label/optimize for one module at a time. Note that because all modules are connected together in the HFSM, improvements and labels for one module can improve the other modules at the same time; label modularity is used specifically to mean modularity of user focus.

As used herein, a module in an HFSM is said to be binary if the labels to be elicited by the user are characterized by "in" or "out" labels on modules. In particular, a token labeled "in" is the restriction that the edge "consuming" the token must be contained with the given module or one of its descendants (e.g., if a token is labeled "Address," it can be any one of its child concepts or an implicit "Address:other"). Similarly, a token labeled "out" is the restriction that the edge "consuming" the token cannot be contained within the given module or any of its descendants.

A non-binary HFSM would be one where additional labels are available. For example, suppose a "Street" module consumed two distinct labels that do not correspond to sub-modules: Street1 and Street2. Then a labeling tool might be able to elicit from the user which type of street a token is. Of course, this could be converted into an equivalent binary labeling of IsStreet1 and IsStreet2.

Figure 17:
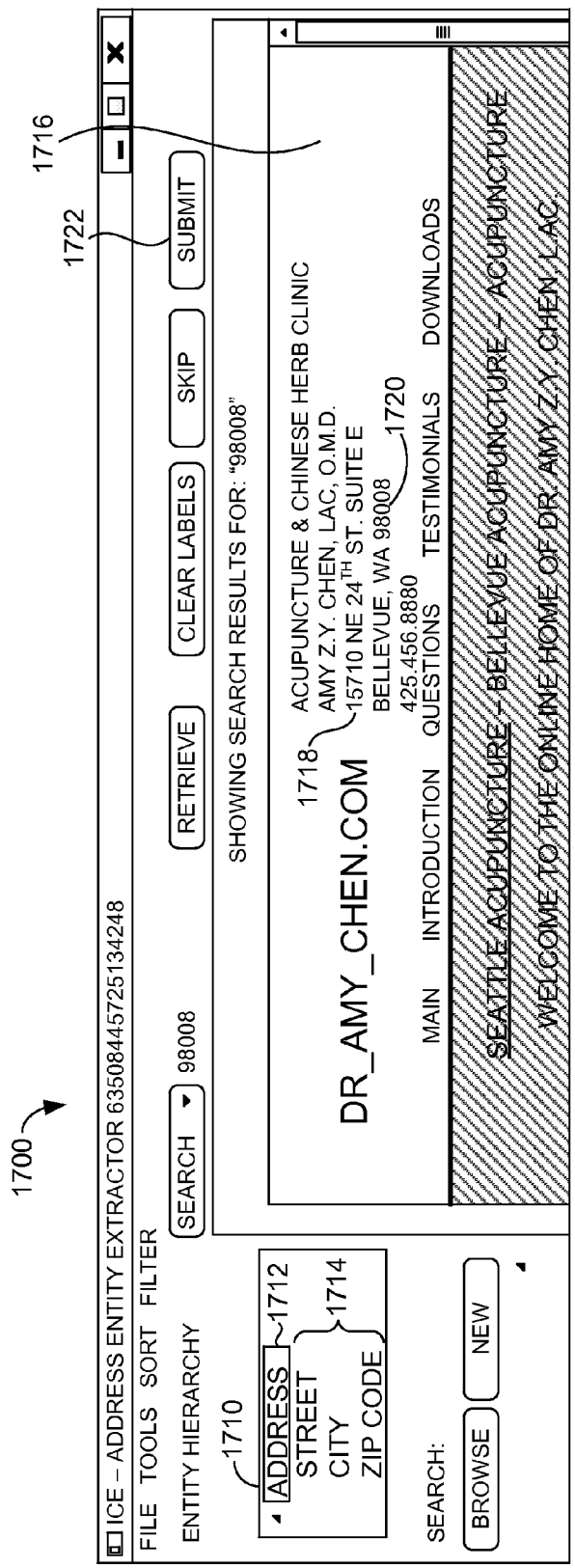
FIG. 17 depicts an exemplary screen shot of a system for binary labeling of addresses in accordance with an embodiment of the present invention.

When each module in an HFSM is binary, then a binary labeling tool can be used to elicit labels for the HFSM on a per-module basis. FIG. 17 depicts an exemplary screen shot 1700 of a system for binary labeling of addresses.

Figure 18:
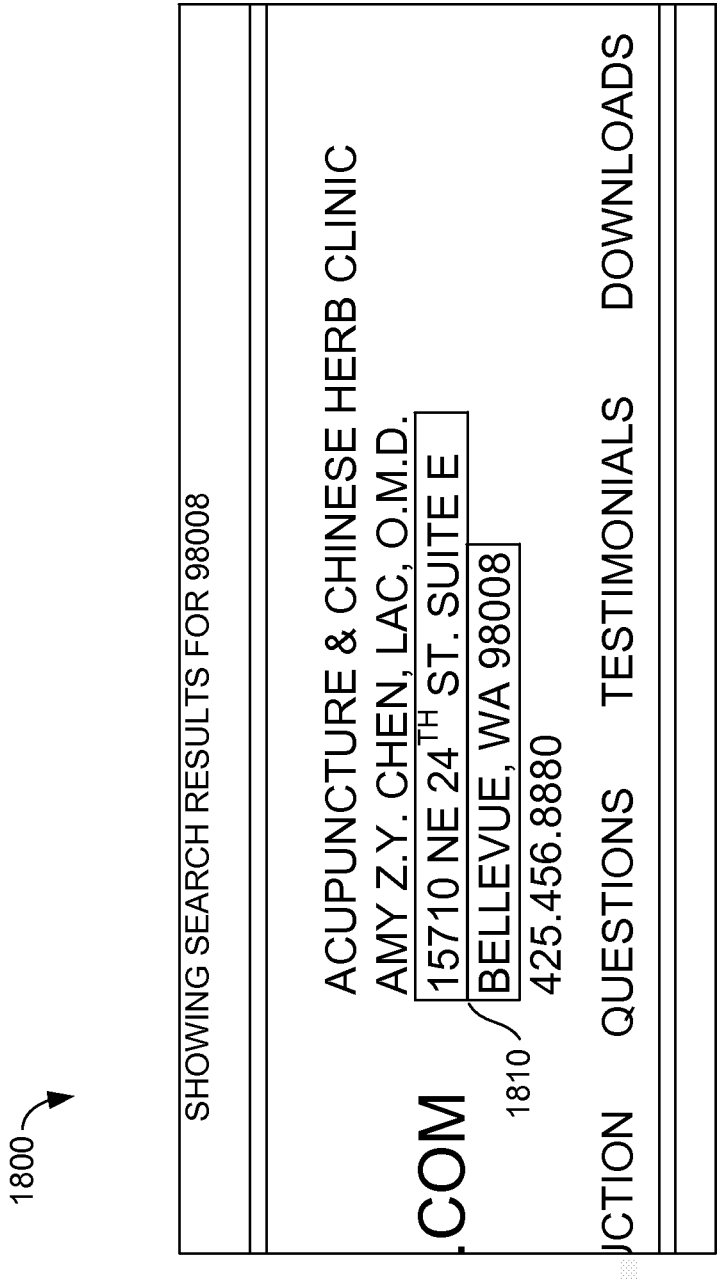
FIG. 18 depicts exemplary search results in a system for binary labeling of addresses in accordance with an embodiment of the present invention.

A concept hierarchy 1710 is shown on the left, having a root node 1712 ("Address") and three children 1714 ("Street," "City," and "Zip Code"). As depicted, the user has the root node 1712 selected. In the corresponding HFSM, there is a child concept "Address:Other" not shown explicitly to the user that allows the machine to accept address tokens that do not belong to the three children (such as punctuation, filler text, etc.). A web page 1716 returned as a search result is displayed on the right. To label the tokens on the page 1716 that are part of an address, having first selected the root node 1712, the user clicks on the first token 1718 ("15710 NE 24$^{TH}$ ST. SUITE E") and drags to the last token 1720 ("98008") of the address, thereby selecting the entire address portion. FIG. 18 depicts a portion of the search results from FIG. 17, and is generally referred to as search results 1800. FIG. 18 illustrates a user selection of an entire address portion 1810.

Note that knowing the tokens that are part of the address does not provide explicit labels about which tokens are Street, City or Zip Code. The user then clicks the Submit button 1722 of FIG. 17, and is shown a new document. The new document shown may be based on an explicit search term the user provided (e.g., pages containing "98008"), or based on an active learning algorithm (see below) that uses an existing model.

After labeling a number of documents, the system trains a model that can be used to "pre label" addresses. Furthermore, the pre-label can take constraints into account to quickly elicit labels; if a proposed label is not correct, the user can click on a single token that has the wrong label, and this constraint can "propagate" to other tokens in the document.

Figure 19:
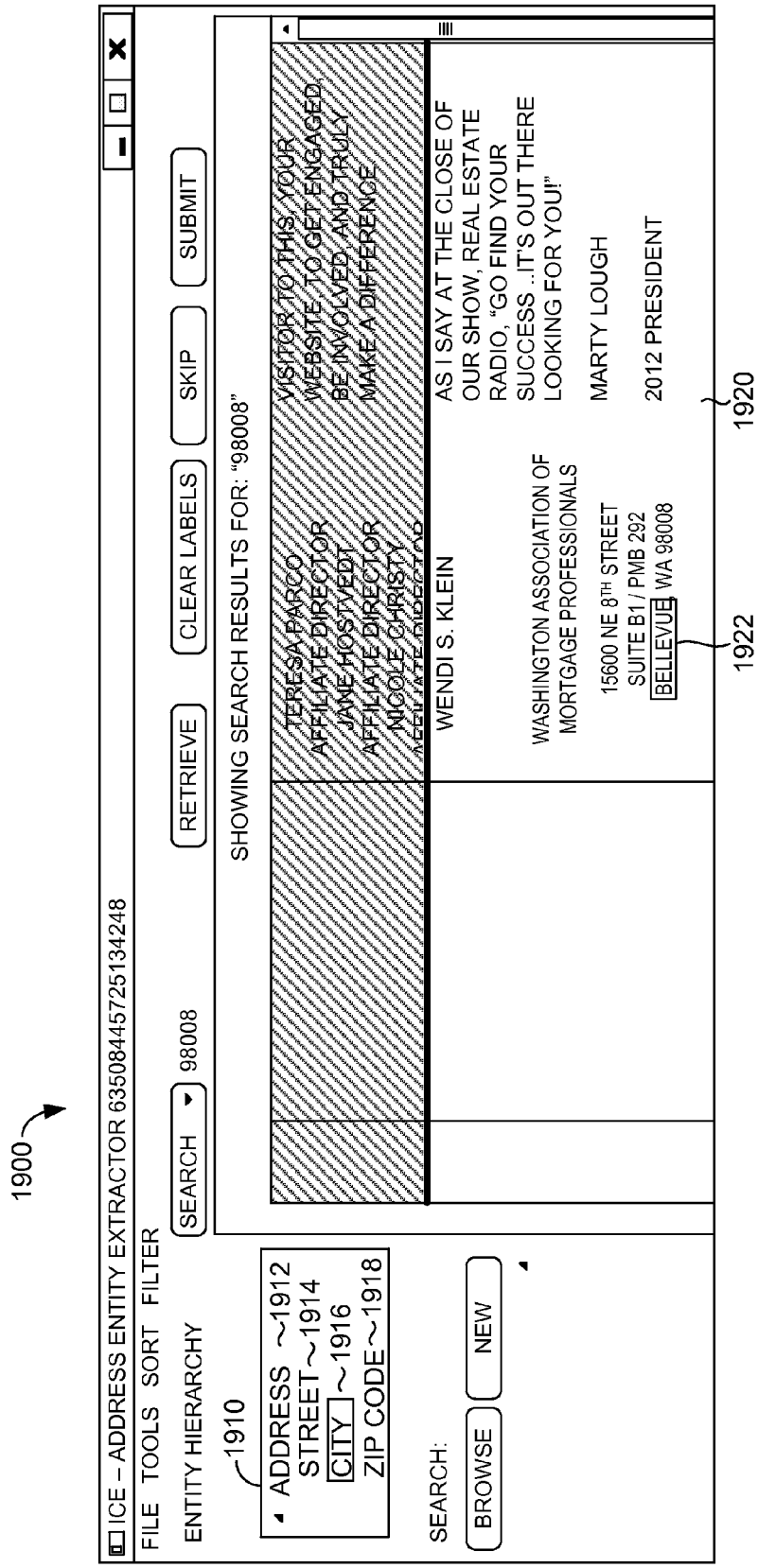
FIG. 19 depicts an exemplary screen shot of a system for binary labeling of addresses in accordance with an embodiment of the present invention.

The user can change which concept to label by clicking on the corresponding node in the concept hierarchy, such as "Street," "City," or "Zip Code." Thus, if the user wants to label cities next, he can click on the city node and proceed to label cities within addresses on documents, as depicted in FIG. 19. FIG. 19 depicts an exemplary screen shot 1900 of a system for binary labeling of addresses comparable to that of FIG. 17, and is generally referred to as screen shot 1900.

Figure 20:
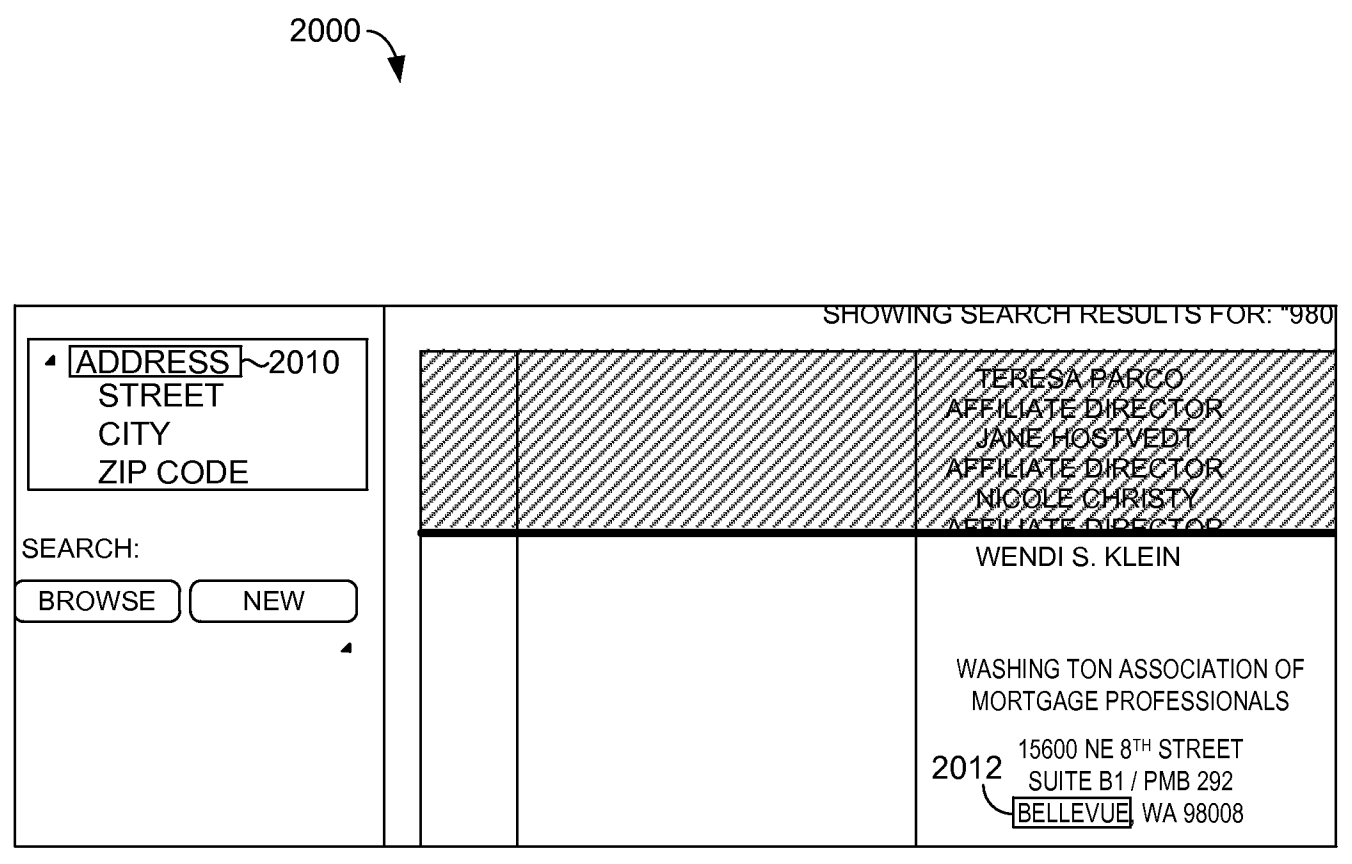

A concept hierarchy 1910 is shown on the left, having a root node 1912 ("Address") and three children nodes: child node 1914 ("Street"), child node 1916 ("City"), and child node 1918 ("Zip Code"). As depicted, the user has the "City" node 1916 selected. A web page 1920 returned as a search result is displayed on the right. As depicted, the user has selected a token 1922 ("BELLEVUE") as a city. With reference to FIG. 20, which depicts an exemplary screen shot 2000 comparable to a portion of screenshot 1900, note that when a user labels tokens as being "City," this implies that they are part of an address. If the user changes from City to Address before submitting the label, he will see that his city label has implied an address label, as illustrated in FIG. 20. With root node 2010 ("Address") now selected, the token 2012 ("Bellevue") remains selected, indicating that it is associated with the label of "Address."

An interactive system for building segment extractors may allow the domain expert to provide binary (in/out) labels associated with nodes in a concept hierarchy.

E. Segment Extraction Models and Classification Models as Features

Once an entity extraction model has been constructed, it can be used as input to the edge-weight functions in another entity extractor. For example, one could use an EE model to predict, for each token in a document, the probability that the token is part of an address. This probability, or some function of that probability, could then be used as one of the token feature values along with the other "standard" feature values.

Entity extraction models can also be used to create document-level features for classification models. For example, one could be building a restaurant-page classifier that has a feature that, with probability >0.5, an address exists on the page. Entity extraction models can also use classification models as features. An interactive system for building segment extractors may use pre-built segment-extraction models and/or pre-built classification models to generate input features for a segment-extraction model.

F. Segment Extraction Review Panel

When a segment-extraction model has been built, it is useful to see how that model predicts on a document that the user has already labeled. Mismatches between the predicted labels and the actual labels can indicate labeling errors or can suggest new features to add. FIG. 21 illustrates an exemplary screen shot 2100 of a review panel that does this, using the extraction problem of identifying dates. FIG. 21 includes document text 2110, token 2112 ("02/21/07"), token 2114 ("JANUARY"), and token 2116 ("BY"). A user-identified label is indicated by an underline 2118 beneath token 2112. Model predictions 2120 are indicated by the upper three sides of a rectangle placed over the tokens 2112, 2114, and 2116. As shown in FIG. 21, the model has correctly identified "02/21/07" as a date, but has falsely labeled "JANUARY BY" as a date. Although "JANUARY" is a month, in the context shown, it is not part of an actual date.

FIG. 22, which illustrates an exemplary screen shot of a model prediction in a document that the user has labeled, depicts a situation where the model correctly identified token 2210 ("JULY 23"), but has missed token 2212 ("7-23-12") as being a date.

An interactive system for building segment extractors may have an interface to review labels with an existing model's predictions at the same time.

G. Mini-Documents

Figure 23:
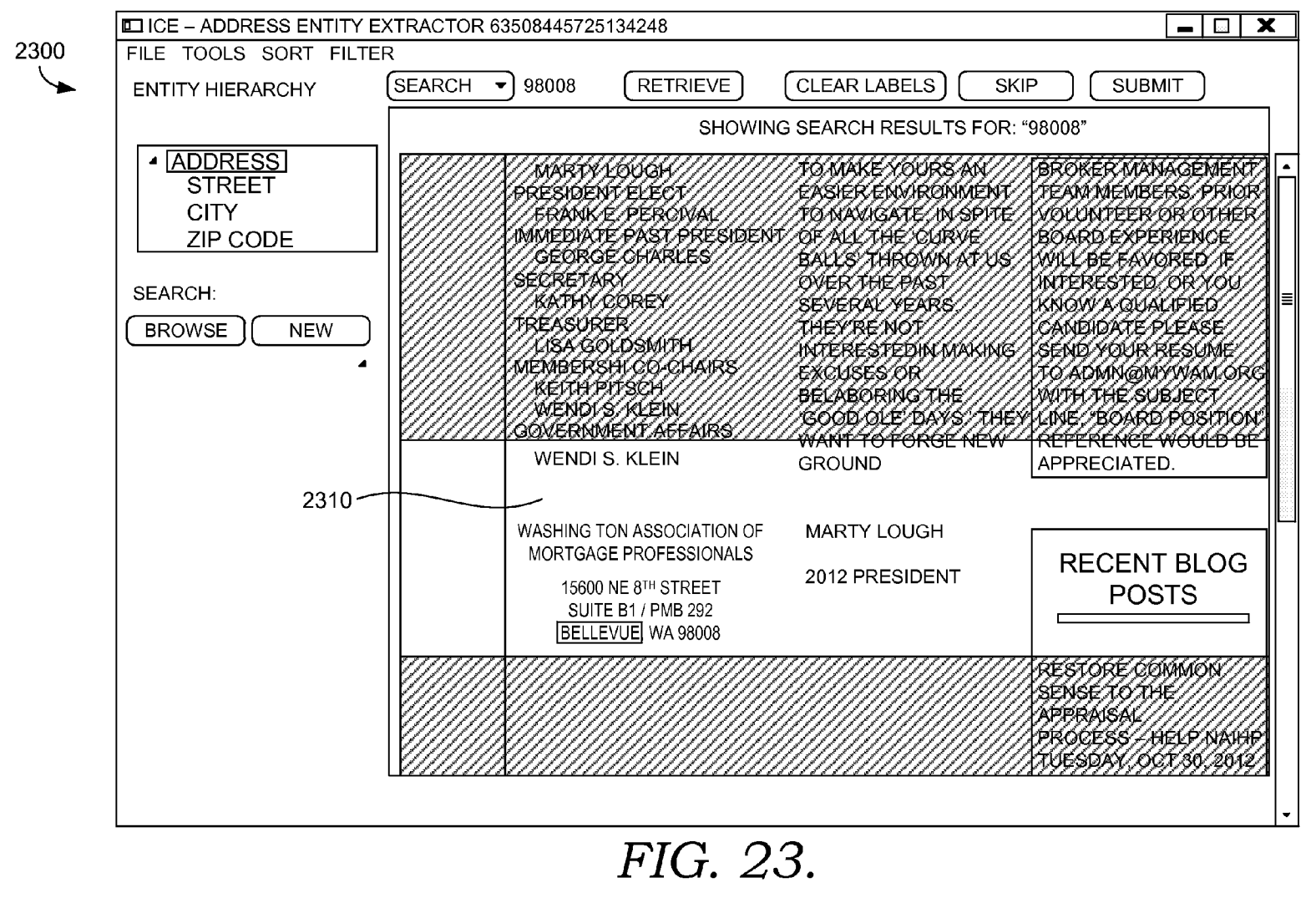

Documents such as web pages or book chapters can be very long. As a result, "labeling a document" can be tedious simply because the labeler needs to scan the entire document. To mitigate this problem, documents can be segmented into more manageable sub-documents, but without losing the context of the segment that is being labeled. With regard to FIG. 23, which illustrates a screen shot 2300 of an exemplary labeling tool, a highlighted portion of a document, referred to as minidoc 2310, is depicted, consisting of the "bright" rectangle in the middle. The context around minidoc 2310 is visible to the labeler, but, in one embodiment, when the user submits a label, only the portion(s) of text within minidoc 2310 are submitted to the system. The user can change the size of minidoc 2310 by click-dragging its boundaries. Alternatively, if the user labels a segment of text outside minidoc 2310, then minidoc 2310 may be expanded to include that text.

A minidoc may be initialized in a number of ways. For example, given an existing model, one can identify a likely (or perhaps uncertain) address of interest, and then define a minidoc that contains that token segment. An interactive system for building segment extractors may segment an input document into smaller sub-documents. Additionally, the sub-documents may be automatically initialized based on a pre-existing segment-extraction model or on proximity to specific tokens or token features.

The invention claimed is:

1. One or more hardware memory having embodied thereon computer-usable instructions that, when executed, facilitate a method of interactively labeling training data for machine learning, the method comprising:
   generating a first set of data items;
   alternating between repetitions of labeling sampled data items and repetitions of labeling searched data items;
   wherein labeling sampled data items includes
   A) providing a first set of data items, wherein each data item is scored with a probability of being a positive example of a particular class of data items,
   B) presenting a second set of one or more data items on a user interface, wherein the second set of data items is generated by sampling, from the first set of data items, one or more data items having scores lying within a range of scores selected to
   a) optimize precision of the classifier, wherein the scores selected to optimize precision of the classifier are greater than 0.5 on a scale of zero to one, or
   b) optimize recall of the classifier,
   C) receiving, via the user interface, one or more user-provided labels that identify one or more data items in the second set as positive or negative examples of the particular class of data items, and
   D) training the classifier based on the user-provided labels in the second set of data items; and
   wherein labeling searched data items includes
   A) presenting, on the user interface, a third set of one or more data items selected from the first set of data items based on a user-provided search query,
   B) receiving, via the user interface, one or more user-provided labels that identify one or more data items in the third set as positive or negative examples of the particular class of data items; and
   C) training the classifier based on the user-provided labels in the third set of data items.

2. The one or more hardware memory of claim 1, wherein training the classifier occurs automatically and is transparent to a user.

3. The one or more hardware memory of claim 1, wherein subsequent to training the classifier each data item in the first set of data items is rescored with a probability of being a positive example of the particular class of data items.

4. The one or more hardware memory of claim 1, wherein the scores selected to optimize precision of the classifier lie within a distribution around a probability of 0.75 on a scale of zero to one.

5. The one or more hardware memory of claim 1, wherein the scores selected to optimize recall of the classifier are less than 0.5 on a scale of zero to one.

6. The one or more hardware memory of claim 5, wherein the scores selected to optimize recall of the classifier lie within a distribution around a probability of 0.25 on a scale of zero to one.

7. The one or more hardware memory of claim 1, wherein the first set of data items includes data items randomly sampled from a larger set of data items.

8. The one or more hardware memory of claim 7, wherein prior to scoring the first set of data items with the classifier, the classifier is pre-trained based on data items that are results of a user query.

9. The one or more hardware memory of claim 7, wherein the data items randomly sampled from the larger set of data items are initially unlabeled.

10. One or more hardware memory having embodied thereon computer-usable instructions that, when executed, facilitate a method of interactively labeling training data for machine learning, the method comprising:
   providing a working set of data items;
   training a classifier using a predefined set of positive or negative examples of a particular class of data items, wherein the classifier is trained to score a data item with a probability of being an example of the particular class of data item;
   scoring the working set of data items via the classifier;
   generating a sampled set of data items by sampling the working set of data items within a selected range of data item scores, wherein the selected range of data item scores is selected to optimize either precision of the classifier or recall of the classifier;

presenting the sampled set of data items within a user interface;

receiving, via the user interface, one or more user-provided labels for one or more of the presented data items, wherein the one or more user-provided labels identify the one or more of the presented data items as positive or negative examples of the class of data items;

retraining the classifier based on the one or more user-provided labels; and repeating steps of presenting data items, receiving user-provided labels, and retraining the classifier, wherein the presenting data items alternates between presenting sampled sets of data items and presenting data items based on results of a user-provided search query, and wherein the selected range of data item scores is alternated between the range of data item scores selected to optimize the precision of the classifier and the range of data item scores selected to optimize the recall of the classifier.

11. The one or more hardware memory of claim 10, wherein subsequent to retraining the classifier, the working set of data items is scored with the retrained classifier.

12. The one or more hardware memory of claim 10, wherein the predefined set of positive or negative examples is based on search results of a search engine.

13. The one or more hardware memory of claim 10, wherein the range of data item scores selected to optimize the precision of the classifier is within a range of scores having a probability of greater than 0.5 of being positive examples on a scale of zero to one.

14. The one or more hardware memory of claim 13, wherein the range of data item scores selected to optimize the recall of the classifier is within a range of scores having a probability of less than 0.5 of being positive examples on a scale of zero to one.

15. One or more hardware memory having embodied thereon computer-usable instructions that, when executed, facilitate a method of interactively labeling training data for machine learning, the method comprising:

generating a first set of data items;

identifying data items, from within the first set of data items, as belonging to a particular class of data items, based on a user search query;

training a classifier based at least on the data items that were identified as belonging to the particular class of data items;

scoring the first set of data items with the classifier, wherein the classifier scores each data item with a probability of being a positive example of the particular class of data items;

selecting, from the first set of data items, a second set of one or more data items based on the scoring, wherein the one or more data items in the second set are selected
A) to improve precision of the classifier, wherein the selected one or more data items have scores that lie within a distribution around a probability of 0.75 on a scale of zero to one of being a positive example of the particular class of data items, or
B) to improve recall of the classifier, wherein the selected one or more data items have scores that lie within a distribution around a probability of 0.25 on a scale of zero to one of being a positive example of the particular class of data items;

presenting the second set of one or more data items on a user interface;

receiving, via the user interface, one or more user-provided labels that identify one or more of the data items in the second set as positive or negative examples of the particular class of data items, wherein the one or more user-provided labels are received by means of one or more of a text entry field, a checkbox, or a cursor-activated selection;

retraining the classifier based on the one or more user-provided labels;

repeating steps of
A) presenting data items,
B) receiving user-provided labels, and
C) retraining the classifier,
wherein the presenting data items alternates between presenting data items based on the scoring and presenting data items based on results of a user-provided search query, and wherein upon retraining the classifier, the first set of data items is scored with the retrained classifier.

16. The one or more hardware memory of claim 15, wherein one or more of retraining the classifier and scoring the first set of data items occurs automatically while still receiving user-provided labels via the user interface.

17. The one or more hardware memory of claim 16, wherein one or more of retraining the classifier and scoring the first set of data items is transparent to a user.

18. The one or more hardware memory of claim 17, wherein selecting the second set of one or more data items alternates between phases of selecting to improve the precision of the classifier and selecting to improve the recall of the classifier.

* * * * *